(12) United States Patent
Toma et al.

(10) Patent No.: US 10,291,955 B2
(45) Date of Patent: May 14, 2019

(54) METHOD FOR TRANSMITTING APPROPRIATE META DATA TO DISPLAY DEVICE ACCORDING TO TRANSMISSION PROTOCOL VERSION

(71) Applicant: Panasonic Intellectual Property Management Co., Ltd., Osaka (JP)

(72) Inventors: Tadamasa Toma, Osaka (JP); Hiroshi Yahata, Osaka (JP); Tomoki Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 15/214,507

(22) Filed: Jul. 20, 2016

(65) Prior Publication Data

US 2016/0330513 A1    Nov. 10, 2016

Related U.S. Application Data

(63) Continuation of application No. PCT/JP2015/003876, filed on Jul. 31, 2015.
(Continued)

(30) Foreign Application Priority Data

Jul. 3, 2015  (JP) ................................ 2015-134733

(51) Int. Cl.
| | |
|---|---|
| *H04N 5/775* | (2006.01) |
| *H04N 21/436* | (2011.01) |

(Continued)

(52) U.S. Cl.
CPC ......... *H04N 21/43615* (2013.01); *H04N 5/57* (2013.01); *H04N 21/435* (2013.01);
(Continued)

(58) Field of Classification Search
USPC .................................................. 386/230, 248
See application file for complete search history.

(56) References Cited

U.S. PATENT DOCUMENTS

| 2007/0285569 A1 | 12/2007 | Nakamura et al. |
| 2011/0317072 A1 | 12/2011 | Miyachi et al. |

(Continued)

FOREIGN PATENT DOCUMENTS

| JP | 2007-279405 | 10/2007 |
| JP | 2008-167418 | 7/2008 |
| JP | 2012-008497 | 1/2012 |

OTHER PUBLICATIONS

International Search Report of PCT application No. PCT/JP2015/003876 dated Oct. 27, 2015.

*Primary Examiner* — Nigar Chowdhury
(74) *Attorney, Agent, or Firm* — Wenderoth, Lind & Ponack, L.L.P.

(57) ABSTRACT

A transmitting method according to one aspect of the present disclosure is a transmitting method of a playback device, and includes: when a version of a transmission protocol is a first version, transmitting first meta data to a display device without transmitting second meta data to the display device, the transmission protocol being used to transmit a signal between the playback device and the display device, the first meta data including information that is commonly used for a plurality of images included in a continuous playback unit of a first video signal and relates to a luminance range of the first video signal, and the second meta data including information that is commonly used for a unit subdivided compared to the continuous playback unit of the first video signal and relates to the luminance range of the first video signal; and when the version of the transmission protocol is a second version, transmitting the first meta data and the second meta data to the display device.

8 Claims, 43 Drawing Sheets

Related U.S. Application Data

(60) Provisional application No. 62/038,900, filed on Aug. 19, 2014.

(51) Int. Cl.
*H04N 5/57* (2006.01)
*H04N 21/432* (2011.01)
*H04N 21/435* (2011.01)
*H04N 21/44* (2011.01)
*H04N 21/4402* (2011.01)
*H04N 9/80* (2006.01)
*H04N 5/77* (2006.01)

(52) U.S. Cl.
CPC ... *H04N 21/4325* (2013.01); *H04N 21/44008* (2013.01); *H04N 21/44029* (2013.01); *H04N 21/440218* (2013.01); *H04N 5/77* (2013.01)

(56) References Cited

U.S. PATENT DOCUMENTS

| | | | |
|---|---|---|---|
| 2012/0026405 A1* | 2/2012 | Atkins | G11B 27/034 348/651 |
| 2012/0075435 A1* | 3/2012 | Hovanky | H04N 13/20 348/51 |
| 2014/0210847 A1* | 7/2014 | Knibbeler | G09G 5/006 345/589 |
| 2014/0341272 A1* | 11/2014 | Miller | H04N 5/202 375/240.02 |

\* cited by examiner

FIG. 6

| | DR CONVERSION | | | HDR CONTROL INFORMATION | | |
|---|---|---|---|---|---|---|
| | STATIC HDR META DATA (TITLE UNITS) | | DYNAMIC HDR META DATA (FRAME UNITS) | STATIC HDR META DATA (TITLE UNITS) | | DYNAMIC HDR METADATA (FRAME UNITS) |
| | REQUIRED META DATA | SELECTED META DATA | SELECTED META DATA | REQUIRED META DATA | SELECTED META DATA | SELECTED META DATA |
| BASIC METHOD | NA | NA | NA | META DATA a | META DATA b | NA |
| EXTENSION METHOD A | META DATA A1 | META DATA A2 | META DATA A3 | META DATA A4 | META DATA A5 | META DATA A6 |
| EXTENSION METHOD B | META DATA B1 | META DATA B2 | NA | META DATA B4 | NA | NA |
| EXTENSION METHOD C | NA | NA | NA | META DATA C4 | META DATA C5 | META DATA C6 |
| EXTENSION METHOD D | META DATA D1 | NA | NA | META DATA B4 | NA | META DATA D6 |
| RESERVE | TBD | TBD | TBD | TBD | TBD | TBD |
| RESERVE | TBD | TBD | TBD | TBD | TBD | TBD |
| RESERVE | TBD | TBD | TBD | TBD | TBD | TBD |
| RESERVE | TBD | TBD | TBD | TBD | TBD | TBD |

FIG. 19

| CONVERSION MODE OF PROVIDING HDR META DATA | WHETHER OR NOT DATA OUTPUT DEVICE SUPPORTS CONVERSION PROCESS | WHETHER OR NOT DISPLAY DEVICE SUPPORTS CONVERSION PROCESS | INSTRUCTION CONTENTS OF HDR META INTERPRETER |
|---|---|---|---|
| MODE 1 | SUPPORTED | NOT SUPPORTED | CONVERT DYNAMIC RANGE IN DR CONVERTER ACCORDING TO MODE 2. *MODE 2 HAS HIGHER REPRODUCIBILITY FOR MASTER IMAGE THAN THAT OF MODE 1. |
| MODE 2 | SUPPORTED | NOT SUPPORTED | |
| MODE 3 | NOT SUPPORTED | NOT SUPPORTED | |

FIG. 20

| CONVERSION MODE OF PROVIDING HDR META DATA | WHETHER OR NOT DATA OUTPUT DEVICE SUPPORTS CONVERSION PROCESS | WHETHER OR NOT DISPLAY DEVICE SUPPORTS CONVERSION PROCESS | INSTRUCTION CONTENTS OF HDR META INTERPRETER |
|---|---|---|---|
| MODE 1 | SUPPORTED | SUPPORTED | TRANSMIT META DATA MATCHING CONVERSION PROCESS OF MODE 2 BY USING HDMI CONTROL INFORMATION WITHOUT PERFORMING CONVERSION PROCESS IN DR CONVERTER, AND CONVERT DYNAMIC RANGE IN DISPLAY DEVICE ACCORDING TO MODE 2.<br><br>* MODE 2 HAS HIGHER REPRODUCIBILITY FOR MASTER IMAGE THAN THAT OF MODE 1. |
| MODE 2 | NOT SUPPORTED | SUPPORTED | |
| MODE 3 | NOT SUPPORTED | NOT SUPPORTED | |

FIG. 21

| CONVERSION MODE OF PROVIDING HDR META DATA | WHETHER OR NOT DATA OUTPUT DEVICE SUPPORTS CONVERSION PROCESS | WHETHER OR NOT DISPLAY DEVICE SUPPORTS CONVERSION PROCESS | WHETHER OR NOT DATA OUTPUT DEVICE CAN OBTAIN PARAMETERS OF DISPLAY DEVICE WHICH ARE NECESSARY FOR CONVERSION PROCESS | INSTRUCTION CONTENTS OF HDR META INTERPRETER |
|---|---|---|---|---|
| MODE 1 | SUPPORTED | SUPPORTED | YES | CONVERT DYNAMIC RANGE IN DR CONVERTER ACCORDING TO MODE 2. DATA OUTPUT DEVICE ADDITIONALLY OBTAINS NECESSARY PARAMETERS OF DISPLAY DEVICE SUCH AS PEAK LUMINANCE, FROM DISPLAY DEVICE. |
| MODE 2 | SUPPORTED | NOT SUPPORTED | YES | |
| MODE 3 | SUPPORTED | NOT SUPPORTED | NO | * WHETHER OR NOT PARAMETERS OF DISPLAY DEVICE ARE NECESSARY DIFFERS DEPENDING ON CONVERSION MODE. |

FIG. 23

| RESOLUTION AND DYNAMIC RANGE OF VIDEO SIGNAL OF CONTENT | WHETHER OR NOT DISPLAY DEVICE SUPPORTS RESOLUTION AND HDR SIGNAL | OUTPUT SIGNAL OF DATA OUTPUT DEVICE |
|---|---|---|
| 4K+HDR | 4K+HDR | 4K+HDR |
| 4K+HDR | 2K+HDR | 2K+HDR |
| 4K+HDR | 2K+SDR | 2K+SDR |
| 2K+HDR | 4K+HDR | 4K+HDR |
| 2K+HDR | 2K+HDR | 2K+HDR |
| 2K+HDR | 2K+SDR | 2K+SDR |
| 2K+SDR | 4K+HDR | 4K+SDR |
| 2K+SDR | 2K+HDR | 2K+SDR |
| 2K+SDR | 2K+SDR | 2K+SDR |

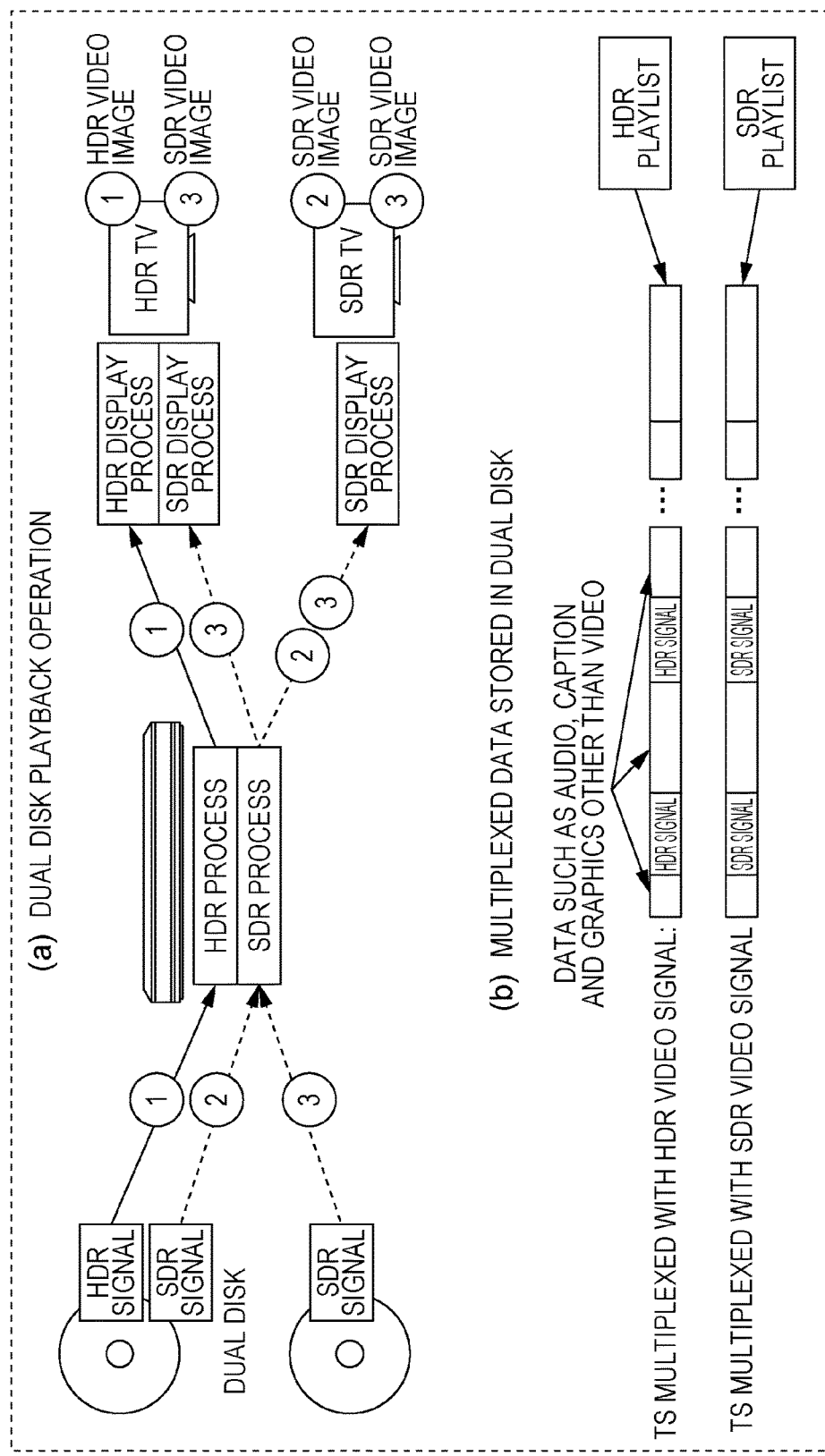

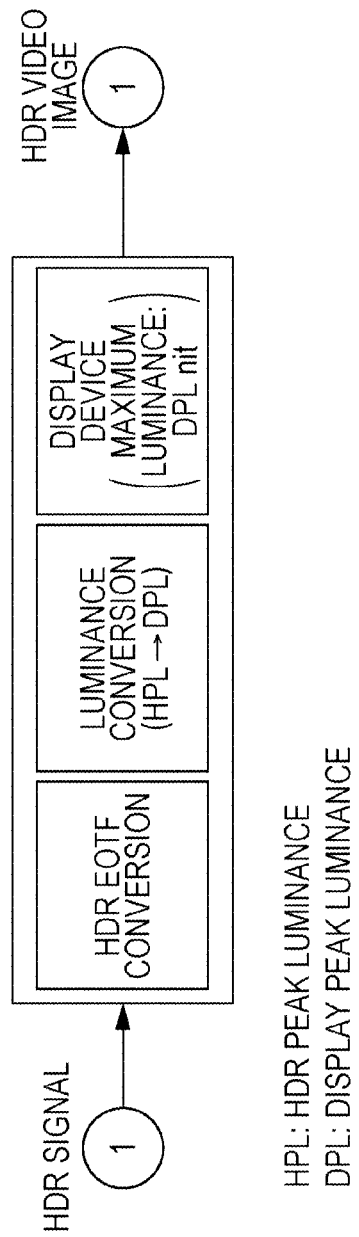

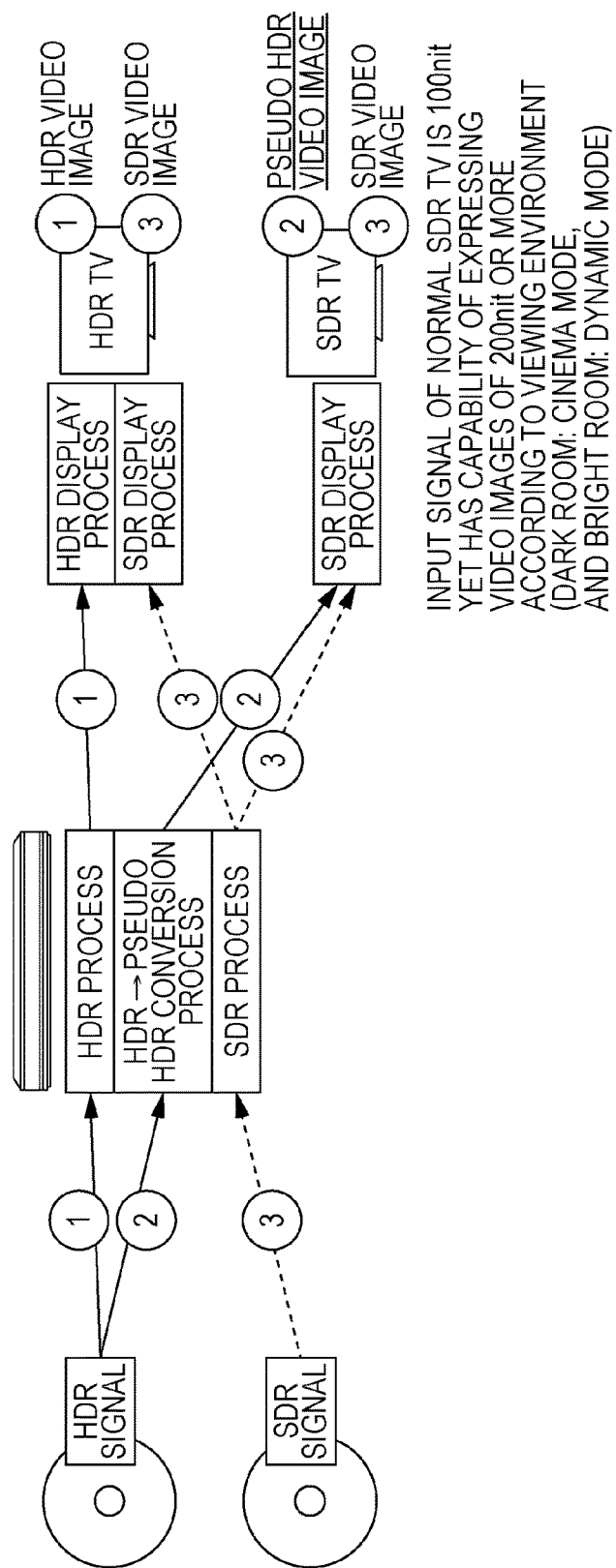

METHOD FOR TRANSMITTING APPROPRIATE META DATA TO DISPLAY DEVICE ACCORDING TO TRANSMISSION PROTOCOL VERSION

BACKGROUND

1. Technical Field

The present disclosure relates to a transmitting method, a playback method and a playback device.

2. Description of the Related Art

Conventionally, image signal processing devices which improve luminance levels which can be displayed are disclosed (see, for example, Unexamined Japanese Patent Publication No. 2008-167418).

SUMMARY

In one general aspect, the techniques disclosed here feature a method used by a playback device, including: when a version of a transmission protocol is a first version, transmitting first meta data to a display device without transmitting second meta data to the display device, the transmission protocol being used to transmit a signal between the playback device and the display device, the first meta data including information that is commonly used for a plurality of images included in a continuous playback unit of a first video signal and relates to a luminance range of the first video signal, the second meta data including information that is commonly used for a unit subdivided compared to the continuous playback unit of the first video signal and relates to the luminance range of the first video signal; and when the version of the transmission protocol is a second version, transmitting the first meta data and the second meta data to the display device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 6 is a view illustrating an example indicating HDR meta data;

FIG. 19 is a view illustrating an example of instruction contents of an HDR meta interpreter;

FIG. 20 is a view illustrating an example of instruction contents of the HDR meta interpreter;

FIG. 21 is a view illustrating an example of instruction contents of the HDR meta interpreter;

FIG. 23 is a view illustrating a combination example of characteristics of a video signal and the display device, and an output signal of the data output device;

FIG. 33 is a view for explaining a dual disk playback operation;

FIG. 34A is a view illustrating an example of a display process of converting an HDR signal in an HDR TV and displaying an HDR;

FIG. 35 is a view for explaining a process of converting an HDR into a pseudo HDR;

DETAILED DESCRIPTION

Figure 1:
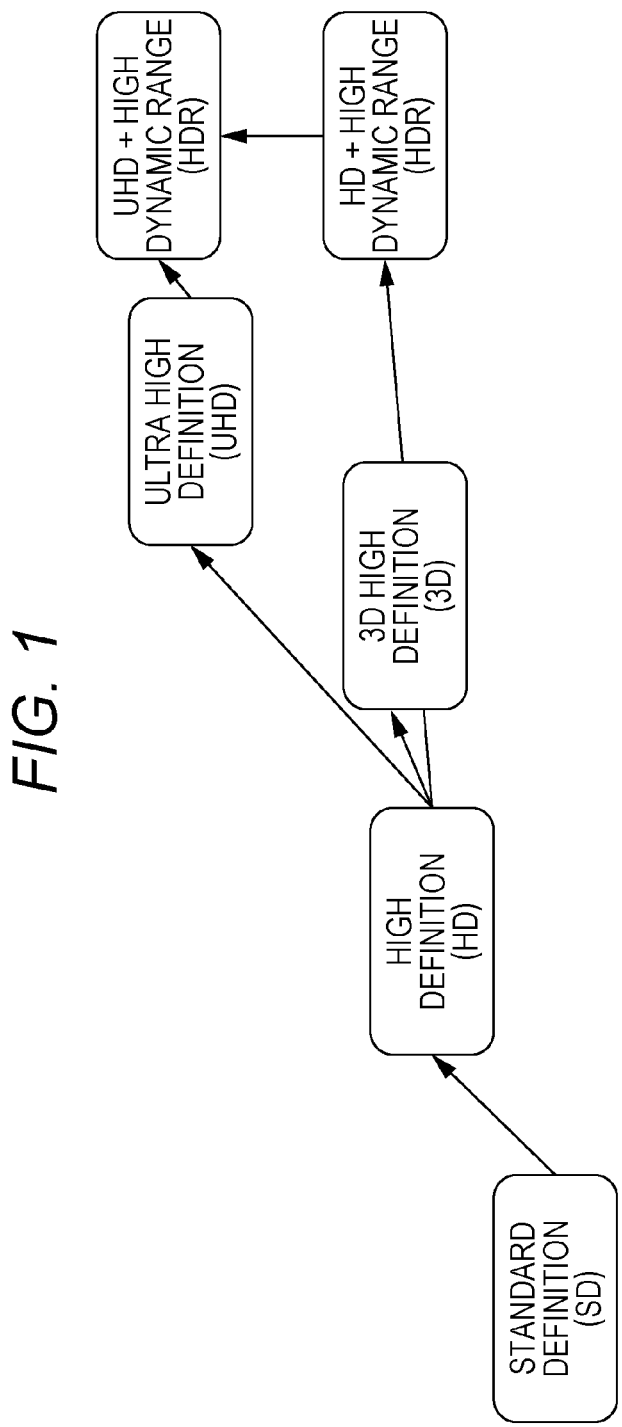
FIG. 1 is a view for explaining development of a video technology.

A transmitting method according to one aspect of the present disclosure is a method used by a playback device, and includes: when a version of a transmission protocol is a first version, transmitting first meta data to a display device without transmitting second meta data to the display device, the transmission protocol being used to transmit a signal between the playback device and the display device, the first meta data including information that is commonly used for a plurality of images included in a continuous playback unit of a first video signal and relates to a luminance range of the first video signal, the second meta data including information that is commonly used for a unit subdivided compared to the continuous playback unit of the first video signal and relates to the luminance range of the first video signal; and when the version of the transmission protocol is a second version, transmitting the first meta data and the second meta data to the display device.

Consequently, according to this transmitting method, it is possible to transmit appropriate meta data of the first meta data and the second meta data, to the display device according to the version of the transmission protocol.

For example, when the version of the transmission protocol is the first version, a conversion process of converting the luminance range of the first video signal may be performed by using the second meta data to obtain a second video signal, and the second video signal may be transmitted to the display device.

Consequently, when the second meta data cannot be transmitted to the display device and the display device cannot perform a conversion process, the playback device can perform the conversion process.

For example, when the version of the transmission protocol is the second version and the display device does not include a function of the conversion process of converting the luminance range of the first video signal by using the second meta data, the conversion processing may be performed to obtain a second video signal, and the second video signal may be transmitted to the display device, and when the version of the transmission protocol is the second version and the display device includes the function of the conversion process, the first video signal may be transmitted to the display device without performing the conversion process.

Consequently, appropriate one of the playback device and the display device can execute a conversion process.

For example, when the playback device does not include a function of the conversion process of converting the luminance range of the video signal by using the second meta data, the conversion processing may not be performed, and the second meta data may not be transmitted to the display device.

For example, a luminance value of the first video signal may be encoded as a code value, and the first meta data may be the information for specifying an EOTF (Electro-Optical Transfer Function) of associating a plurality of luminance values and a plurality of code values.

For example, the second meta data may indicate mastering characteristics of the first video signal.

Further, a playback method according to one aspect of the present disclosure is a playback method for playing back a video signal, a luminance of the video signal being a first luminance value in a first luminance range whose maximum luminance value is defined as a first maximum luminance value exceeding 100 nit, the playback method including: determining whether or not an inter-screen change amount of a luminance value of the video signal exceeds a predetermined first threshold; and adjusting the luminance value of the video signal when it is determined that the change amount exceeds the first threshold.

Consequently, according to the playback method, when a luminance value of a video signal exceeds display capability of the display device, it is possible to generate a video signal which the display device can appropriately display by lowering the luminance value of the video signal. Further, according to the playback method, when a large change amount of a luminance value of a video signal is likely to negatively influence viewers, it is possible to reduce the negative influence by lowering the luminance value of the video signal.

For example, the adjustment may include adjusting, for a pixel whose change amount exceeds the first threshold, a luminance value of the pixel such that the change amount of the pixel is the first threshold or less.

For example, the determination may include determining whether or not a difference exceeds the first threshold, the difference being a difference between a peak luminance of a first image included in the video signal, and each of luminance values of a plurality of pixels included in the video signal and included in a second image subsequent to the first image, and the adjustment may include adjusting, for a pixel whose difference exceeds the first threshold, a luminance value of the pixel such that the difference of the pixel is the first threshold or less.

For example, the determination may include determining whether or not the change amount of the luminance value at a reference time interval exceeds the first threshold, the reference time interval being an integer multiple of a reciprocal of a frame rate of the video signal.

For example, the determination may include determining whether or not a rate of pixels whose change amounts exceed the first threshold with respect to a plurality of pixels exceeds a second threshold, the plurality of pixels being included in an image included in the video signal, and the adjustment may include adjusting, when the rate exceeds the second threshold, the luminance values of a plurality of pixels such that the rate is the second threshold or less.

For example, the determination may include determining, for each of a plurality of areas obtained by dividing a screen, whether or not the inter-screen change amount of the luminance value of each of a plurality of areas exceeds the first threshold, and the adjustment may include performing adjustment process of lowering a luminance value of an area for which it is determined that the change amount exceeds the first threshold.

Further, a playback method according to one aspect of the present disclosure is a playback method for playing back a video signal, a luminance of the video signal being a first luminance value in a first luminance range whose maximum luminance value is defined as a first maximum luminance value exceeding 100 nit, the playback method including: determining whether or not a luminance value of an image of the video signal exceeds a predetermined first threshold; and adjusting the luminance value of the image when determining that the luminance value exceeds the first threshold.

Consequently, according to the playback method, when a luminance value of a video signal exceeds display capability of the display device, it is possible to generate a video signal which the display device can appropriately display by lowering the luminance value of the video signal. Further, according to the playback method, when a high luminance value of a video signal is likely to negatively influence viewers, it is possible to reduce the negative influence by lowering the luminance value of the video signal.

For example, the determination may include determining, whether or not a number of pixels whose luminance values exceed the first threshold with respect to a plurality of pixels included in the image exceeds the first threshold, and the adjustment may include lowering, when the number of pixels exceeds a third thresholds, the luminance value of the image such that the number of pixels is the third threshold or less.

For example, the determination may include determining, a rate of pixels whose luminance values exceed the first threshold with respect to a plurality of pixels included in the image, and the adjustment may include lowering, when the rate exceeds a third threshold, the luminance value of the image such that the rate is the third threshold or less.

For example, the first threshold may be a value calculated based on an upper limit value of a voltage which is simultaneously applicable to a plurality of pixels in a display device that displays the video signal.

Further, a playback device according to one aspect of the present disclosure is a playback device that transmits a video signal to a display device, and includes one or more memories and circuitry which, in operation: transmits, when a version of a transmission protocol is a first version, first meta data to the display device without transmitting second meta data to the display device, the transmission protocol being used to transmit a signal between the playback device and the display device, the first meta data including information that is commonly used for a plurality of images included in a continuous playback unit of a first video signal and relates to a luminance range of the first video signal, the second meta data including information that is commonly used for a unit subdivided compared to the continuous playback unit of the first video signal and relates to the luminance range of the first video signal; and transmits, when the version of the transmission protocol is a second version, the first meta data and the second meta data to the display device.

Consequently, the playback device can transmit appropriate meta data of the first meta data and the second meta data, to the display device according to the version of the transmission protocol.

Furthermore, a playback device according to one aspect of the present disclosure is a playback device that plays back a video signal, a luminance of the video signal being a first luminance value in a first luminance range whose maximum luminance value is defined as a first maximum luminance value exceeding 100 nit, the playback device including one or more memories and circuitry which, in operation: determines whether or not an inter-screen change amount of a luminance value of the video signal exceeds a predetermined first threshold; and adjusts the luminance value of the video signal when it is determined that the change amount exceeds the first threshold.

Consequently, when a luminance value of a video signal exceeds display capability of the display device, the playback device can generate a video signal which the display device can appropriately display by lowering the luminance value of the video signal. Further, when a large change amount of a luminance value of a video signal is likely to negatively influence viewers, the playback device can reduce the negative influence by lowering the luminance value of the video signal.

Furthermore, a playback device according to one aspect of the present disclosure is a playback device that plays back a video signal, a luminance of the video signal being a first luminance value in a first luminance range whose maximum luminance value is defined as a first maximum luminance value exceeding 100 nit, the playback device including one or more memories and circuitry which, in operation: determines whether or not a luminance value of an image included in the video signal exceeds a predetermined first threshold; and adjusts the luminance value of the image when it is determined that the luminance value exceeds the first threshold.

Consequently, when a luminance value of a video signal exceeds display capability of the display device, the playback device can generate a video signal which the display device can appropriately display by lowering the luminance value of the video signal. Further, when a high luminance value of a video signal is likely to negatively influence viewers, the playback device can reduce the negative influence by lowering the luminance value of the video signal.

In addition, these comprehensive or specific aspects may be realized by a system, a method, an integrated circuit, a computer program or a computer-readable recording medium such as a CD-ROM, and may be realized by an arbitrary combination of the system, the method, the integrated circuit, the computer program and the recording medium.

Further, the above features will be mainly described in [27. HDR Meta Data Transmitting Method] to [28. Adjustment of Luminance Value].

In addition, the exemplary embodiment described below is a comprehensive or specific example. Numerical values, shapes, materials, components, placement positions and connection modes of the components, steps and a step order described in the following exemplary embodiment are exemplary, and by no means limit the present disclosure. Further, components which are not recited in the independent claims representing the uppermost generic concepts among components in the following exemplary embodiment will be described as arbitrary components.

EXEMPLARY EMBODIMENT

1. Background

First, a transition of a video technology will be described with reference to FIG. 1. FIG. 1 is a view for explaining development of the video technology.

Expanding a number of display pixels has been mainly focused to provide high-quality video images so far. So-called 2K video images of video images of 720×480 pixels of Standard Definition (SD) to 1920×1080 pixels of High Definition (HD) are spreading.

In recent years, introduction of so-called 4K video images of 3840×1920 pixels of Ultra High Definition (UHD) or 4096×1920 pixels of 4K has been started to provide much higher quality of video images.

Further, providing higher resolutions of video images by introducing 4K, and providing higher quality video images by extending a dynamic range and expanding a color gamut or by adding and improving a frame rate have been studied. Above all, as a dynamic range, an HDR (High Dynamic Range) is a method for supporting a luminance range whose maximum luminance value is expanded to express, with a brightness close to an actual brightness, bright light such as specular reflection light which cannot be expressed by existing TV signals while maintaining a dark part gradation in conventional video images, and is gaining attention. More specifically, a method for a luminance range supported by conventional TV signals is called an SDR (Standard Dynamic Range) and has 100 nit of a maximum luminance value. Meanwhile, the HDR is assumed to expand the maximum luminance value to 1000 nit or more. The HDR is being standardized by SMPTE (Society of Motion Picture & Television Engineers) and ITU-R (International Telecommunications Union Radiocommunications Sector).

Similar to HD and UHD, specific HDR application targets include broadcasts, package media (Blu-ray (registered trademark which applies likewise below) Discs), and Internet distribution.

In addition, a luminance of a video image which supports the HDR takes a luminance value of an HDR luminance range, and a luminance signal obtained by quantizing the luminance value of the video image will be referred to as an HDR signal. A luminance of a video image which supports the SDR takes a luminance value of an SDR luminance range, and a luminance signal obtained by quantizing the luminance value of the video image will be referred to as an SDR signal.

2. Object and Task

An HDR (High Dynamic Range) signal which is an image signal of a higher luminance range than that of conventional image signals is distributed via a package medium such as a Blu-ray disc in which HDR signals are stored, broadcasting or a distribution medium such as a OTT (Over The Top). In this regard, the OTT means Web sites provided on the Internet, content and services such as moving images and audios or providers which provide the content and services. Distributed HDR signals are decoded by a Blu-ray device or the like. Further, decoded HDR signals are sent to an HDR supporting display device (TVs, projectors, tablets or smartphones), and the HDR supporting display device plays back HDR video images.

The HDR technique is only at an early stage, and it is assumed that, after an HDR technique which is introduced first is adopted, a new HDR method is developed. In this case, it is possible to adopt a new HDR method by storing an HDR signal (and meta data) of a newly created HDR method, in an HDR distribution medium. In this case, what is important is "Forward Compatibility" which means that an original device (e.g. Blu-ray device) which does not support a new function can play back an HDR distribution medium in which signals of a new HDR method are stored. The present disclosure realizes a method and a device which maintain, for a distribution medium in which a new HDR signal format (meta data) is stored, compatibility by guaranteeing HDR playback of an original technique without changing a decoding device (e.g. Blu-ray device) designed for an original distribution medium, and enable an HDR decoding device (e.g. Blu-ray device) which supports a new method to support a process of a new HDR method.

Further, when a method for adopting a new technique so randomly is adopted without selecting an extension method or appropriately determining a registering method, a flood of multiple non-compatible methods is likely to cause confusion in the market. By contrast with this, introduction of a very strict technique selection mechanism delays determination of a new technique. Thus, the delay of the introduction of technical renovation is likely to make a distribution platform (e.g. Blu-ray) of the technique obsolete. Therefore, there is a risk that it is not possible to maintain competitiveness of this distribution platform against other platforms (e.g. electronic distribution service such as the OTT). Hence, an option introduction method which adopts advantages of both is necessary. In the present exemplary embodiment, a hybrid option introduction method which meets these needs is proposed.

Figure 2:
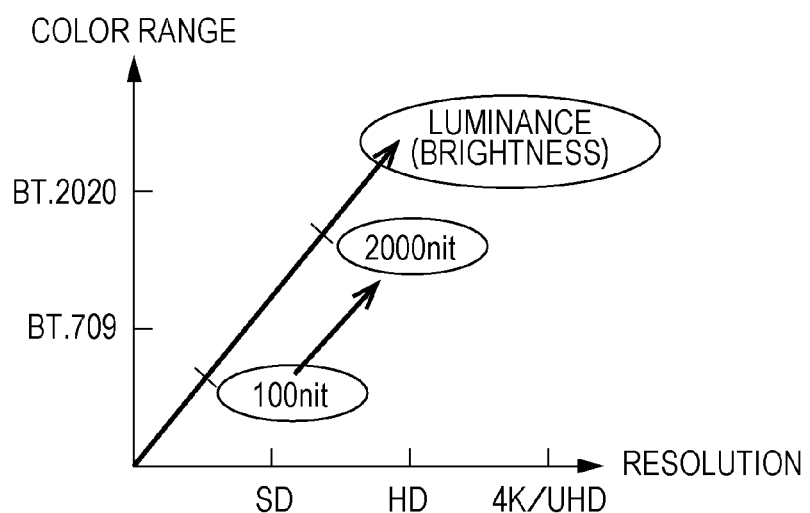
FIG. 2 is a view for explaining an HDR (High-dynamic-range imaging) position.
Figure 3:
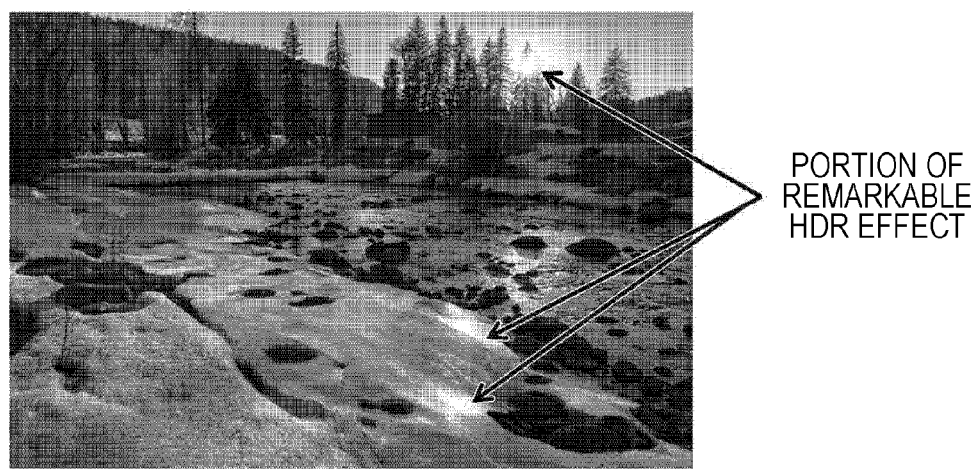
FIG. 3 is a view illustrating an image example indicating an HDR effect.

FIG. 2 is a view illustrating an HDR position (expansion of a luminance). Further, FIG. 3 illustrates an image example indicating an HDR effect.

Figure 4:
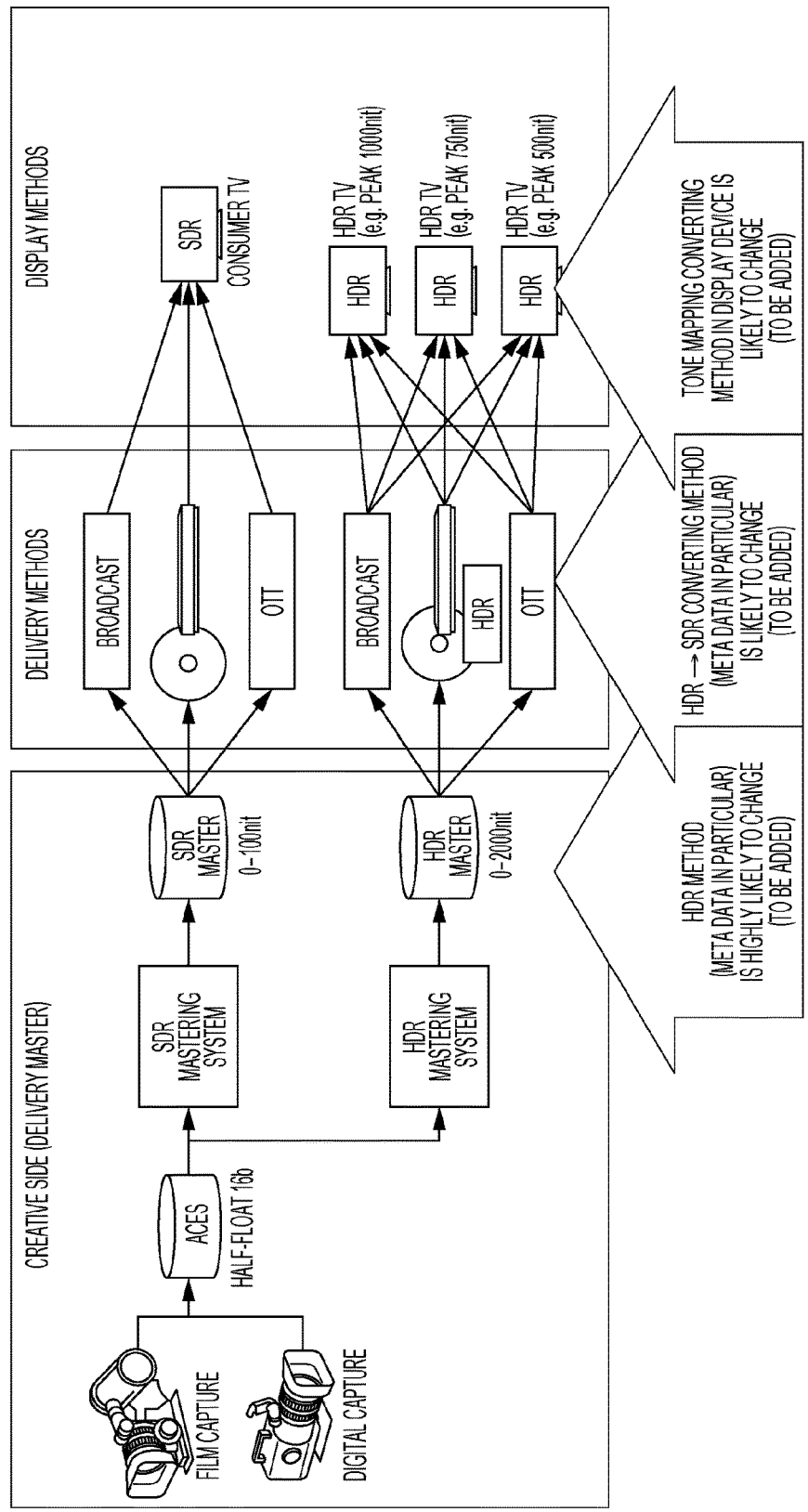
FIG. 4 is a view for explaining a relationship between masters, distribution methods and display devices in case of introduction of the HDR.

3. Relationship Between Masters, Distributing Methods and Display Devices During Introduction of HDR FIG. 4 is a view illustrating a relationship between a flow of creating SDR and HDR home entertainment masters, distribution media and display devices.

An HDR concept has been proposed, and effectiveness at a level of the HDR concept has been confirmed. Further, a first method for implementing an HDR has been proposed. In this regard, this does not mean that a great number of items of HDR content has been created by using this method, and the first implementation method has not been substantiated. Hence, when creation of HDR content is earnestly advanced in future, meta data for an existing HDR creation method, an HDR-SDR converting method or a tone mapping conversion method of a display device is likely to change.

4. How to Use EOTF

Figure 5:
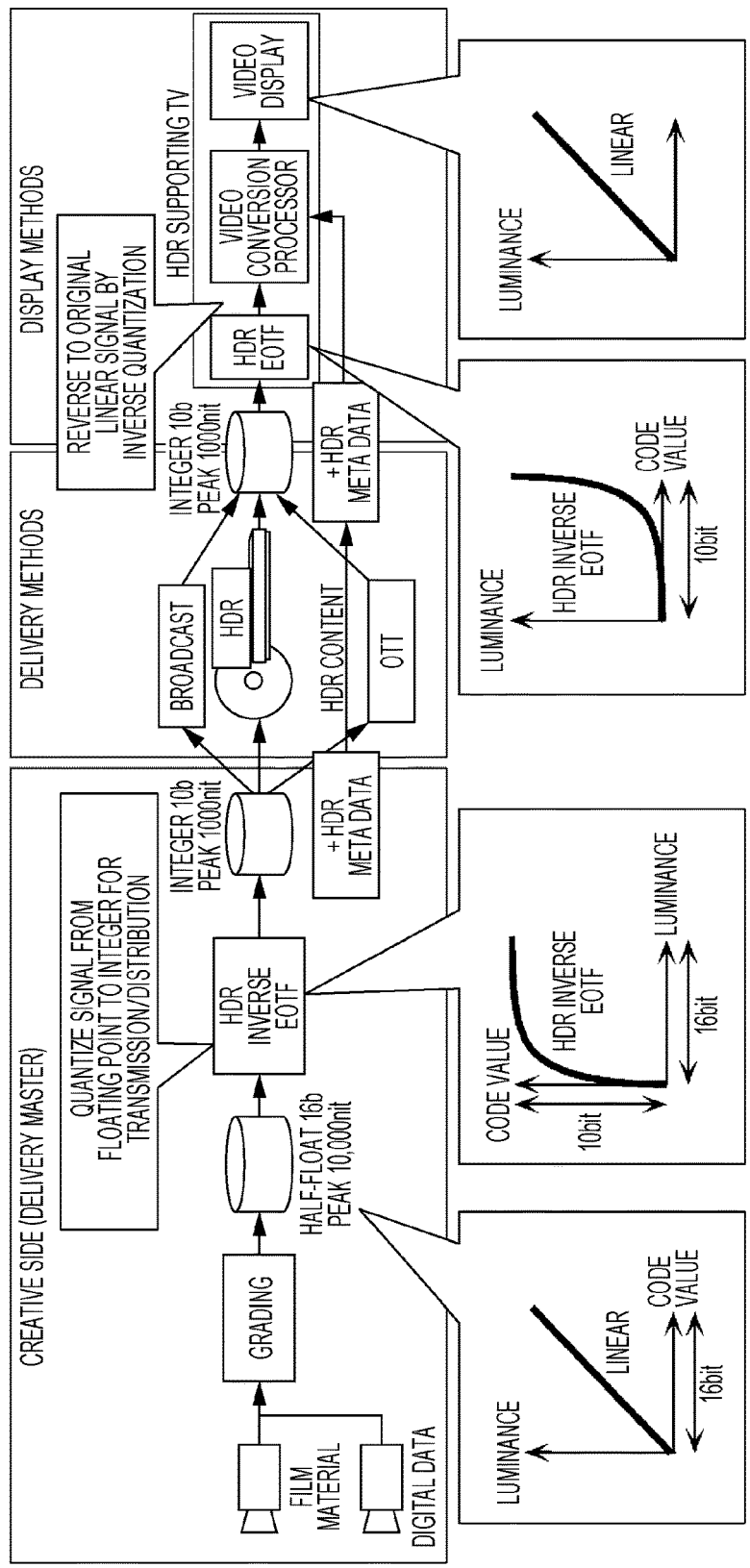
FIG. 5 is an explanatory view of a method for determining a code value of a luminance signal to be stored in content, and a process for restoring a luminance value from a code value during playback.

FIG. 5 is an explanatory view of a method for determining a code value of a luminance signal to be stored in content, and a process for restoring a luminance value from a code value during playback.

A luminance signal indicating a luminance in the present exemplary embodiment is an HDR signal which supports an HDR. A graded image is quantized by an HDR inverse EOTF, and a code value associated with a luminance value of the image is determined. The image is encoded based on this code value, and a video stream is generated. During playback, a stream decoding result is inversely quantized based on the HDR EOTF and is converted into a linear signal, and a luminance value of each pixel is restored. Quantization performed by using an HDR inverse EOTF will be referred to as "HDR inverse EOTF conversion" below. Inverse quantization performed by using an HDR EOTF will be referred to as "HDR EOTF conversion" below. Similarly, quantization performed by using an SDR inverse EOTF will be referred to as "SDR inverse EOTF conversion" below. Inverse quantization performed by using an SDR EOTF will be referred to as "SDR EOTF conversion" below.

A video conversion processor performs conversion into a luminance value which can be displayed by a video display, by using this luminance value and meta data, and, consequently, the video display can display HDR video images. When, for example, a peak luminance of an original HDR video image is 2000 nit and a peak luminance of the video display is 800 nit, it is possible to perform conversion and lower a luminance.

Thus, an HDR master method is realized by a combination of an EOTF, meta data and an HDR signal. Consequently, it is likely that a more efficient EOTF and meta data are developed, and a time to adopt an HDR method using such an EOTF and meta data comes.

In this regard, what new method will be like is not known at this point of time, yet it is imaginable that it is likely that an EOTF is changed and meta data is added. In this case, HDR signals also change.

The present disclosure intends to make the HDR popular by reducing a risk that, even when an HDR transmission format is changed as described above, customers who have bought HDR supporting devices have to buy new devices.

5. Meta Data

FIG. 6 is a view illustrating an example of HDR meta data. HDR meta data includes conversion auxiliary information used to change (DR conversion) a luminance range of a video signal, and HDR control information. Each information is one of static HDR meta data provided in title units, for example, and dynamic HDR meta data provided in frame units, for example. Further, static HDR meta data is classified into one of required meta data (basic data) and selected meta data (extension data), and dynamic HDR meta data is classified as selected meta data. In addition, each information will be described in detail below.

Thus, the basic method can be implemented by using only static HDR meta data. Further, each extension method is designed so as not to influence a playback device (e.g. Blu-ray) of the basic method.

6. HDR Meta Data 1

Parameters of HDR content indicating characteristics during mastering include static HDR meta data which is fixed per title or per playlist, and dynamic HDR meta data which is variable per scene. In this regard, a title and a playlist are information indicating video signals which are continuously played back. Hereinafter, video signals which are continuously played back will be referred to as continuous playback units.

For example, static HDR meta data includes at least one of a type of an EOTF function (curve), a 18% Gray value, a Diffuse White value, Knee point and Clip point. The EOTF is information obtained by associating a plurality of luminance values and a plurality of code values, and is information for changing a luminance range of a video signal.

Other pieces of information are attribute information related to a luminance of a video signal. Therefore, it may be said that static HDR meta data is information related to a luminance range of a video signal and is information for specifying the luminance range of the video signal.

More specifically, the 18% Gray value and the Diffuse White value indicate a luminance value (nit) of a video image whose brightness is a predetermined reference, in other words, indicate a reference brightness of a video image. More specifically, the 18% Gray value indicates a mastered luminance value (nit) obtained of an object whose brightness is 18 nit before the mastering. The Diffuse White value indicates a luminance value (nit) corresponding to white.

Further, Knee point and Clip point are parameters of the EOTF function, and indicate points at which EOTF characteristics change. More specifically, Knee point indicates a change point at which an increase of a luminance value (output luminance) mapped as a luminance of a video signal to the EOTF with respect to an increase of an original luminance value (input luminance) during shooting is a value different from 1:1. For example, Knee point is information for specifying a point which is off from a linear change in FIG. 39A described below. Further, Clip point indicates a point at which clipping starts in the EOTF function. In this regard, clipping refers to converting an input luminance value of a given value or more into an identical output luminance value. For example, Clip point indicates a point at which an output luminance value stops changing in FIG. 39B described below.

Figure 36A:
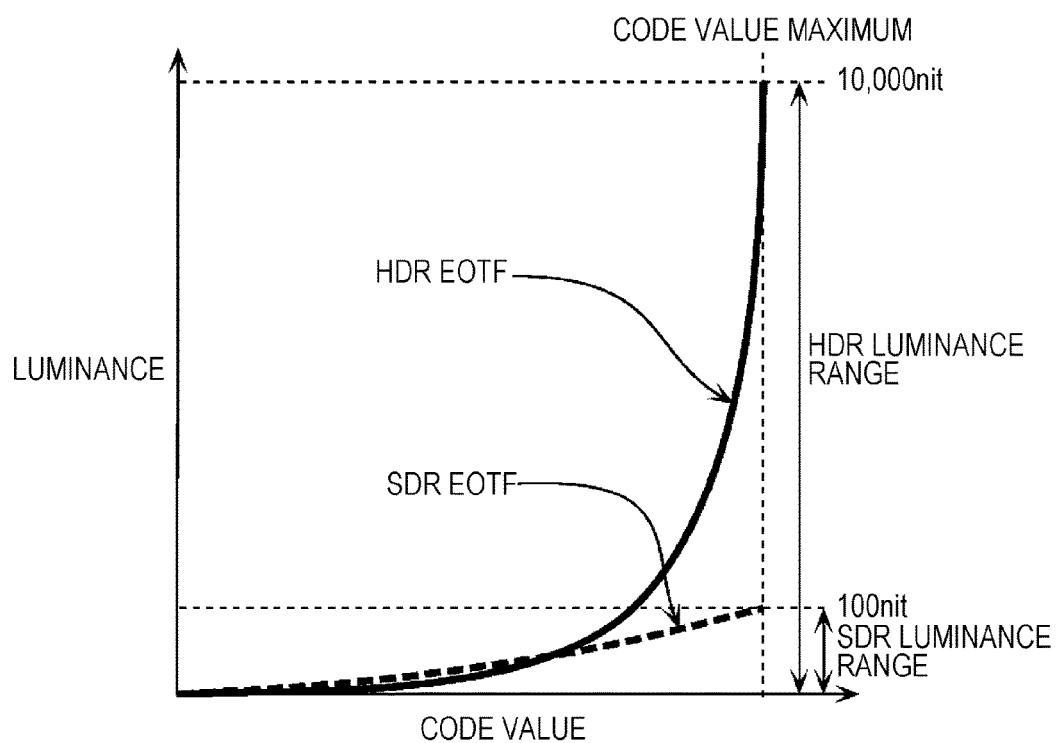
FIG. 36A is a view illustrating an example of an EOTF (Electro-Optical Transfer Function) which supports the HDR and the SDR, respectively.

Further, types of the EOTF function (curve) include an HDR EOTF and an SDR EOTF illustrated in FIG. 36A, for example.

Thus, a content data generating method according to the present exemplary embodiment is a content data generating method for generating content data, and includes: a first generating step of generating video signals, and static HDR meta data (first meta data) including information which is commonly used for a plurality of images (video signals configuring continuous playback units) included in the continuous playback units of the video signals, and which relates to a luminance range of the video signals; and a second generating step of generating content data by associating the continuous playback units and the static HDR meta data. For example, the information which relates to the luminance range of the video signals is information for converting the luminance range of the video signals.

Further, the static HDR meta data includes information for specifying an EOTF of associating a plurality of luminance values and a plurality of code values. Furthermore, a luminance value of the video signal is encoded as a code value.

Still further, the static HDR meta data further includes information indicating a luminance value of a video signal whose brightness is a predetermined reference or information indicating a point at which EOTF characteristics change. For example, the static HDR meta data includes information (Diffuse White value) indicating a luminance value corresponding to white of a video signal.

Further, in the first generating step, dynamic HDR meta data (second meta data) which is information commonly used for units subdivided compared to the continuous playback units and which is information related to the luminance range of the video signals is further generated. For example, the information related to the luminance range of the video signals is information for converting the luminance range of the video signals.

The dynamic HDR meta data is a parameter indicating mastering characteristics which are different per scene. The mastering characteristics described herein indicate a relationship between an original (pre-mastering) luminance and a mastered luminance. For example, the parameter indicating the mastering characteristics is same information as the above static HDR meta data, in other words, at least one of pieces of information included in the static HDR meta data.

Figure 7:
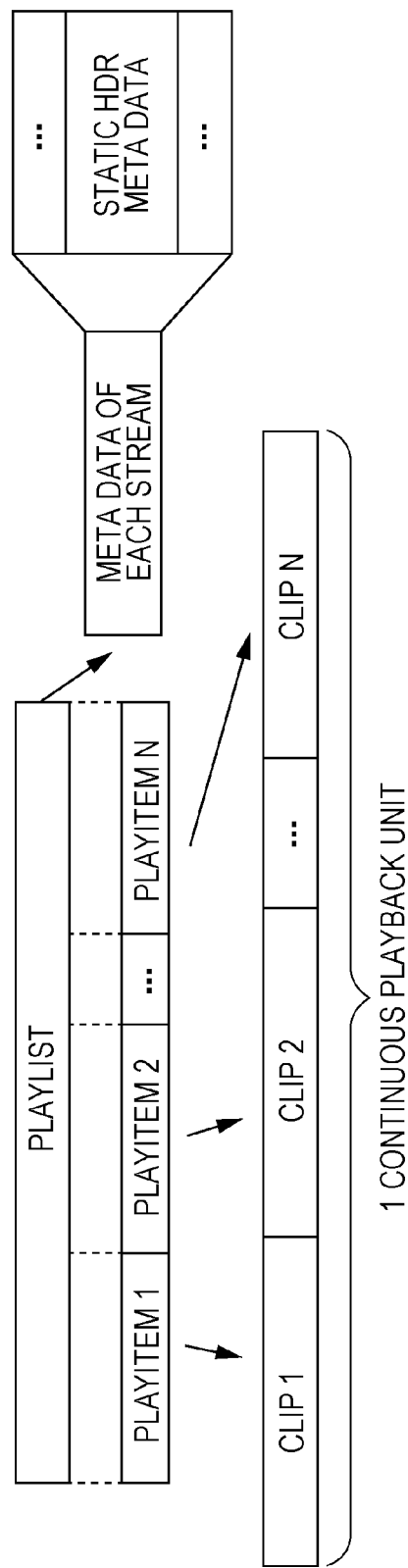
FIG. 7 is a view illustrating a storage example of static HDR meta data.

FIG. 7 is a view illustrating a storage example of static HDR meta data. This example is an example where static HDR meta data is stored in a playlist in a package medium such as a Blu-ray disc.

The static HDR meta data is stored as one of items of meta data of each stream to which a reference is made from a playlist. In this case, the static HDR meta data is fixed in playlist units. That is, the static HDR meta data is associated with each playlist and stored.

Further, according to the OTT, static HDR meta data may be stored in a manifest file to which a reference is made before a stream is obtained. That is, according to the content data generating method according to the present exemplary embodiment, a video signal may be generated as a video stream, and static HDR meta data may be stored in a manifest file to which a reference is made before the video stream is obtained.

Further, in case of broadcasting, static HDR meta data may be stored in a descriptor indicating a stream attribute. That is, according to the content data generating method according to the present exemplary embodiment, content data may be generated as a video stream, and static HDR meta data may be stored as an identifier indicating a video stream attribute independently from the video stream. For example, the static HDR meta data can be stored as a descriptor according to MPEG2-TS (Moving Picture Experts Group 2-Transport Stream).

Further, when static HDR meta data is fixed per title, static HDR meta data may be stored as management information indicating a title attribute.

Furthermore, in this example, static HDR meta data for an HDR is stored by using a mechanism which stores various items of meta data in a playlist in a Blu-ray disc. Hence, a presence of static HDR meta data needs to be defined in a playlist from a viewpoint of application standards or a device such of Blu-ray or the like. Hence, it is necessary to revise Blu-ray standards to newly provide new HDR static meta data. Further, a capacity is defined, and therefore it is difficult to limitlessly store items of static HDR meta data for an HDR option technique.

7. HDR Meta Data 2

Figure 8:
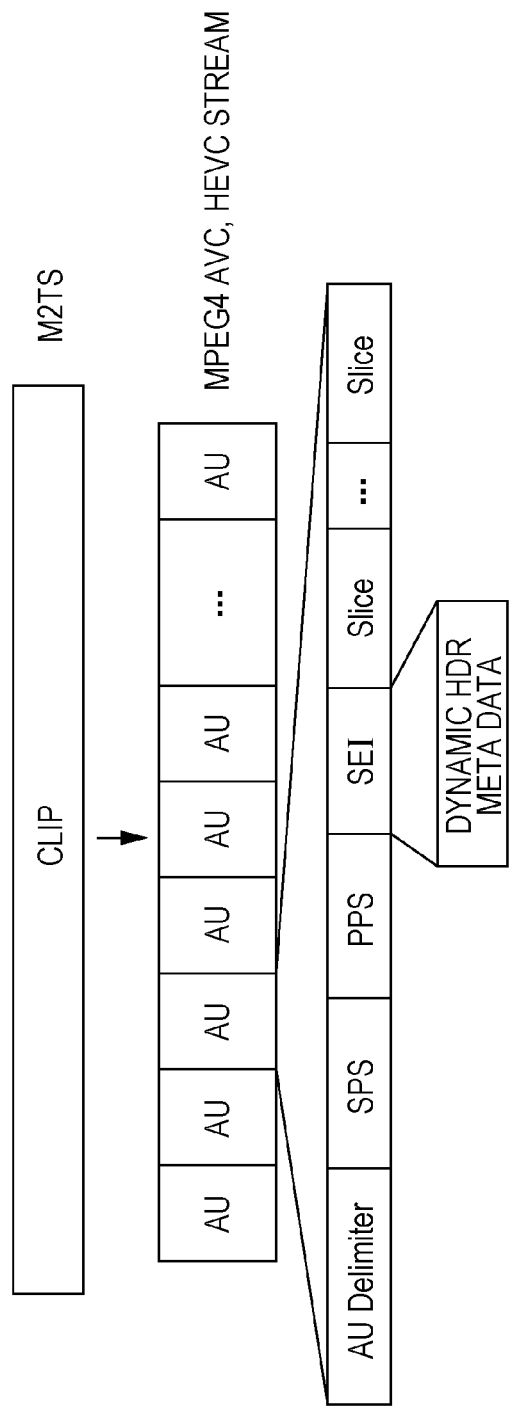
FIG. 8 is a view illustrating a storage example of dynamic HDR meta data.

FIG. 8 is a view illustrating an example where dynamic HDR meta data is stored in a video stream. According to MPEG-4 AVC (Advanced Video Coding) or HEVC (High Efficiency Video Coding), information related to stream playback control is stored by using a data structure called SEI (Supplemental Enhancement Information). Hence, for example, dynamic HDR meta data is stored in SEI.

The dynamic HDR meta data is assumed to be updated per scene. A scene head is a head access unit (AU) in random access units such as GOP (Group Of Pictures). Hence, dynamic HDR meta data may be stored in a head access unit in a decoding order in the random access units. The head access unit in the random access units is an IDR (Instantaneous Decoder Refresh) picture or a non-IDR I picture to which a SPS (Sequence Parameter Set) is added. Hence, a receiving-side device can obtain dynamic HDR meta data by detecting a NAL (Network Abstraction Layer) unit configuring a head access unit in the random access units. Alternatively, a unique type may be allocated to SEI in which dynamic HDR meta data is stored.

In addition, a type of the EOTF function may be stored as stream attribute information of a SPS. That is, according to the content data generating method according to the present exemplary embodiment, content data may be generated as a video stream encoded according to HEVC, and information for specifying the EOTF may be stored in a SPS included in a video stream.

Further, in this example, a mechanism which stores option data according to MPEG is used, and dynamic HDR meta data is stored in a video elementary stream. Hence, a presence of dynamic HDR meta data is not known from a viewpoint of application standards or a device of Blu-ray or the like. Hence, it is possible to record dynamic HDR meta data by using only the mechanism which stores option data according to MPEG without revising the Blu-ray standards. Further, an area to be used is a SEI area, so that it is also possible to store a plurality of items of option dynamic HDR meta data.

8. Method for Storing Dynamic HDR Meta Data

Figure 9:
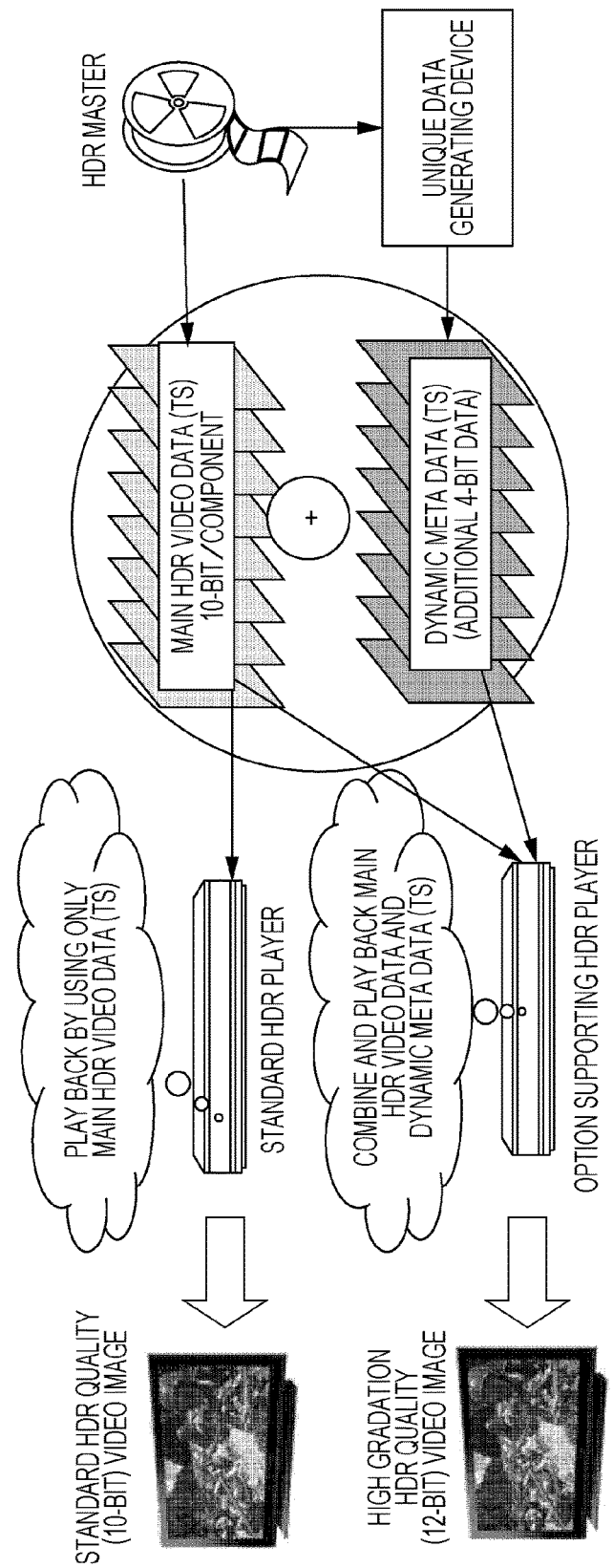
FIG. 9 is a view illustrating a storage example of dynamic HDR meta data.

FIG. 9 is a view illustrating an example where dynamic HDR meta data is stored in a TS stream format different from that of a main video image.

Blu-ray has a function of synchronizing and playing back two TS streams. This two TS stream synchronizing/playback function includes a 2TS playback function of synchronizing and playing back two individually managed TS streams in a disk, and a 1TS playback function of interleaving two streams to use as one TS stream.

By using this two TS stream synchronizing/playback function and storing dynamic HDR meta data in a TS stream format, the playback device can use dynamic HDR meta data in synchronization with main HDR video images. Consequently, a normal HDR player can play back only main HDR video images, and obtain video images of standard HDR quality. Further, an option supporting HDR player can play back high gradation HDR quality video images by using dynamic HDR meta data stored in a TS.

In this example, dynamic HDR meta data is stored in an auxiliary TS stream by using a mechanism which stores two TS streams of Blu-ray. Hence, a presence of dynamic HDR meta data is recognized as a TS stream from a viewpoint of application standards or a device of Blu-ray or the like. Hence, it is necessary to revise the Blu-ray standards. Further, it is possible to simultaneously store TS streams of two types of options.

9. Method for Transmitting Static HDR Meta Data

Figure 10:
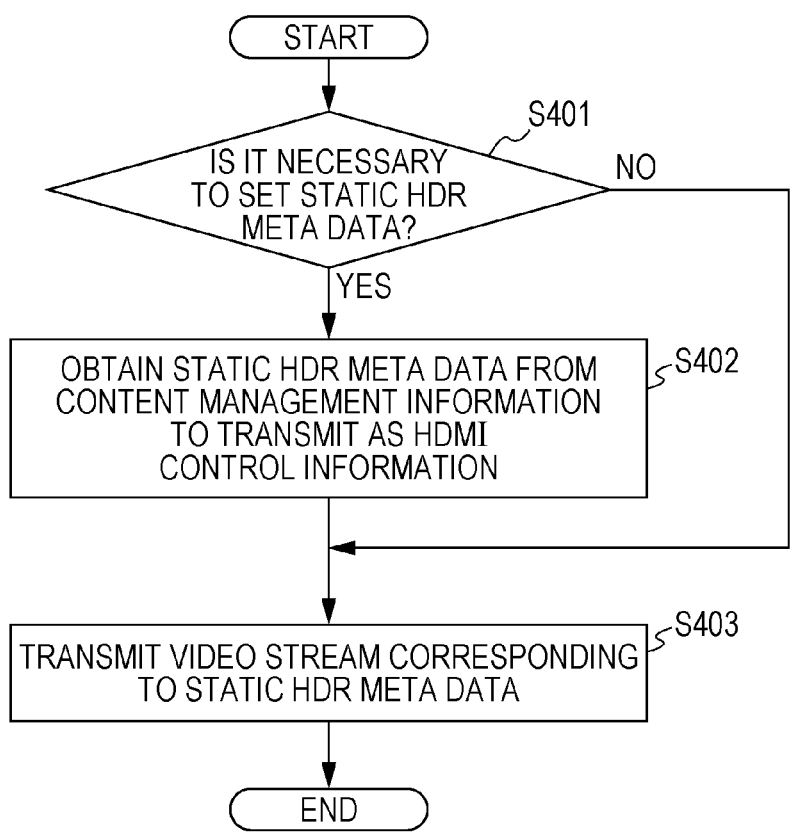
FIG. 10 is a flowchart of a method for transmitting static HDR meta data.

FIG. 10 is a view illustrating a method for transmitting static HDR meta data. FIG. 10 illustrates a flowchart illustrating an example of an operation of transmitting an HDR signal to a display device from a playback device such as a BD player (Blu-ray device) or a recorder according to a transmission protocol such as HDMI.

That static HDR meta data is fixed in title units or playlist units has been described above. Hence, when it is necessary to set static HDR meta data (Yes in S401), the playback device obtains the static HDR meta data from content management information during a start of playback of a title or a playlist, and stores and transmits the obtained static HDR meta data as HDMI control information. That is, prior to a start of transmission of a video signal configuring a title or a playlist, the playback device obtains static HDR meta data corresponding to the title or the playlist, and transmits the obtained static HDR meta data as HDMI control information (S402). More generally, the playback device may transmit static HDR meta data as initialization information when a HDMI initialization process between the playback device and the display device is performed.

Subsequently, the playback device transmits a video stream corresponding to the static HDR meta data (S403). In addition, transmitted static HDR meta data is effective for this video stream.

Thus, a video stream transmitting method according to the present exemplary embodiment is a video stream transmitting method for transmitting a video stream (video stream), and includes: an obtaining step of obtaining content data including video signals, and static HDR meta data (first meta data) which is information which is commonly used for a plurality of images included in the continuous playback units, and which relates to a luminance range of the video signals; and a transmitting step of transmitting a video stream corresponding to the video signals, and static HDR meta data.

For example, in the transmitting step, the video stream and the static HDR meta data are transmitted according to a HDMI communication protocol.

Further, the dynamic HDR meta data is transmitted as part of a video stream (SEI).

In addition, the playback device may transmit dynamic HDR meta data as a HDMI control signal at a timing at which the dynamic HDR meta data becomes effective. In this case, the playback device provides identifiers for the static HDR meta data and the dynamic HDR meta data to be identified from each other, and transmit the static HDR meta data and the dynamic HDR meta data.

Further, only a data structure of a container for storing dynamic HDR meta data may be defined in a control signal, and a copy of contents of SEI may be enabled as payload data of the container. Consequently, it is possible to support even an update of a syntax of dynamic HDR meta data included in SEI without changing the mounted playback device such as a BD player.

Similarly, by enabling copy and transmission of static HDR meta data in content management information, it is possible to support a change of a syntax of the static HDR meta data without changing the mounted playback device. That is, a data structure of a container for storing static HDR meta data is defined, so that, in the transmitting step, the static HDR meta data included in content data may be copied to a payload of the container to transmit the container.

Further, dynamic HDR meta data stored in a TS stream is synthesized with a main HDR video signal by some method, and is transmitted as a new video signal (high gradation HDR video images in an example in FIG. 9) according to HDMI.

10. Method for Processing HDR Meta Data

Figure 11:
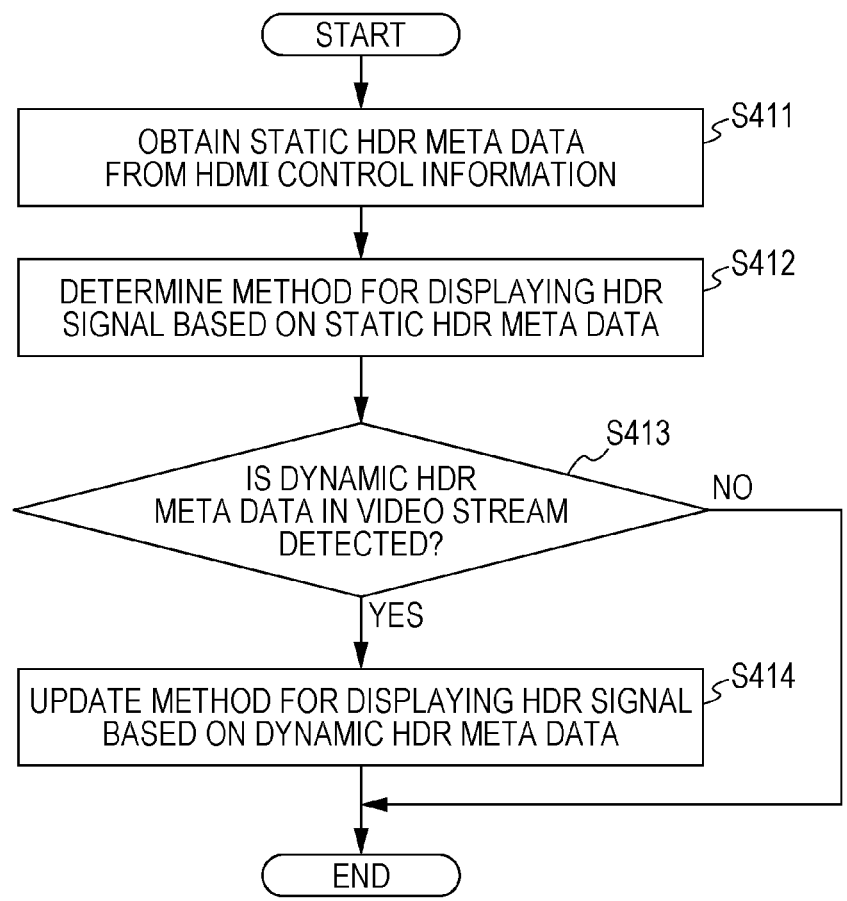
FIG. 11 is a flowchart of a method for processing HDR meta data.

FIG. 11 is a flowchart illustrating an example of a method for processing HDR meta data in case where the display device displays an HDR signal. First, the display device obtains static HDR meta data from HDMI control information (S411), and determines a method for displaying an HDR signal based on the obtained static HDR meta data (S412).

In addition, when the control information does not include the static HDR meta data, the display device determines a method for displaying an HDR signal based on a predetermined value of application standards or default settings of the display device. That is, according to the video display method according to the present exemplary embodiment, when static HDR meta data cannot be obtained, a video display method matching a video signal is determined based on the predetermined value or the settings.

Further, when detecting dynamic HDR meta data in SEI in a video stream (Yes in S413), the display device updates a method for displaying an HDR signal based on the dynamic HDR meta data (S414). That is, according to the video display method according to the present exemplary embodiment, when static HDR meta data is obtained, a display method is determined based on the obtained static HDR meta data to display video images. Further, when dynamic HDR meta data is obtained, the display method determined based on the static HDR meta data is updated to the display method determined based on dynamic HDR meta data to display video images. Alternatively, a display method may be determined based on both of static HDR meta data and dynamic HDR meta data.

In addition, when the display device does not support obtaining dynamic HDR meta data, the display device may operate based only on static HDR meta data. Further, even when the display device supports obtaining dynamic HDR meta data, the display device cannot update a method for displaying an HDR signal in synchronization with a presentation time stamp (PTS) of an access unit in which meta data is stored in some cases. In this case, after obtaining meta data, the display device may update a display method from an access unit displayed subsequent to the earliest time at which the display method can be updated.

In addition, it is possible to update and add parameters by allocating version information to HDR meta data. Consequently, the display device can determine whether or not it is possible to interpret HDR meta data based on version information of the HDR meta data. Alternatively, HDR meta data may be configured by a basic portion and an extension portion, and a parameter may be updated or added by changing the extension portion without updating the basic portion. That is, each of static HDR meta data and dynamic HDR meta data may include a plurality of versions, and may include a basic portion which is commonly used between a plurality of versions, and an extension portion which differs per version. By so doing, it is possible to secure backward compatibility of the display device based on HDR meta data of the basic portion.

Thus, the video display method according to the present exemplary embodiment is a video display method for displaying video images based on video streams, and includes: an obtaining step of obtaining a video stream corresponding to the video signals, and static HDR meta data (first meta data); and a display step of determining a display method for displaying the video images corresponding to the video signals based on the static HDR meta data and displaying the video image.

Figure 12:
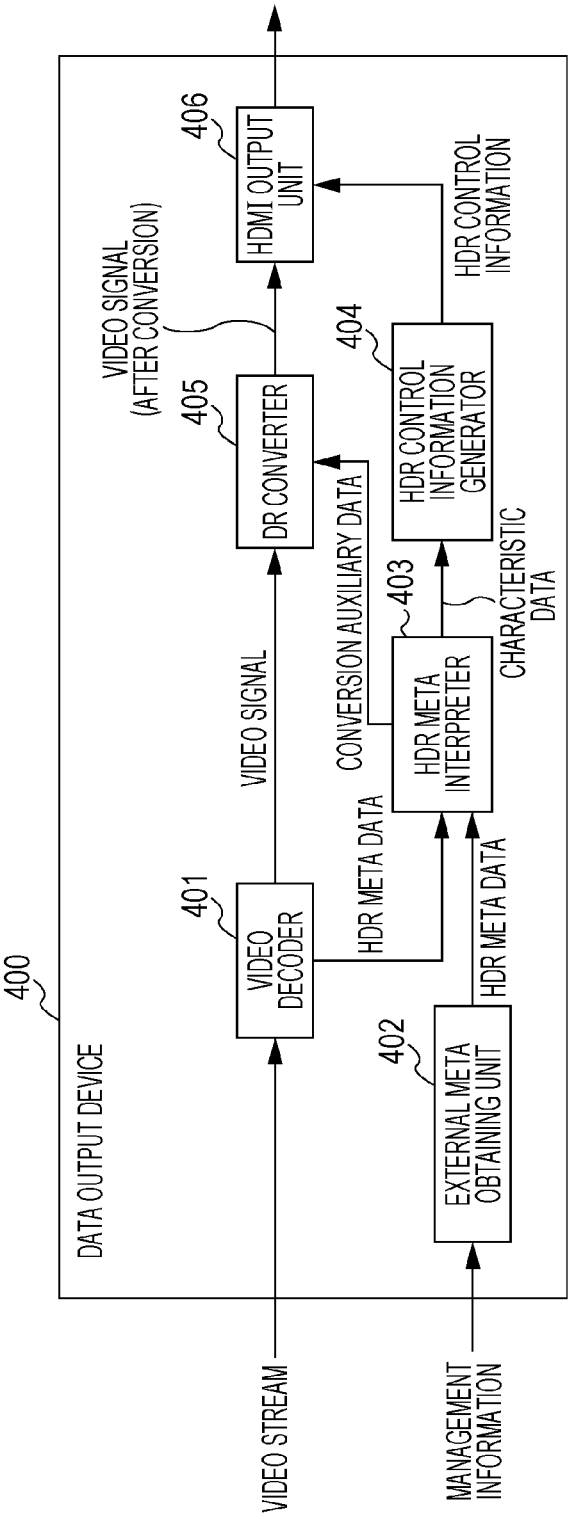
FIG. 12 is a block diagram illustrating a configuration of a data output device.

Further, a luminance value of the video signal is encoded as a code value. Static HDR meta data includes information for specifying an EOTF of associating a plurality of luminance values and a plurality of code values. In the display step, video images are generated by using the EOTF specified by the static HDR meta data and converting the code value indicated by the video signal into a luminance value 11. Data Output Device FIG. 12 is a block diagram illustrating a configuration of data output device 400 such as a BD layer which outputs HDR signals. HDR meta data input to data output device 400 includes characteristics data indicating mastering characteristics of an HDR signal, and conversion auxiliary data indicating a tone mapping method for converting an HDR signal into an SDR signal or for converting a dynamic range of the HDR signal. These two types of items of meta data are stored as static HDR meta data or dynamic HDR meta data as described with reference to FIGS. 7 and 8. Further, the static HDR meta data is stored in at least one of content management information and a video stream.

Data output device 400 includes video decoder 401, external meta obtaining unit 402, HDR meta interpreter 403, HDR control information generator 404, DR converter 405 and HDMI output unit 406.

Video decoder 401 generates a video signal (first video signal) by decoding a video stream which is a video encoded stream, and outputs the resulting video signal to DR converter 405. Further, video decoder 401 obtains HDR meta data (second meta data) (static HDR meta data or dynamic HDR meta data) in the video stream. More specifically, video decoder 401 outputs to HDR meta interpreter 403 HDR meta data stored in a SEI message or the like according to MPEG-4 AVC or HEVC.

External meta obtaining unit 402 obtains static HDR meta data (first meta data) stored in the content management information such as a playlist, and outputs the obtained static HDR meta data to HDR meta interpreter 403. In this regard, in the content management information, dynamic HDR meta data which can be changed in predetermined units, such as a playitem, which enable a random access may be stored. In this case, external meta obtaining unit 402 obtains dynamic HDR meta data from the content management information, and outputs the obtained dynamic HDR meta data to HDR meta interpreter 403.

HDR meta interpreter 403 determines a type of HDR meta data output from video decoder 401 or external meta obtaining unit 402, outputs characteristics data to HDR control information generator 404 and outputs conversion auxiliary data to DR converter 405.

In addition, when both of video decoder 401 and external meta obtaining unit 402 obtain static HDR meta data, only the static HDR meta data output from external meta obtaining unit 402 may be used as effective meta data. That is, there is a case where the first meta data obtained by external meta obtaining unit 402 and the second meta data obtained by video decoder 401 are static HDR meta data which is commonly used for a plurality of images included in continuous playback units of the first video signal. In this case, when both of the first meta data and the second meta data are obtained, HDR meta interpreter 403 obtains characteristics data and conversion auxiliary data by analyzing the first meta data.

Alternatively, HDR meta interpreter 403 may use static HDR meta data as effective meta data when external meta obtaining unit 402 obtains the static HDR meta data, and may overwrite static HDR meta data over the effective meta data when video decoder 401 obtains the static HDR meta data. That is, there is a case where the first meta data obtained by external meta obtaining unit 402 and the second meta data obtained by video decoder 401 are static HDR meta data which is commonly used for a plurality of images included in continuous playback units of the first video signal. In this case, when only the first meta data of the first meta data and the second meta data is obtained, HDR meta interpreter 403 obtains characteristics data and conversion auxiliary data by analyzing the first meta data. When the second meta data is obtained, HDR meta interpreter 403 switches meta data to use from the first meta data to the second meta data.

HDR control information generator 404 generates HDR control information according to HDMI based on the characteristics data, and outputs the generated HDR control information to HDMI output unit 406. In this regard, as for dynamic HDR meta data, an output timing of HDR control information in HDMI output unit 406 is determined such that it is possible to output HDR control information in synchronization with a video signal whose meta data is effective. That is, HDMI output unit 406 outputs HDR control information in synchronization with a video signal (video signal) whose meta data is effective.

DR converter 405 converts a decoded video signal into an SDR signal and converts a dynamic range based on conversion auxiliary data. In this regard, when the display device connected with data output device 400 supports an input of HDR signals, DR converter 405 does not need to perform conversion. Hence, by checking whether or not the connection destination display device supports an input of HDR signals by an initialization process according to HDMI, data output device 400 may determine whether or not conversion process is necessary. When it is determined that the conversion process is unnecessary, a first video signal obtained by video decoder 401 is input to HDMI output unit 406 without DR converter 405.

That is, HDMI output unit 406 outputs the first video signal and the HDR control information to the display device when the display device connected to data output device 400 supports a video output of a luminance range of the HDR signal (first video signal). Further, HDMI output unit 406 outputs a second video signal obtained by converting an HDR into an SDR, and the HDR control information to the display device when the display device connected to data output device 400 does not support a video output of a luminance range of the HDR signal (first video signal). Furthermore, HDMI output unit 406 determines whether or not the display device supports a video output of a luminance range of an HDR signal (first video signal) by a transmission protocol (e.g. HDMI) initialization process.

HDMI output unit 406 outputs the video signal output from DR converter 405 or video decoder 401 and the HDR control information according to a HDMI protocol.

In addition, data output device 400 can use the same configuration even when receiving and outputting broadcast or OTT content. Further, when data output device 400 and the display device are included in a single device, HDMI output unit 406 is not necessary.

Furthermore, as described above, data output device 400 includes external meta obtaining unit 402 which obtains meta data from control information or the like, and video decoder 401 includes a function of obtaining meta data from a video stream. However, data output device 400 may include one of external meta obtaining unit 402 and the function.

Further, an example where data output device 400 outputs data (the video signal and the HDR control information) according to HDMI has been described above.

However, data output device 400 may output data according to an arbitrary transmission protocol.

Thus, data output device 400 includes: a decoder (video decoder 401) which generates a first video signal of a first luminance range (HDR) by decoding a video stream; an obtaining unit (at least one of video decoder 401 and external meta obtaining unit 402) which obtains first meta data related to a luminance range of the first video signal; an interpreter (HDR meta interpreter 403) which obtains characteristics data indicating the luminance range of the first video signal by interpreting the first meta data; a control information generator (HDR control information generator 404) which converts the characteristics data into HDR control information according to a predetermined transmission protocol (e.g. HMDI); and an output unit (HDMI output unit 406) which outputs the HDR control information according to the predetermined transmission protocol.

Consequently, data output device 400 can generate the control information based on the characteristics data included in the meta data.

Further, the interpreter (HDR meta interpreter 403) further obtains conversion auxiliary data for converting a luminance range of a first video signal, by interpreting the first meta data. Data output device 400 further includes a converter (DR converter 405) which generates a second video signal of a luminance range narrower than the luminance range of the first video signal by converting the luminance range of the first video signal based on the conversion auxiliary data. The output unit (HDMI output unit 406) further outputs at least one of the first video signal and the second video signal according to the predetermined transmission protocol.

Consequently, data output device 400 can change the luminance range of the first video signal by using the conversion auxiliary data included in the meta data.

Further, the decoder (video decoder 401) obtains the second meta data (HDR meta data) related to the luminance range of the first video signal from the video stream. The interpreter (HDR meta interpreter 403) obtains characteristics data and the conversion auxiliary data by analyzing at least one of the first meta data and the second meta data.

Further, as illustrated in FIG. 6, static HDR meta data includes required meta data and selected meta data, and dynamic HDR meta data includes only selected meta data. That is, static HDR meta data is used at all times, and dynamic HDR meta data is selectively used. Thus, the first meta data obtained by external meta obtaining unit 402 or the second meta data obtained by video decoder 401 includes static HDR meta data (static meta data) which is commonly used for a plurality of images included in continuous playback units of a video signal and includes characteristics data. HDR control information generator 404 converts the characteristics data included in the static HDR meta data into HDR control information according to the predetermined transmission protocol. HDMI output unit 406 outputs the HDR control information based on the static HDR meta data when outputting the first video signal (HDR signal).

Further, the first meta data obtained by external meta obtaining unit 402 or the second meta data obtained by video decoder 401 further includes dynamic HDR meta data (dynamic meta data) which is commonly used for units subdivided compared to the continuous playback units of the video signal and includes characteristics data. HDR control information generator 404 converts the characteristics data included in the static HDR meta data and the characteristics data included in the dynamic HDR meta data, into HDR control information according to the predetermined transmission protocol. HDMI output unit 406 outputs the HDR control information based on the static HDR meta data and the dynamic HDR meta data when outputting the first video signal (HDR signal).

Further, a data generating method according to the present disclosure is a data generating method performed by a data generating device, and includes: a first generating step of generating meta data related to a luminance range of a video signal; and a second generating step of generating a video stream including a video signal and meta data. Meta data includes characteristics data indicating the luminance range of the video signal, and conversion auxiliary data for converting the luminance range of the video signal.

12. Storage Example 1 of HDR Meta Data

Figure 13:
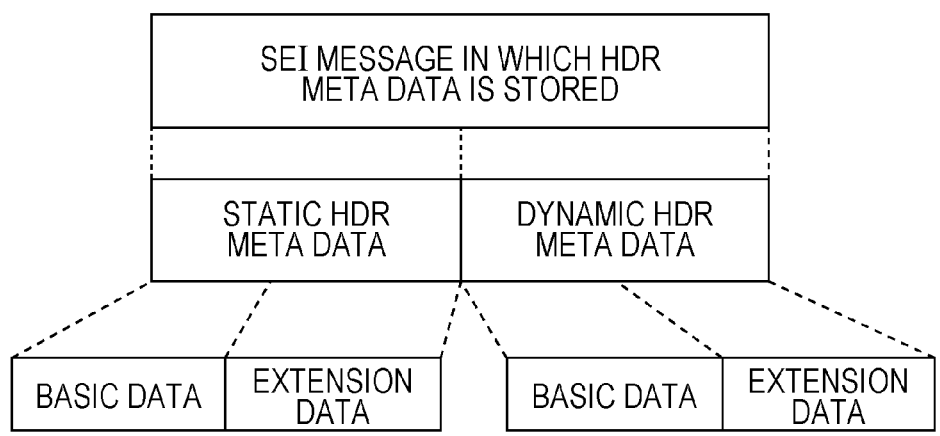
FIG. 13 is a view illustrating a data structure example of a SEI (Supplemental Enhancement Information) message in which HDR meta data is stored.

FIG. 13 is a view illustrating a data structure example of a SEI message in which HDR meta data is stored. As illustrated in FIG. 13, an HDR meta data dedicated SEI message may be defined. That is, meta data may be stored in a meta data dedicated message.

Further, HDR meta data may be stored in a general-purpose user data storage SEI message, and information (HDR extension identification information described below) indicating that the HDR meta data is stored in a payload portion of the message may be provided.

HDR meta data includes static HDR meta data and dynamic HDR meta data. Further, flag information indicating whether or not static HDR meta data is stored, and flag information indicating whether or not dynamic HDR meta data is stored may be provided. Thus, it is possible to use three types of storage methods including a method for storing only static HDR meta data, a method for storing only dynamic HDR meta data and a method for storing both of the static HDR meta data and the dynamic HDR meta data.

Further, for each meta data, basic data (basic portion) which needs to be interpreted, and extension data (extension portion) which is optionally interpreted (whose interpretation is optional) may be defined. For example, type information indicating a type of meta data (basic data or extension data), and a size are included in header information, and a format of a container in which meta data is stored in a payload is defined. That is, meta data includes a payload, information indicating whether payload data is basic data or extension data, and information indicating a payload data size. In other words, meta data includes type information indicating a type of meta data. For example, basic data is stored in a container whose type value is 0. Further, a value equal to or more than 1 is allocated as a type value to the extension data, and this value indicates a type of the extension data.

The data output device and the display device refer to the type value, and obtain data of the container which the data output device and the display device can interpret. That is, the data output device (or the display device) determines whether or not the data output device (or the display device) can interpret meta data, by using the type information, and obtains characteristics data and conversion auxiliary data by interpreting the meta data when the data output device (or the display device) can interpret the meta data.

Further, meta data may be generated such that a maximum size of HDR meta data is set in advance and a total sum of sizes of basic data and extension data is the maximum size or less. That is, a maximum value of a data size of meta data is defined, and, according to the data generating method according to the present disclosure, the meta data is generated such that a total data size of the basic data and the extension data is the maximum value or less.

The data output device and the display device include memories which support this maximum size and, consequently, can guarantee that all HDR meta data can be stored in the memories. Alternatively, it is also possible to secure a data area corresponding to a fixed size of static HDR meta data or dynamic HDR meta data, and to use an area other than an area in which basic data is stored, for extension in future.

Such a data structure may be used to store HDR meta data in content management information.

By using a SEI area in this way, it is possible to relatively freely store option information.

13. Storage Example 2 of HDR Meta Data

Figure 14:
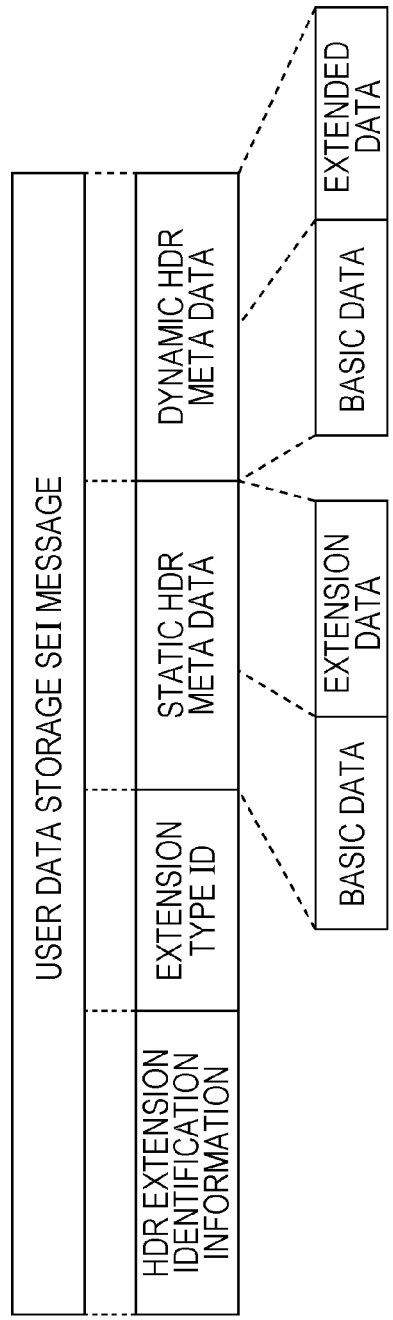
FIG. 14 is a view illustrating a data structure example of a SEI message in which HDR meta data is stored.

FIG. 14 is a view illustrating an example of a data structure in a case where HDR meta data is stored in a user data storage SEI message. The data structure is the same as the data structure in FIG. 14 except that a message includes HDR extension identification information and an extension type ID. The HDR extension identification information indicates that the message includes HDR meta data. An extension type ID indicates an HDR meta data version or the like. That is, meta data is stored in a SEI message according to HEVC, and the SEI message includes HDR extension identification information indicating whether or not the SEI message includes meta data.

In this case, when the user data storage SEI message including the HDR extension identification information is received, and when the display device connected to the data output device supports an input of an HDR signal and HDR control information, the data output device copies and outputs the received SEI message according to a protocol of an output I/F such as HDMI for the display device. That is, when a SEI message including HDR extension identification information indicating that meta data is included in the SEI message is obtained, and the data output destination display device supports an input of the HDR control information, the data output device outputs the SEI message as is according to a predetermined transmission protocol (e.g. HDMI).

Consequently, irrespectively of meta data contents, the data output device can output HDR meta data to the display device. According to this configuration, even when a new DR conversion process is developed in future to define new HDR meta data and a display device which supports this new HDR meta data is connected to a data output device which does not support new HDR meta data, it is possible to output new HDR meta data from the data output device to the display device. Further, the display device can perform a DR conversion process matching new HDR meta data.

14. Storage Example of a Plurality of Items of HDR Meta Data

Figure 15:
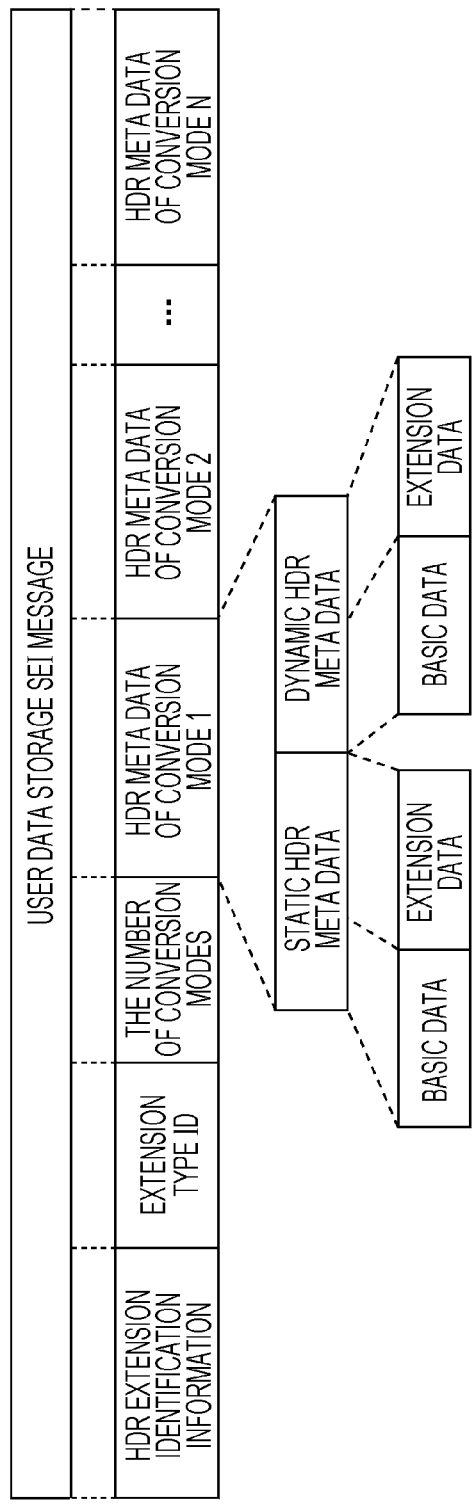
FIG. 15 is a view illustrating a data structure example of a SEI message in which HDR meta data is stored.

FIG. 15 is a view illustrating an example of a data structure in a case where a plurality of items of HDR meta data is stored in one user data storage SEI message. In this SEI message, a plurality of items of HDR meta data for a plurality of conversion modes (methods) related to conversion of a dynamic range (luminance range) is stored.

A field (a number of conversion modes) indicating the number of conversion modes of providing HDR meta data is added to the data structure illustrated in FIG. 15 compared to the data structure illustrated in FIG. 14. Further, a plurality of items of HDR meta data corresponding to each conversion mode is stored in order subsequent to the number of conversion modes.

That is, the data generating method according to the present exemplary embodiment is a data generating method performed by the data generating device, and includes: a first generating step of generating one or more items of meta data (HDR meta data) matching one or more conversion modes of converting a luminance range of a video signal; and a second generating step of generating a video stream including a video signal, the one or more items of meta data, and the number of conversion modes indicating the number of one or more conversion modes.

15. Configuration of Data Output Device

Figure 16:
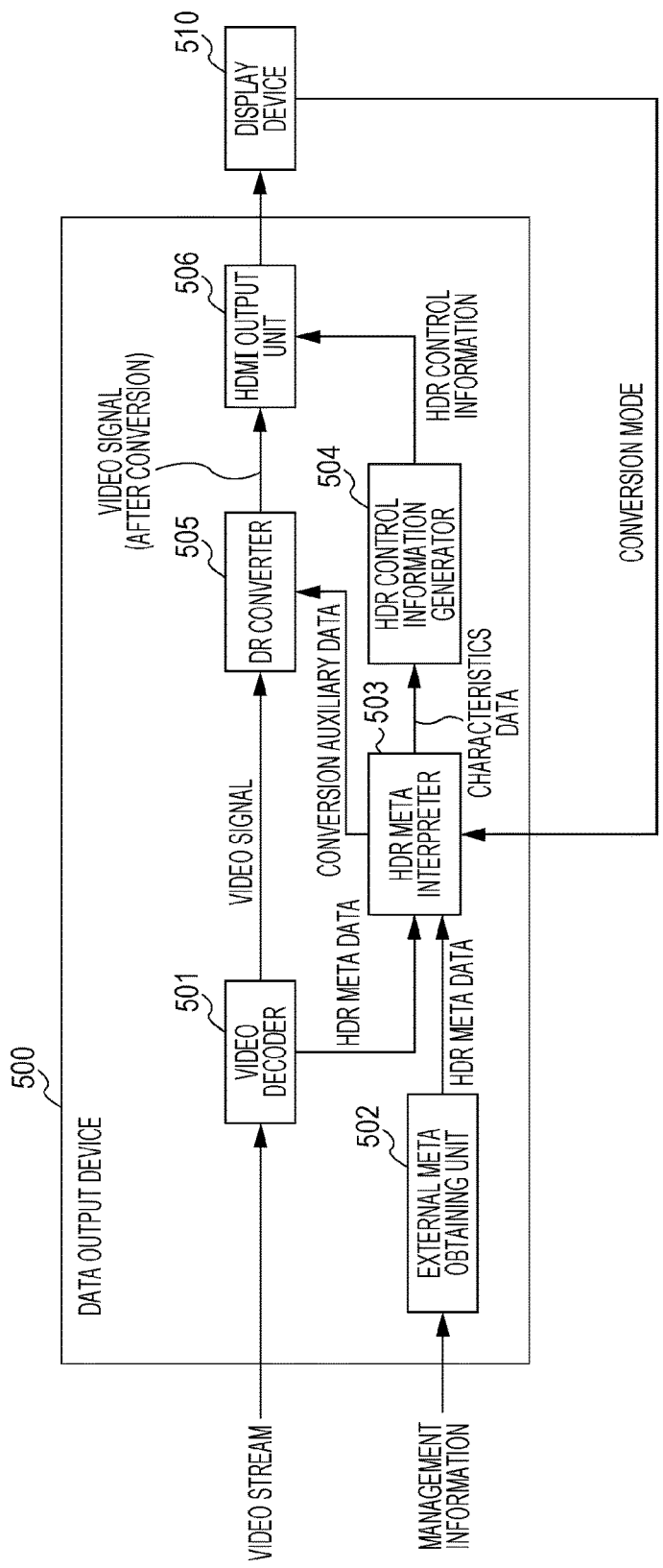
FIG. 16 is a block diagram illustrating a configuration example of a data output device.

FIG. 16 is a block diagram illustrating a configuration example of data output device 500 according to the present exemplary embodiment. This data output device 500 includes video decoder 501, external meta obtaining unit 502, HDR meta interpreter 503, HDR control information generator 504, DR converter 505 and HDMI output unit 506. In addition, operations of HDR meta interpreter 503 and DR converter 505 are different from those of data output device 400 illustrated in FIG. 12. That is, operations of video decoder 501, external meta obtaining unit 502, HDR control information generator 504 and HDMI output unit 506 are the same as operations of video decoder 401, external meta obtaining unit 402, HDR control information generator 404 and HDMI output unit 406.

Further, data output device 500 is connected with display device 510 (display), and outputs generated video signals and HDR control information to display device 510 according to a predetermined transmission protocol such as HDMI.

DR converter 505 and display device 510 each support a plurality of dynamic range conversion modes (converting methods). In this regard, "support" means having a function of performing a process of each conversion mode. First, HDR meta interpreter 503 obtains static HDR meta data and dynamic HDR meta data from external meta obtaining unit 502 and video decoder 501. In content management information or encoded video stream, a plurality of items of HDR meta data for a plurality of conversion modes is stored. HDR meta interpreter 503 determines a plurality of conversion modes matching a plurality of HDR meta data as a plurality of usable conversion modes.

Further, HDR meta interpreter 503 obtains information of a conversion mode of an HDR signal supported by display device 510 by communicating with display device 510 or via a network. Furthermore, HDR meta interpreter 503 determines (1) which one of data output device 500 and display device 510 performs a dynamic range conversion process and (2) a conversion mode to use, based on (1) a conversion mode matching HDR meta data, (2) a conversion mode supported by DR converter 505 and (3) a conversion mode supported by display device 510.

When it is determined that data output device 500 performs the conversion process, DR converter 505 converts an HDR signal into an SDR signal according to the conversion mode instructed by HDR meta interpreter 503. When it is determined that display device 510 determines a conversion process, data output device 500 transmits a video signal (HDR signal) to display device 510, and transmits HDR meta data which is necessary for conversion as a HDMI control signal (HDR control information) to display device 510.

In addition, as described above, DR converter 505 supports a plurality of conversion modes. However, DR converter 505 only needs to support one or more conversion modes. In this case, data output device 500 only needs to obtain one or more items of HDR meta data matching one or more conversion modes.

Thus, data output device 500 includes: a decoder (video decoder 501) which generates a first video signal by decoding a video stream; an obtaining unit (at least one of video decoder 501 and external meta obtaining unit 502) which obtains one or more items of meta data matching one or more first conversion modes of converting a luminance range of the video signal; an interpreter (HDR meta interpreter 503) which obtains characteristics data indicating a luminance range of the first video signal and conversion auxiliary data for converting the luminance range of the first video signal, by interpreting one of one or more items of first meta data; a control information generator (HDR control information generator 504) which converts the characteristics data into HDR control information according to a predetermined transmission protocol (e.g. HMDI); a converter (DR converter 505) which supports one or more second conversion modes of converting a luminance range of a video signal, and generates a second video signal of a luminance range narrower than the luminance range of the first video signal by performing a process of converting the luminance range of the first video signal according to one of the one or more second conversion modes based on the conversion auxiliary data; and an output unit (HDMI output unit 506) which outputs the second video signal and the HDR control information to display device 510 according to the predetermined transmission protocol. The interpreter (HDR meta interpreter 503) further determines which one of data output device 500 and display device 510 performs the above conversion process based on the one or more first conversion modes, the one or more second conversion modes and a third conversion mode which is supported by display device 510 and converts a luminance range of a video signal.

According to this, data output device 500 can determine which one of data output device 500 and display device 510 performs a conversion process based on the first conversion mode matching one or more items of meta data, the second conversion mode supported by data output device 500 and the third conversion mode supported by display device 510. Consequently, data output device 500 can determine a device which appropriately performs a conversion process.

In addition, the one or more second conversion modes supported by data output device 500 may include at least part of a plurality of first conversion modes matching the one or more items of meta data, or may not include any one of the one or more first conversion modes. Similarly, the third conversion mode supported by display device 510 may include at least part of the one or more first conversion modes, or may not include any one of the one or more first conversion modes. Further, the third conversion mode may include at least part of the one or more second conversion modes, or may not include any one of the one or more second conversion modes.

16. Configuration of DR Converter

Figure 17:
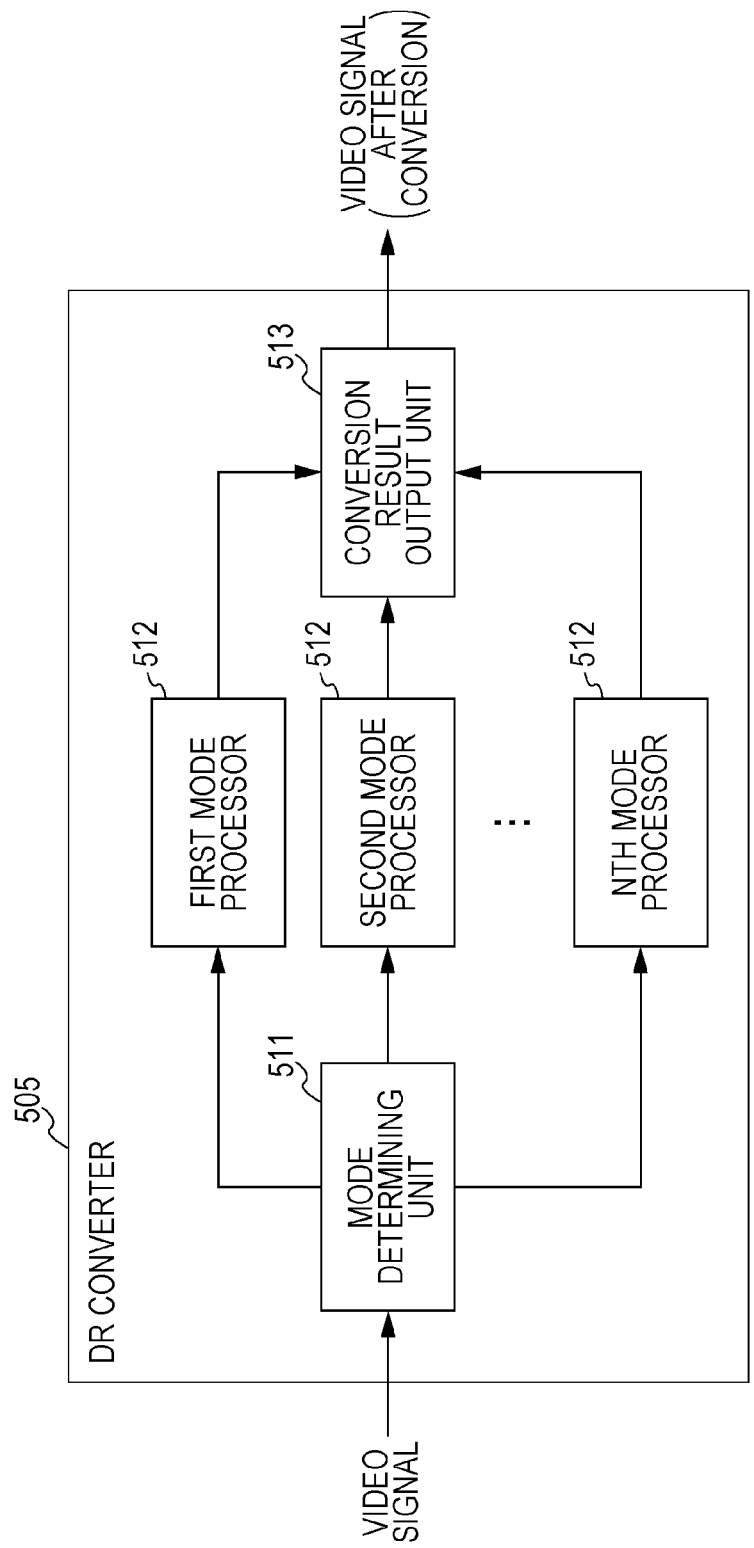
FIG. 17 is a block diagram illustrating a configuration example of a DR (Dynamic Range) converter.

A configuration example of DR converter 505 will be described below. FIG. 17 is a block diagram illustrating the configuration example of DR converter 505. This DR converter 505 includes mode determining unit 511, N mode processors 512 and conversion result output unit 513. N mode processors 512 each support each of N conversion modes (processing methods), and perform a process of a corresponding conversion mode. Mode determining unit 511 obtains a conversion mode instructed by HDR meta interpreter 503, and determines mode processor 512 which performs a conversion process. That is, mode determining unit 511 selects mode processor 512 which supports the conversion mode instructed by HDR meta interpreter 503. Determined mode processor 512 generates an SDR signal (converted video signal) by performing a process of converting an HDR signal (video signal). Conversion result output unit 513 outputs the converted SDR signal.

Figure 18:
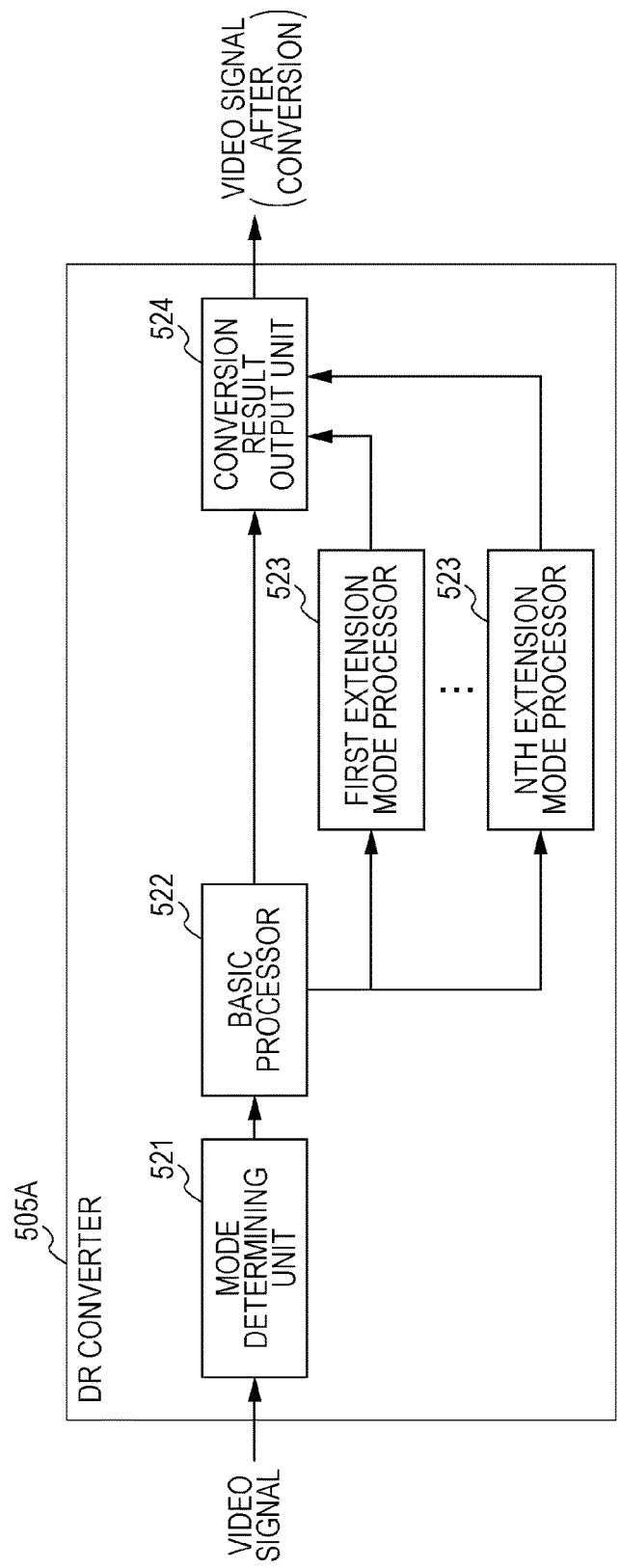
FIG. 18 is a block diagram illustrating a configuration example of the DR converter.

FIG. 18 is a block diagram illustrating a configuration example of DR converter 505A which is another example of DR converter 505. This DR converter 505 includes mode determining unit 521, basic processor 522, N extension mode processors 523 and conversion result output unit 524.

Basic processor 522 performs a default conversion process which is a common process among N conversion modes. N extension mode processors 523 perform a process performed by basic processor 522 and, in addition, an extension process of dynamically controlling parameters of a conversion process by using dynamic HDR meta data. Further, N extension mode processors 523 each support each of N conversion modes, and perform a corresponding conversion mode extension process. For example, basic processor 522 operates by using only static HDR meta data, and extension mode processor 523 operates by using static HDR meta data and, in addition, dynamic HDR meta data.

17. Operation Example of HDR Meta Interpreter

FIGS. 19 and 20 are views illustrating examples of instruction contents of HDR meta interpreter 503 based on a conversion mode of providing HDR meta data, whether or not data output device 500 supports each mode and whether or not display device 510 supports each mode. HDR meta interpreter 503 basically selects an operation which maximizes reproducibility for a master image, from selectable combinations. In this regard, the master image refers to an image output without changing a luminance range.

For example, in an example illustrated in FIG. 19, data output device 500 supports mode 1 and mode 2, and display device 510 does not support any conversion mode. In addition, between mode 1 and mode 2, mode 2 has higher reproducibility for the master image. Further, HDR meta interpreter 503 learns reproducibility of each mode for a master image in advance. In this case, HDR meta interpreter 503 determines that data output device 500 performs a conversion process, and selects mode 2 of the higher reproducibility between mode 1 and mode 2.

Further, in an example illustrated in FIG. 20, data output device 500 supports mode 1, and display device 510 supports mode 1 and mode 2. In this case, HDR meta interpreter 503 determines that display device 510 performs a conversion process, and selects mode 2 of the higher reproducibility between mode 1 and mode 2. Further, data output device 500 outputs HDR meta data matching a conversion process of mode 2 as HDMI control information (HDR control information) to display device 510. Display device 510 performs a conversion process of mode 2 by using the control information.

Thus, HDR meta interpreter 503 further determines as a conversion mode of a conversion process to be performed by data output device 500 a conversion mode which is included in the one or more first conversion modes matching the one or more items of meta data and which is included in the one or more second conversion modes supported by data output device 500. More specifically, HDR meta interpreter 503 further determines as a conversion mode of a conversion process to be performed by data output device 500 or display device 510 a conversion mode which is included in the one or more first conversion modes matching the one or more items of meta data and which is included in at least one of the one or more second conversion modes supported by data output device 500 and the third conversion mode supported by display device 510.

More specifically, HDR meta interpreter 503 determines as a conversion mode of a conversion process to be performed by data output device 500 or display device 510 a conversion mode of the highest reproducibility for a master image among a plurality of conversion modes included in a plurality of first conversion modes and included in at least one of a plurality of second conversion modes and the third conversion mode.

In other words, data output device 500 selects a mode of the highest reproducibility among conversion modes supported by data output device 500 and display device 510, and determines that one device of data output device 500 and display device 510 supporting the selected mode performs a conversion process.

More specifically, as illustrated in FIG. 19, HDR meta interpreter 503 determines that data output device 500 performs a conversion process when the determined conversion mode of the conversion process is included in the second conversion modes and is not included in the third conversion mode. Further, as illustrated in FIG. 20, HDR meta interpreter 503 determines that display device 510 performs a conversion process when the determined conversion mode of the conversion process is included in the third conversion mode and is not included in the second conversion modes.

According to this, data output device 500 can determine a conversion mode to use based on the first conversion modes matching one or more items of meta data, the second conversion modes supported by the data output device and the third conversion mode supported by the display device. Further, data output device 500 can select the conversion mode of the highest reproducibility for a master image and, consequently, can improve quality of video images to be displayed.

FIG. 21 is a view illustrating an example where a conversion process is determined according to whether or not data output device 500 can obtain parameters of display device 510. A parameter of display device 510 is a peak luminance of display device 510 (a maximum value of a luminance range which display device 510 can display) or a display mode which display device 510 can display. More specifically, this parameter indicates a currently viewing display mode as a display mode. For example, the display modes include a normal mode, a dynamic mode and a cinema mode.

In an example illustrated in FIG. 21, data output device 500 supports mode 1, mode 2 and mode 3, and display device 510 supports mode 1. Further, data output device 500 can obtain parameters of display device 510 for mode 1 and mode 2, and cannot obtain a parameter of display device 510 for mode 3. Furthermore, mode 2 has higher reproducibility than that of mode 1, and mode 3 has higher reproducibility than that of mode 2.

In this case, a mode of the highest reproducibility among the modes supported by data output device 500 and display device 510 is mode 3. However, data output device 500 cannot obtain the parameter of display device 510 for mode 3, and therefore mode 3 is excluded. Further, data output device 500 selects mode 2 whose reproducibility is the second highest to that of mode 3 and whose parameter can be obtained, as a conversion mode to use. Furthermore, data output device 500 obtains parameters which is necessary for mode 2, from display device 510, and performs a conversion process of mode 2 by using the obtained parameters.

Thus, HDR meta interpreter 503 further determines a conversion mode of a conversion process performed by data output device 500 or display device 510 according to whether or not it is possible to obtain from display device 510 parameters for each of a plurality of first conversion modes matching a plurality of items of meta data. More specifically, HDR meta interpreter 503 determines as a conversion mode of a conversion process to be performed by data output device 500 or display device 510 a conversion mode which is included in a plurality of first conversion modes and included in at least one of a plurality of second conversion modes and the third conversion mode, and which makes it possible to obtain the parameters from display device 510.

That is, data output device 500 selects a mode of the highest reproducibility among the conversion modes supported by data output device 500 and display device 510, and determines whether or not it is possible to obtain a parameter of display device 510 for the selected mode when only data output device 500 supports the selected mode. When the parameter can be obtained, data output device 500 selects this mode. Meanwhile, when the parameter cannot be obtained, data output device 500 selects another mode (a mode of the second highest reproducibility).

Thus, data output device 500 determines a conversion mode to use according to whether or not it is possible to obtain the parameter of display device 510 and, consequently, can select a more appropriate conversion mode.

18. Configuration Example 2 of Data Output Device

Figure 22:
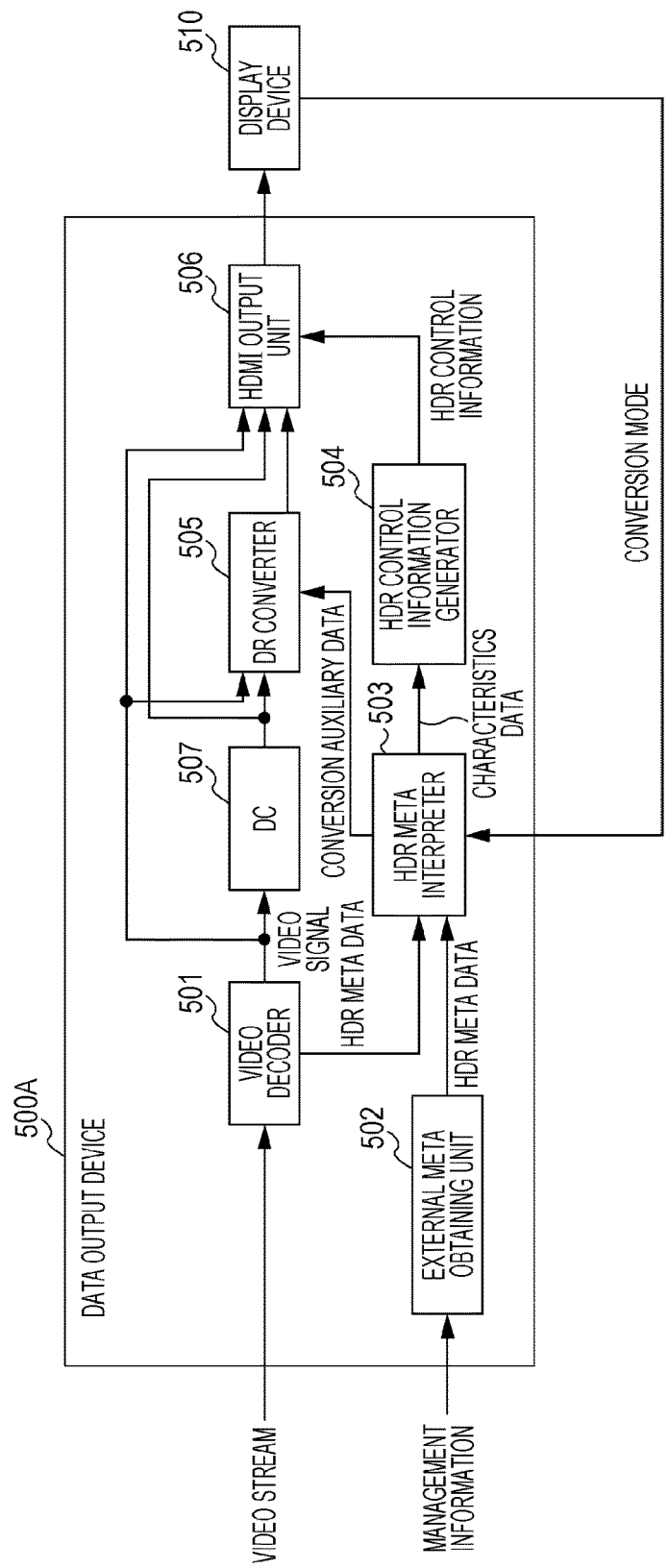
FIG. 22 is a block diagram illustrating a configuration example of the data output device.

Another configuration example of the data output device will be described below. FIG. 22 is a block diagram illustrating a configuration of data output device 500A. This data output device 500A further includes DC 507 compared to data output device 500 illustrated in FIG. 16. DC 507 down-converts a resolution of a video signal obtained by video decoder 501. For example, when a video signal is 4K, DC 507 down-converts a 4K video signal into a 2K video signal.

According to this configuration, data output device 500A can selectively perform an operation of (1) converting a 4K HDR signal into a 2K HDR signal to output, (2) converting the 4K HDR signal into the 2K HDR signal, and then changing the dynamic range in DR converter 505 to output and (3) converting the 4K SDR signal into a 2K SDR signal to output, according to a resolution and a dynamic range supported by display device 510. That is, data output device 500A can switch an operation according to a resolution of display device 510 and whether or not display device 510 supports an HDR signal.

FIG. 23 is a view illustrating an example of combinations of characteristics of a video signal of content (a resolution and a dynamic range (luminance range)), characteristics of display device 510 and an output signal of data output device 500A. Data output device 500A selects a format of an output signal to match a resolution of display device 510 and whether or not display device 510 supports an HDR signal, and controls DC 507 and DR converter 505 to generate an output signal of the selected format.

When, for example, a video signal of content is an HDR signal of a 4K resolution, and display device 510 does not support displaying the HDR signal of the 4K resolution and supports displaying an HDR signal of a 2K resolution, data output device 500A converts the video signal of the content into an HDR signal of the 2K resolution to output (see the combination example in the second row in FIG. 23). In this case, DC 507 converts a resolution of a video signal.

Further, when a video signal of content is an HDR signal of a 4K resolution, and display device 510 does not support displaying the HDR signal of the 4K resolution and an HDR signal of a 2K resolution, and supports displaying a 2K SDR signal, data output device 500A converts the video signal of the content into an SDR signal of the 2K resolution to output (see the combination example in the third row in FIG. 23). In this case, DC 507 converts a resolution of a video signal, and DR converter 505 converts a luminance range.

Consequently, display device 510 can more faithfully reproduce video signals of content. In addition, data output device 500A may convert a resolution or display device 510 may operate to convert a dynamic range as described with reference to FIG. 16.

Thus, data output device 500A includes a down-converter (DC 507) which generates a third video signal by lowering a resolution of the first video signal obtained by video decoder 501. The converter (DR converter 505) further generates a fourth video signal of a luminance range narrower than a luminance range of the third video signal by performing a process of converting the luminance range of the third video signal according to one of a plurality of second conversion modes based on the conversion auxiliary data. The output unit (HDMI output unit 506) further outputs the third video signal or the fourth video signal to display device 510.

Consequently, data output device 500A can change a resolution of a video signal to, for example, a resolution suitable to display device 510 or the like.

More specifically, when display device 510 does not support displaying a video image of a resolution of the first video signal, (1) the down-converter (DC 507) generates the third video signal and (2) the output unit (HDMI output unit 506) outputs the third video signal to display device 510. As illustrated in, for example, FIG. 23, when a resolution of a video signal is 4K and a resolution of display device 510 is 2K, a 2K output signal is output.

Further, when display device 510 does not support displaying a video image of a luminance range (HDR) of the first video signal, (1) the converter (DR converter 505) generates the second video signal of a luminance range (SDR) narrower than the luminance range (HDR) of the first video signal, and (2) the output unit (HDMI output unit 506) outputs the second video signal and HDR control information to display device 510. When, for example, a dynamic range (luminance range) of a video signal is an HDR and display device 510 does not support the HDR (in case of an SDR) as illustrated in FIG. 23, an HDR video signal is converted into an SDR video signal and the SDR video signal (output signal) is output.

Further, when display device 510 does not support displaying a video image of the first video signal, and does not support displaying a video image of the luminance range (HDR) of the first video signal, (1) the down-converter (DC 507) generates a third video signal, (2) the converter (DR converter 505) generates the fourth video signal of a luminance range (SDR) narrower than the luminance range (HDR) of the third video signal, and (3) the output unit (HDMI output unit 506) outputs the fourth video signal to display device 510. When, for example, a resolution of a video signal is 4K, a dynamic range (luminance range) of the video signal is an HDR, the resolution of display device 510 is 2K, and display device 510 does not support the HDR (in case of an SDR) as illustrated in FIG. 23, the 2K and SDR output signal is output.

19. Operation Model of Playing Back HDR Signal and 4K Signal

Figure 24:
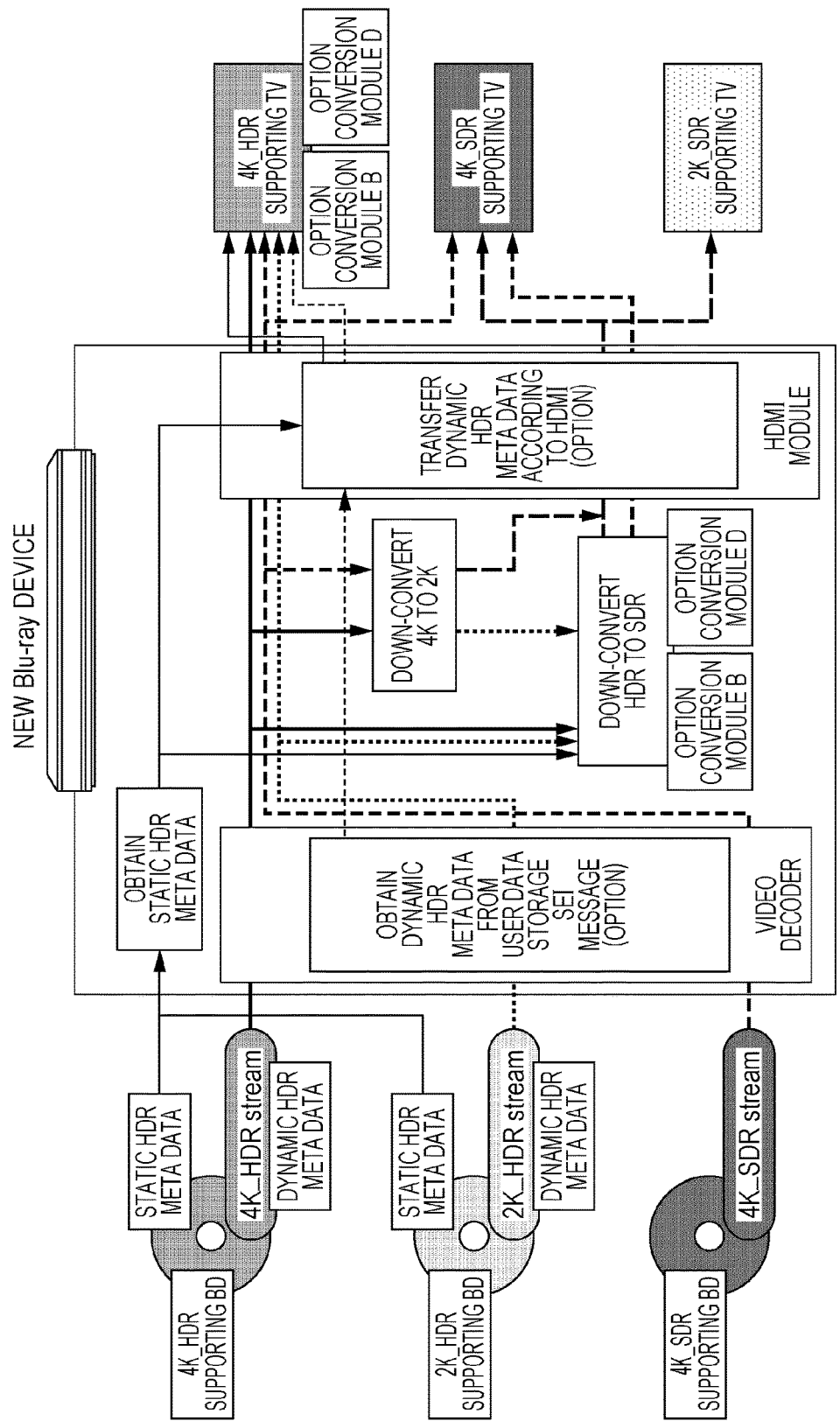
FIG. 24 is a view illustrating an example of an operation model of playing back various signals and outputting the signals to various TVs.

FIG. 24 is a view illustrating an example of an operation model of playing back a 4K HDR signal, a 2K HDR signal and a 4K SDR signal in a next-generation Blu-ray playback device, and outputting playback signals to an HDR supporting 4K TV, an HDR non-supporting 4K TV and an SDR supporting 2K TV.

The Blu-ray playback device obtains static HDR meta data stored in content management information, and dynamic HDR meta data stored in a video encoded stream. By using these items of HDR meta data, the Blu-ray playback device converts a video HDR signal into an SDR signal to output according to characteristics of an output destination TV connected according to HDMI, or outputs HDR meta data as a HDMI control signal.

Each process of converting an HDR signal into an SDR signal and a process of converting an HDR signal into a video signal of a luminance range matching a display device can be selected from a plurality of methods and implemented. By storing HDR meta data matching the implemented conversion process, in content management information or a video encoded stream during creation of content, it is possible to enhance an effect of the conversion process. The content management information or the encoded stream can store a plurality of items of HDR meta data per converting method.

In addition, the Blu-ray playback device may include a plurality of conversion processors such as option conversion module B or option conversion module D, may include only one conversion processor by taking into account a balance between device cost and performance or may not include a conversion processor. Similarly, an HDR supporting TV may include a plurality of conversion processors, may include only one conversion processor or may not include a conversion processor.

Further, similar to a user data storage SEI message illustrated in FIG. 14 or 15, HDR meta data is stored in a predetermined container which defines a format and an operation during an input. Consequently, even when a new conversion process is developed in future, new HDR meta data is defined and a display device which supports this new HDR meta data is connected to a Blu-ray device which does not support the new HDR meta data, it is possible to output new HDR meta data from the Blu-ray playback device to the display device. Further, the display device can perform a conversion process matching new HDR meta data. Consequently, when a new technique is developed, it is possible to support the new technique by a simple process of assigning an ID to new HDR meta data. Consequently, it is possible to enhance competitiveness of package media standards such as Blu-ray against applications such as OTT whose technical development is fast. In addition, the Blu-ray playback device which supports new HDR meta data may perform the new conversion process on video data in the playback device, and output the processed video data to the display device.

Further, which one of the Blu-ray playback device and a TV performs a conversion process is determined based on the methods illustrated in FIGS. 19 to 21. In addition, the playback device may down-convert a 4K signal into a 2K signal according to a resolution of the TV to output.

20. Method 1 for Storing HDR Meta Data

Figure 25:
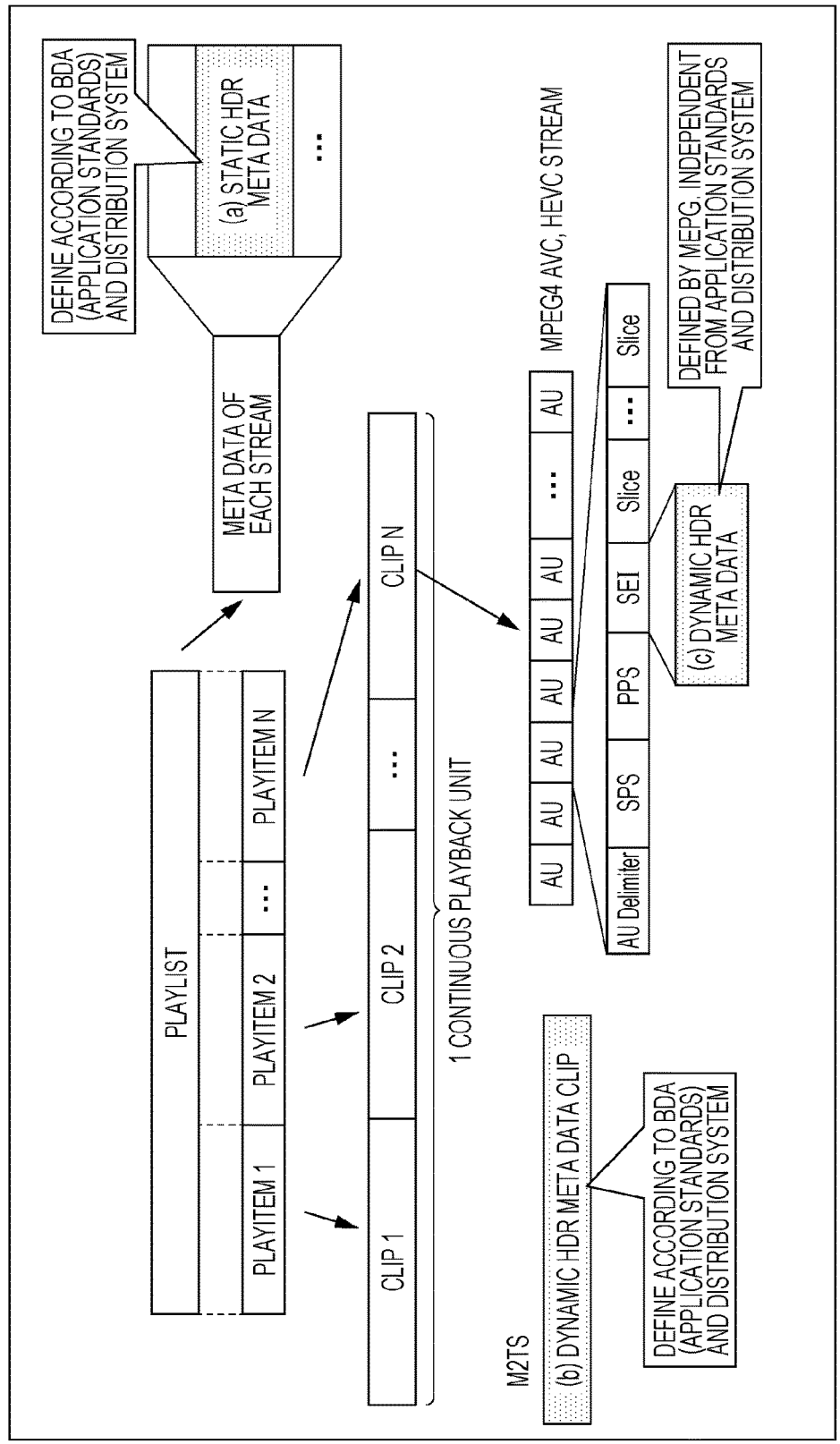
FIG. 25 is a view illustrating a storage example of static HDR meta data and dynamic HDR meta data.

FIG. 25 is a view illustrating an example of a method for storing static HDR meta data and two items of dynamic HDR meta data. As illustrated in FIG. 20, an extendable HDR method according to the present exemplary embodiment, three items of (a) static HDR meta data, (b) dynamic HDR meta data clip (dynamic HDR meta data) and (c) dynamic HDR meta data are used.

(a) Static HDR meta data is stored in a meta data storage area of each stream (a playlist in case of a BDA (Blu-ray Disc Association)) defined by application standards of the BDA or the like or a distribution system. (b) A dynamic HDR meta data clip (dynamic HDR meta data) is stored in a secondary use TS stream defined by application standards of the BDA or the like or a distribution system. (c) Dynamic HDR meta data is stored as a SEI message included in a video stream such as HEVC.

By properly using these three items of data, it is possible to change a combination of items of meta data to use when a new HDR technique is introduced. Consequently, it is possible to change conditions to introduce a new HDR technique. For example, when an original HDR technique needs to be introduced as soon as possible without considering compatibility, it is possible to introduce the original HDR technique without influencing application standards or a distribution system by using only meta data (c). By contrast with this, when a new technique needs to be defined by application standards or a distribution system by considering compatibility even though a time is taken more or less, it is possible to realize both of compatibility and timely introduction of a new technique by using the items of meta data (a) and (b).

21. Method 2 for Storing HDR Meta Data

An example of how to use the three items of meta data (a) to (c) illustrated in FIG. 25 will be described in detail by using Blu-ray as an example.

First, a case where a proponent of a new HDR technique wishes early implementation will be described. In this case, only meta data (c) is used. (1) The proponent discloses only an outline of the new HDR technique. (2) A test disk in which meta data of the new technique for checking compatibility with an existing HDR (basic portion) Blu-ray playback device is provided. (3) The BDA registers the new technique as a non-official option, does not test non-compatibility and takes no responsibility. (4) The BDA takes no responsibility.

Next, a case where the proponent of the new HDR technique considers compatibility to widely spread the new technique will be described. In this case, only the items of meta data (a) and (b) are used. (1) The proponent discloses details of the technique. (2) A draft of a specification for Blu-ray to adapt the technique to Blu-ray is submitted. (3) A draft of a test specification for Blu-ray to adapt the technique to Blu-ray is submitted. (4) A test stream is provided. (5) A test disk is provided. (6) A verifier is updated. (7) The BDA registers the new technique as an official option, annexes the new technique to written standards and tests compatibility at minimum. (8) The BDA permits an announcement that the new technique is adopted as an official option by the BDA.

Figure 26:
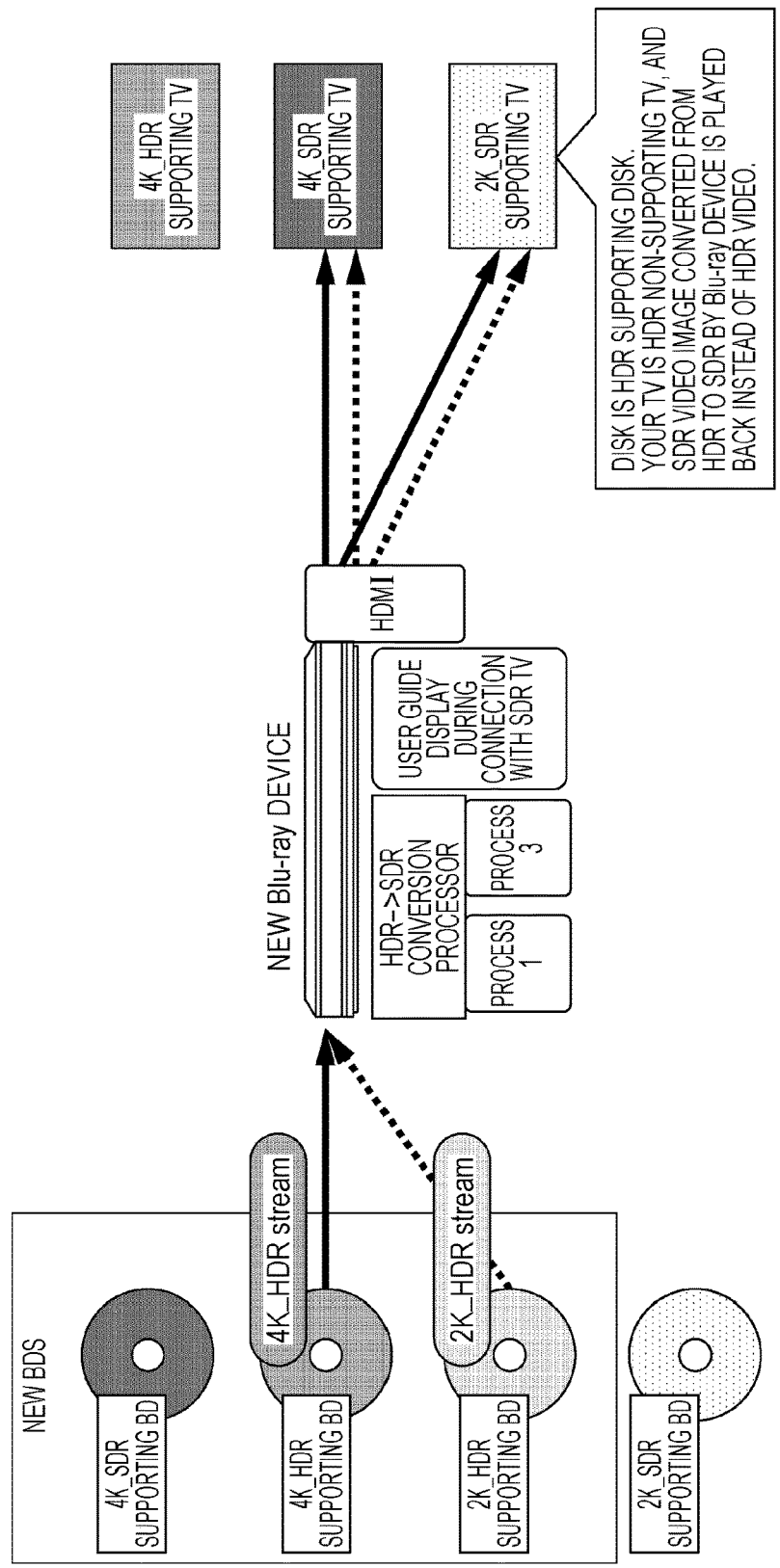
FIG. 26 is a view illustrating an example of a method for displaying a user guidance.

[22. User Guidance Display Method 1] FIG. 26 is a view illustrating a method for displaying a user guidance in a Blu-ray device which executes an HDR-SDR conversion process.

An algorithm of an HDR-SDR conversion process is not established, and therefore it is difficult to accurately perform HDR-SDR conversion in a current situation. Further, it is also possible to implement a plurality of algorithms of an HDR-SDR conversion process.

Hence, when a user inserts an HDR supporting disk into an HDR supporting Blu-ray device connected to an HDR non-supporting TV, it is necessary to appropriately guide users.

When the HDR supporting Blu-ray device connected to the HDR non-supporting TV detects a start of an HDR-SDR conversion process, a guide message such as "The disk is an HDR non-supporting disk. Your TV is HDR non-supporting TV, and SDR video image converted from HDR into SDR by the Blu-ray device is played back instead of HDR video image." is displayed.

Thus, when the display device does not support a video output of a luminance range of the first video signal (HDR signal), the data output device (Blu-ray device) outputs the second video signal (SDR signal) converted from a first luminance range into a second luminance range, and HDR control information to the display device, and causes the display device to display something to the effect that the second video signal converted from the first luminance range into the second luminance range is displayed.

23. User Guidance Display Method 2

Figure 27:
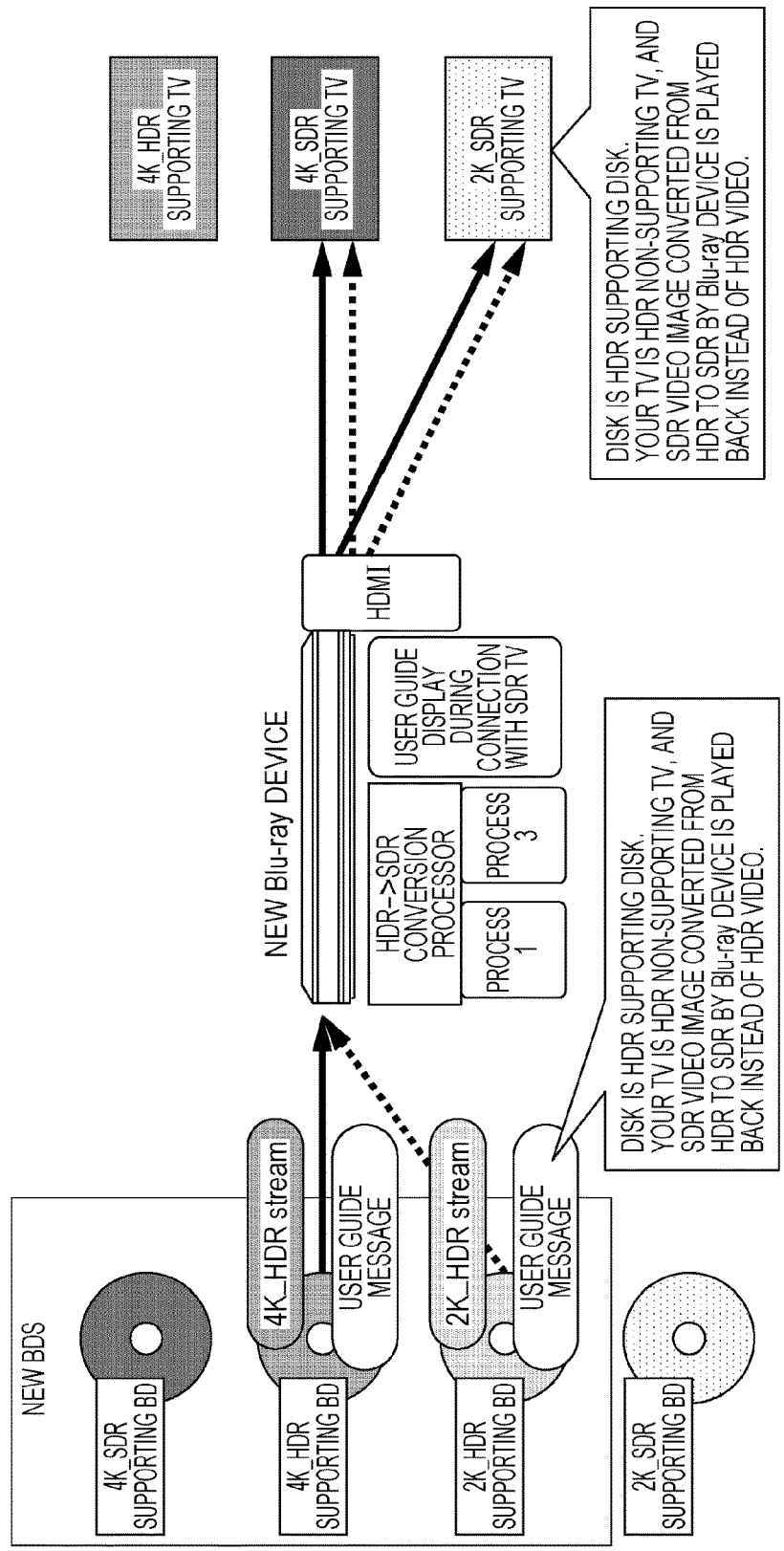
FIG. 27 is a view illustrating an example of the method for displaying the user guidance.

FIG. 27 is a view illustrating a method for displaying a user guidance during execution of a process of converting an HDR stored in a disk into an SDR.

A message (menu) which needs to be displayed by a Blu-ray device when an HDR-SDR conversion process is performed is stored in an HDR disk or a non-volatile memory in the Blu-ray device. Consequently, the Blu-ray device can display a message during execution of an HDR-SDR conversion process. In this case, for example, a message such as "The disk is an HDR supporting disk. Your TV is HDR non-supporting TV, and SDR video image converted from HDR into SDR by the Blu-ray device is played back instead of HDR video image." is displayed.

24. User Guidance Display Method 3

Figure 28:
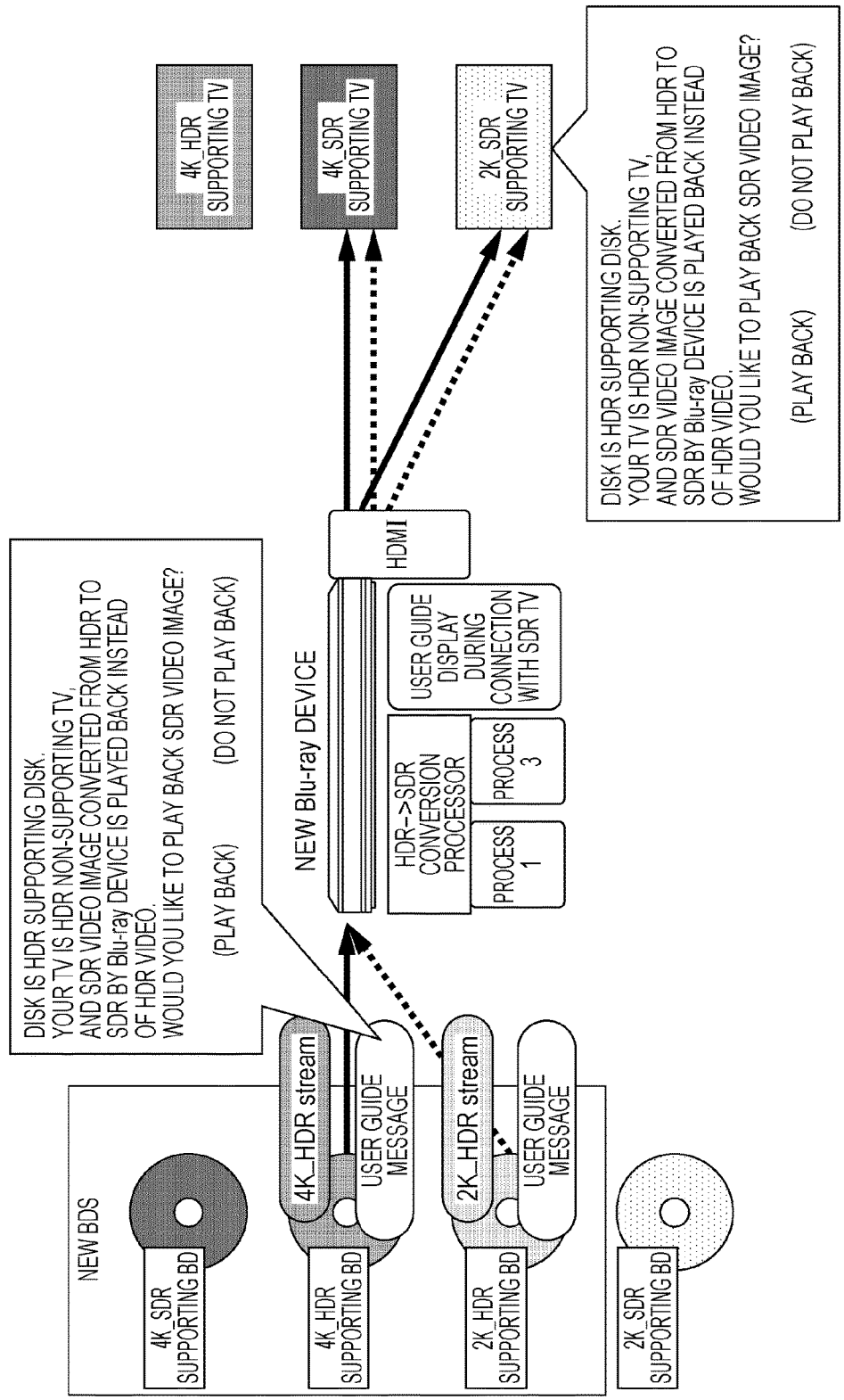
FIG. 28 is a view illustrating an example of the method for displaying the user guidance.

FIG. 28 is a view illustrating a method for displaying a user guidance menu during execution of a process of converting an HDR stored in a disk into an SDR.

By using a Blu-ray menu, the Blu-ray device can display a message such as "The disk is HDR supporting disk. Your TV is HDR non-supporting TV, and SDR video image converted from HDR into SDR by the Blu-ray device is played back instead of HDR video image. Would you like to play back SDR video image?". When a user pushes "Play back" button, the Blu-ray device starts displaying converted image. Further, when the user selects "Do not play back", the Blu-ray device stops playback, and displays a message which encourages the user to insert an HDR non-supporting Blu-ray disc.

Thus, when the display device does not support a video output of a luminance range of the first video signal (HDR signal), the data output device (Blu-ray device) causes the display device to display a message which encourages the user to select whether or not to display the second video signal (SDR signal) converted from the first luminance range into the second luminance range.

25. User Guidance Display Method 4

Figure 29:
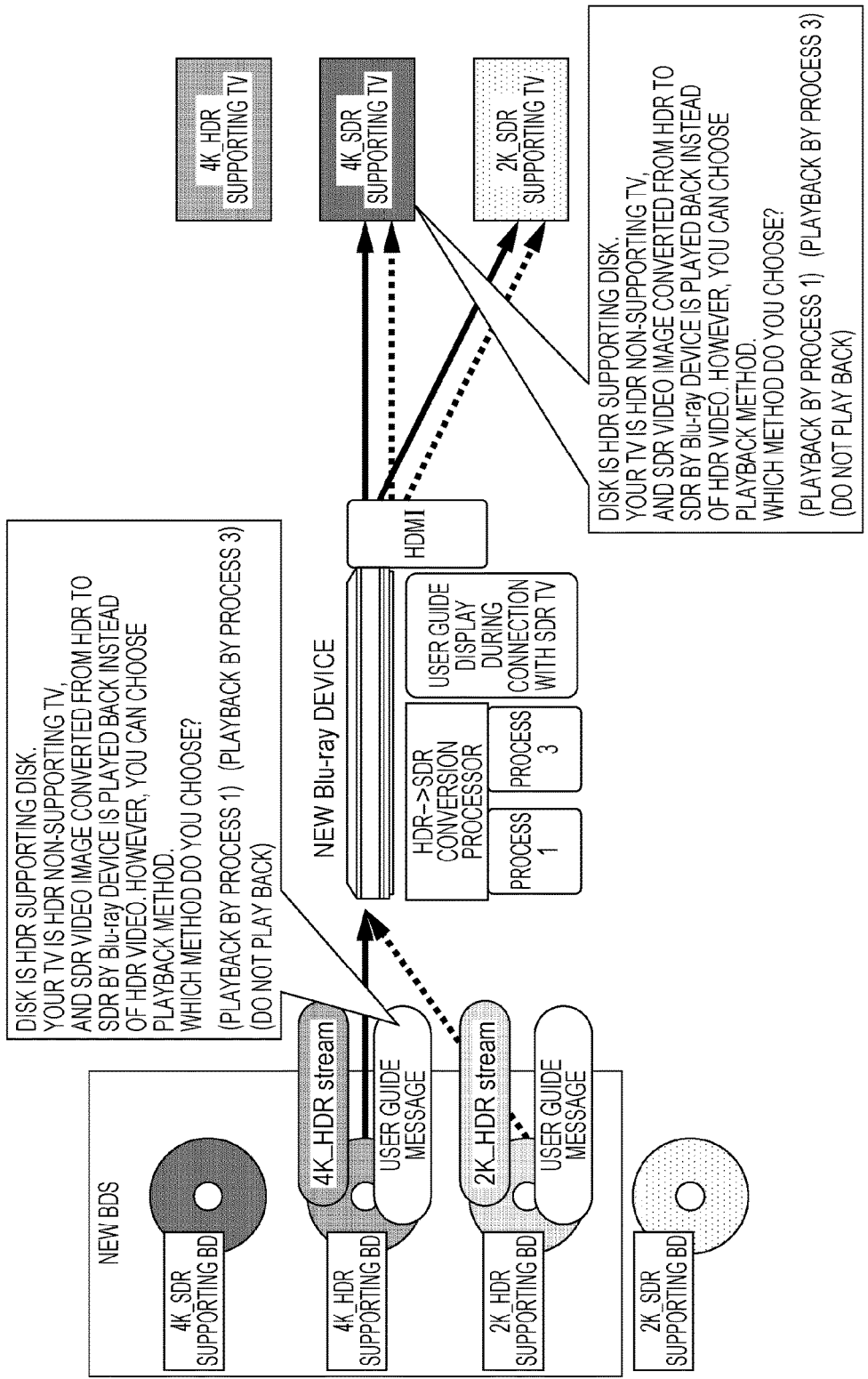
FIG. 29 is a view illustrating an example of the method for displaying the user guidance.

FIG. 29 is a view illustrating a method for displaying a user guidance menu which enables selection of a processing method during execution of a process of converting an HDR stored in a disk into an SDR.

The Blu-ray device displays something to the effect that meta data for an HDR-SDR conversion process is stored in Blu-ray when the meta data is stored in Blu-ray. When the user selects a specified converting method, the Blu-ray device displays a message indicating that more beautiful conversion is possible. That is, according to a Java (registered trademark) command in a disk, what HDR-SDR conversion process is implemented in the Blu-ray device is determined. Consequently, the Blu-ray device can display a selection menu of an HDR-SDR conversion processing method, such as "The disk is HDR supporting disk. Your TV is HDR non-supporting TV, and SDR video image converted from HDR into SDR by the Blu-ray device is played back instead of HDR video image. Which method do you choose? (Play back by process 1), (Play back by process 3) and (Do not play back)". In addition, in this regard, process 1 and process 3 are different types of HDR-SDR conversion processes.

Thus, when the display device does not support a video output of a luminance range of the first video signal (HDR signal), the data output device (Blu-ray device) causes the display device to display a message which encourages the user to select one of a plurality of converting methods for converting the first luminance range into the second luminance range.

26. User Guidance Display Method 5

In addition, it is also possible to display the same message by broadcasting, too. For example, a TV or a playback device which does not support an HDR signal displays a message by using a data broadcast application that a broadcast program uses HDR signals and cannot be accurately displayed when the program is viewed. Further, a TV or a playback device which supports an HDR signal may not display this message. Furthermore, a tag value indicating a message attribute indicates that the message is a warning message for HDR signals. The TV or the playback device which supports HDR signals determines that it is not necessary to display a message by referring to a tag value.

27. Method for Transmitting HDR Meta Data

For example, dynamic HDR meta data or static HDR meta data adopts a data structure which can be transmitted according to HDMI. In this regard, depending on a specification or a version of a transmission protocol such as HDMI, whether or not it is possible to transmit HDR meta data to the display device according to the transmission protocol is determined.

First, the method for transmitting dynamic HDR meta data will be described.

For example, according to existing HDMI2.0, it is not possible to transmit dynamic HDR meta data which is variable in frame or scene units. Therefore, it is necessary to extend standards and newly define a packet for transmitting the dynamic HDR meta data. A version of this extension standards is 2.1.

In this case, when the playback device such as an HDR supporting Blu-ray device or a broadcast receiving device is connected with a display device such as a TV via HDMI2.1, the playback device can transmit dynamic HDR meta data to the display device. However, when the playback device and the display device are connected according to HDMI of an older version than 2.1, the playback device cannot transmit the dynamic HDR meta data to the display device.

First, the playback device determines whether or not a HDMI version which can establish connection with the display device supports transmission of dynamic HDR meta data. When the version does not support transmission of dynamic HDR meta data, the playback device performs an HDR-SDR conversion process by using dynamic HDR meta data, and then outputs the converted signal to the display device according to HDMI.

Further, the playback device may operate also based on whether or not the display device supports a conversion process performed by using dynamic HDR meta data. That is, when the display device does not support a conversion process, and even when the playback device can transmit dynamic HDR meta data according to a HDMI version, the playback device may perform a conversion process. Further, when the playback device does not support a conversion process performed by using dynamic HDR meta data, the playback device may not perform a conversion process and may not transmit the dynamic HDR meta data to the display device, either.

Figure 30:
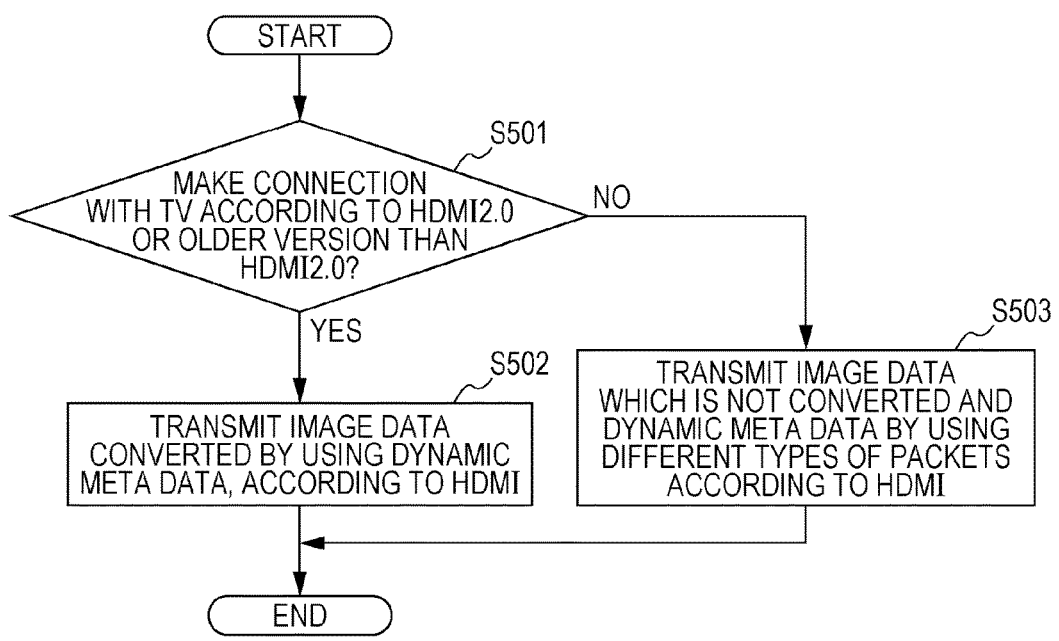
FIG. 30 is a flowchart of a method for transmitting dynamic HDR meta data which depends on a HDMI (High-Definition Multimedia Interface) (registered trademark and the same applies likewise below) version.

FIG. 30 is a flowchart illustrating a method of the playback device for transmitting dynamic HDR meta data. First, the playback device determines whether or not the playback device and the display device are connected according to HDMI2.0 or an older version than HDMI2.0 (S501). In other words, the playback device determines whether or not the playback device and the display device can be connected according to HDMI2.1 which supports transmission of dynamic HDR meta data. More specifically, the playback device determines whether or not both of the playback device and the display device support HDMI2.1.

When the playback device and the display device are connected according to HDMI2.0 or an older version than HDMI2.0 (Yes in S501), the playback device performs a conversion process by using dynamic HDR meta data and transmits converted image data to the display device according to HDMI (S502). The conversion process described herein is a process of changing a luminance range of image data, and is a process of converting an HDR into an SDR to match a luminance range supported by the display device or a process of converting an HDR into an HDR signal of a narrower luminance range.

Meanwhile, when the playback device and the display device are connected according to HDMI2.1 or a newer version than HDMI2.1 (No in S501), the playback device transmits image data for which a conversion process is not yet performed, and dynamic HDR meta data to the display device according to HDMI by using different types of packets (S503).

Next, a method for transmitting static HDR meta data will be described.

It is possible to use Infoframe such as AVI (Auxiliary Video Information) Infoframe to transmit static HDR meta data according to HDMI. However, a maximum data size which can be stored in AVI Infoframe is 27 bytes according to HDMI2.0, and therefore data having a larger size than this maximum data size cannot be processed. Hence, when a static HDR meta data size exceeds an upper limit value at which data can be transmitted according to HDMI, the playback device transmits data for which a conversion process has been performed, to the display device. Alternatively, when a static HDR meta data size which can be transmitted differs depending on a HDMI version, the playback device determines whether to transmit static HDR meta data to the display device based on a HDMI version for connecting the playback device and the display device, and perform a conversion process in the playback device.

Further, the static HDR meta data may be classified into a required portion and an extension portion, and a size of the required portion may be set to a size or less which can be transmitted according to a specific version of a specific transmission protocol such as existing HDMI2.0. For example, the playback device may transmit only the required portion to the display device when using HDMI2.0, and may transmit the required portion and the extension portion together when using HDMI2.1. Further, identification information indicating that static HDR meta data includes a necessary portion and an extension portion or indicating that at least the required portion can be transmitted according to a specific version such as HDMI2.0 may be stored in a database such as PlayList or PlayItem in a Blu-ray disc.

Alternatively, more simply, static HDR meta data may be set to a size or less which can be transmitted according to a lowest version such as HDMI2.0 which enables transmission of static HDR meta data. In addition, a syntax of static HDR meta data in a disk stored in management information such as a playlist or video stream SEI, and a syntax of static HDR meta data which is transmitted according to HDMI may be different. When both of the syntaxes are different, the playback device converts the static HDR meta data in the disk into the syntax of the static HDR meta data according to the transmission protocol to output.

In addition, content of Blu-ray has been described as an example. However, the same applies to meta data which is used for broadcasting or the OTT.

Figure 31:
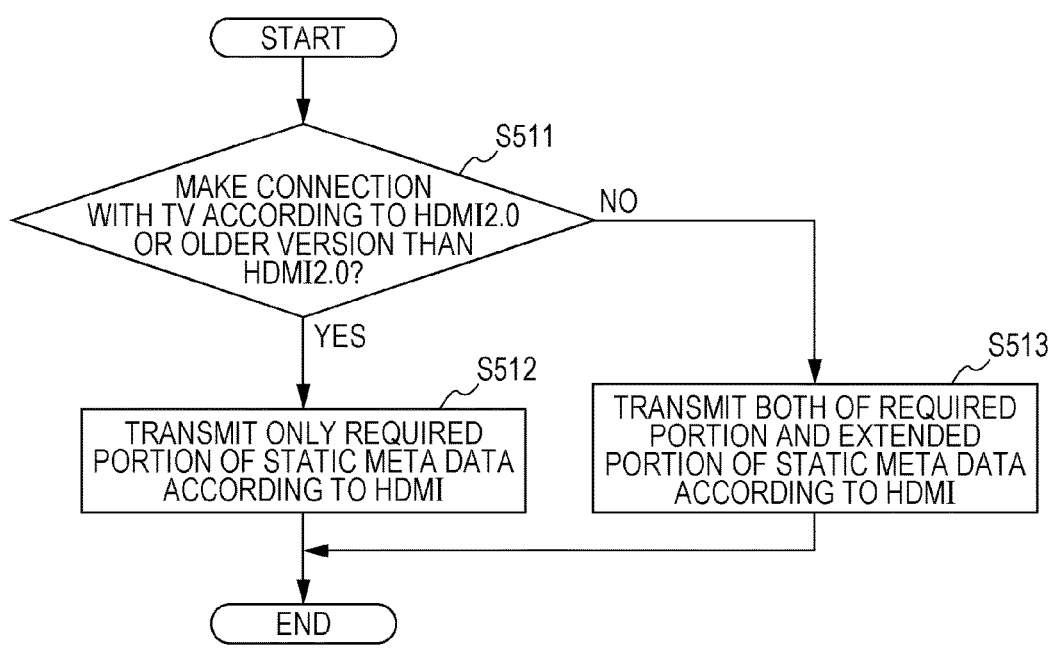
FIG. 31 is a flowchart of a method for transmitting static HDR meta data which depends on a HDMI version.

FIG. 31 is a flowchart illustrating a method of the playback device for transmitting static HDR meta data. First, the playback device determines whether or not the playback device and the display device are connected according to HDMI2.0 or an older version than HDMI2.0 (S511).

When the playback device and the display device are connected according to HDMI2.0 or an older version than HDMI2.0 (Yes in S511), the playback device transmits only a required portion of static HDR meta data to the display device according to HDMI (S512).

Meanwhile, when the playback device and the display device are connected according to HDMI2.1 or a newer version than HDMI2.1 (No in S511), the playback device transmits both of a required portion and an extension portion of static HDR meta data to the display device according to HDMI (S513).

Thus, the playback device switches whether or not to transmit dynamic HDR meta data to the display device according to a HDMI version, yet transmits at least a required portion of static HDR meta data to the display device at all times irrespectively of the HDMI version.

That is, the playback device transmits a video signal to the display device. When a version of a transmission protocol which connects the playback device and the display device is a first version (e.g. HDMI2.0), the playback device transmits, to the display device, first meta data (static HDR meta data) which is information which is commonly used for a plurality of images included in continuous playback units of the video signal and relates to a luminance range of the video signal, without transmitting, to the display device, second meta data (dynamic HDR meta data) which is information which is commonly used for units subdivided compared to the continuous playback units of the video signal and relates to the luminance range of the video signal. Further, when the version of the transmission protocol is the second version (e.g. HDMI2.1), the playback device transmits both of the first meta data (static HDR meta data) and the second meta data (dynamic HDR meta data) to the display device.

Consequently, the playback device can transmit appropriate meta data to the display device according to the version of the transmission protocol.

Further, when the version of the transmission protocol is the first version (e.g. HDMI2.0) (Yes in S501), the playback device performs a process of converting a luminance range of a video signal by using the second meta data (dynamic HDR meta data), and transmits the converted video signal to the display device (S502).

Thus, when dynamic HDR meta data cannot be transmitted to the display device and the display device cannot perform a conversion process, the playback device can perform a conversion process.

Further, when the version of the transmission protocol is the second version (e.g. HDMI2.1) and the display device does not support a conversion process, the playback device performs a conversion process, transmits the converted video signal to the display device and does not transmit the second meta data to the display device. Furthermore, when the version of the transmission protocol is the second version (e.g. HDMI2.1) and the display device supports a conversion process, the playback device transmits a video signal and the second meta data to the display device without performing a conversion process.

Consequently, one appropriate device of the playback device and the display device can execute a conversion process.

Further, when the playback device does not support a conversion process of converting a luminance range of a video signal by using the second meta data (dynamic HDR meta data), the playback device transmits the video signal to the display device without performing the conversion process, and does not transmit the second meta data (dynamic HDR meta data) to the display device.

28. Adjustment of Luminance Value

How to use HDR meta data to faithfully reproduce an HDR signal and HDR-SDR conversion in the playback device have been described above. However, an HDR signal has a substantially high peak luminance than that of a conventional SDR signal. Therefore, the playback device may control a peak luminance of a video image by taking into account performance of a panel or a signal processing circuit of the display device such as a TV or an influence on a human body. In addition, the process described below (playback method) may be performed by the playback device such as a Blu-ray device or may be performed by the display device such as a TV. In other words, the playback device described below only needs to have a function of playing back video images, and includes the above-described playback device (e.g. Blu-ray device) and the display device (e.g. TV).

In this regard, even when an upper limit of a luminance value which can be output from each pixel of a TV panel is 1000 nit, an area which can output a luminance of 1000 nit simultaneously is assumed to be limited to 50% of a screen. In this case, even when 70% of an area of a screen is 1000 nit, a signal value of an HDR signal cannot be output as is. Hence, the playback device may control a luminance value of each pixel to play back an HDR signal based on following playback conditions.

First, a first method will be described. The playback device adjusts a luminance value such that an inter-screen luminance change amount at reference time interval T is threshold P or less. Reference time interval T described herein is, for example, an integer multiple of a reciprocal of a video frame rate.

Threshold P is an absolute value of a luminance or a rate of a change of a luminance value. This threshold P is determined based on an influence which a flash of an image has on a human body or following performance of a TV panel for a change of a signal value.

Further, conditions may be set such that a number of pixels whose intra-screen luminance value change amounts exceeds threshold P is a predetermined rate or less. Furthermore, the screen may be divided into a plurality of areas, and the same or different conditions may be set per area.

Next, a second method will be described. The playback device adjusts a luminance value such that a number of pixels which have luminances of reference luminance S or more or a rate that these pixels occupy in total pixels in a screen is threshold Q or less.

Reference luminance S and threshold Q are determined based on an influence on a human body or an upper limit value of a voltage which is simultaneously applicable to each pixel of a TV panel.

Further, when parameters (threshold P, reference luminance S and threshold Q) used for the first method and the second method are set based on performance of a TV panel, values of the parameters can be set per TV.

A method for controlling a pixel value according to the first method will be described below. For example, a peak luminance of a plurality of pixels configuring a frame at time t is assumed to be L1. When a luminance value of a pixel whose coordinate is (i,j) in a frame at time t+T is I(i,j), the playback device adjusts a luminance value for each pixel whose absolute value of a difference between I(i,j) and L1 exceeds threshold P such that the difference is threshold P or less. This process may be performed on an entire screen or may be performed per area by dividing the screen to perform processes in parallel. For example, the playback device divides the screen in a horizontal direction and a vertical direction, respectively, and adjusts a luminance value such that a change amount of a luminance in each area is threshold P or less.

Further, a frame interval to display images on a TV panel is assumed to be as reference time interval T. However, there is a case where, when a luminance value is adjusted based only on a luminance value of a last frame, continuity of luminance values between frames is sometimes lost. Hence, a predetermined time constant may be set, and the playback device may determine a luminance value (above L1) by adding a weight to a peak luminance of each frame in a range of the set time constant. In this case, a time constant and a weighting coefficient are set in advance such that a change amount of a luminance value is threshold P or less.

Next, a method for controlling a pixel value according to the second method will be described. This control method includes following two types of methods. The first method is a method for clipping a luminance value for each pixel whose luminance value exceeds a predetermined value. For example, a luminance value of each pixel whose luminance value exceeds the predetermined value is adjusted to the predetermined value.

The second method is a method for entirely lowering a luminance value of each pixel in the screen such that a relative luminance value rate between pixels is held as much as possible by, for example, setting Knee point instead of uniformly clipping each luminance value. Alternatively, a luminance value of a high luminance portion may be lowered while a luminance value of a low luminance portion is held.

For example, it is assumed that the number of pixels of a TV panel is 8 mega pixels, and that a total sum of luminance values of all pixels in a screen is limited to 8 mega×500 nit=4 giga nit or less. In this regard, it is assumed that a luminance value of an HDR signal of content is 400 nit in area A (4 mega pixels) which is half of the screen, and is 1000 nit in area B (4 mega pixels) which is the rest of the half. In this case, when each luminance value is uniformly clipped, all luminance values in area B are clipped to 600 nit. As a result, a total sum of luminance values of all pixels is 4 mega×400+4 mega×600=4 giga nit and satisfy the above limitation.

In addition, not only to play back an HDR signal but also to generate an HDR signal, a luminance value of each pixel in a frame of a video or a still image may be determined such that the conditions of the above first method or second method are satisfied.

Figure 32:
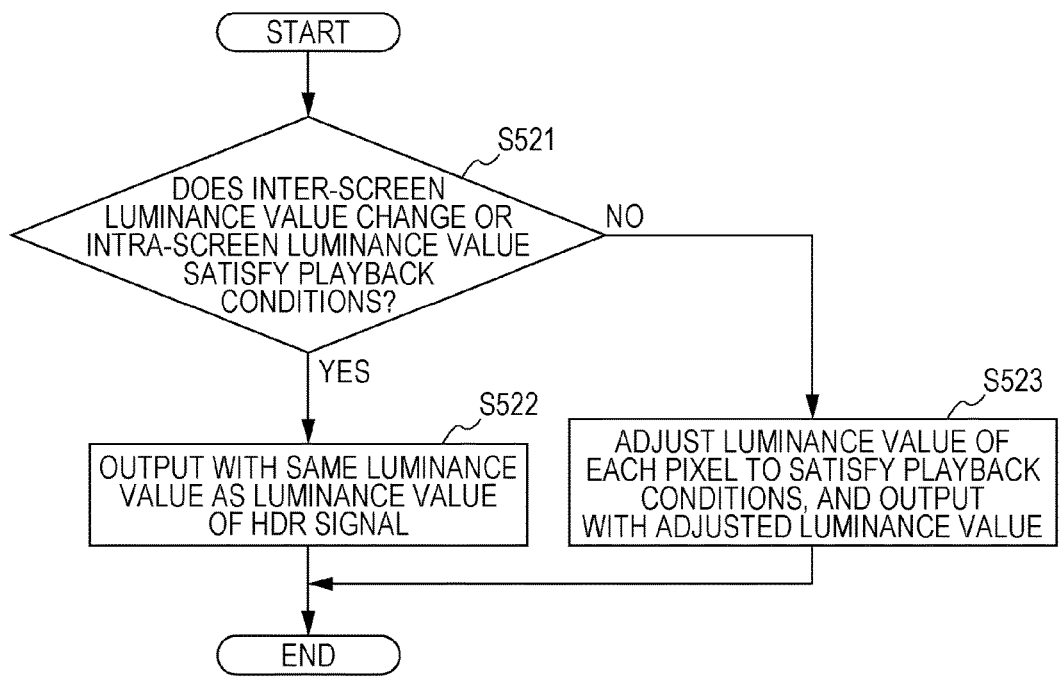
FIG. 32 is a flowchart of a method for controlling a luminance value during playback of an HDR signal.

FIG. 32 is a flowchart of a method for controlling a luminance value during playback of an HDR signal. First, the playback device determines whether or not an inter-screen luminance value change amount or an intra-screen luminance value satisfies playback conditions (S521). More specifically, as described above, the playback device determines whether or not the inter-screen luminance value change amount is the threshold or less or the intra-screen luminance value is the threshold or less.

When the inter-screen luminance value change amount or an intra-screen luminance value satisfies the playback conditions, i.e., when the inter-screen luminance change amount is the threshold or less or the intra-screen luminance value is the threshold or less (Yes in S521), the playback device outputs a signal of the same luminance value as a luminance value of an input HDR signal (S522). That is, the playback device outputs a luminance value of an HDR signal without adjusting the luminance value.

Meanwhile, when the inter-screen luminance value change amount or the intra-screen luminance value does not satisfy the playback conditions, i.e., when the inter-screen luminance change amount exceeds the threshold or the intra-screen luminance value exceeds the threshold (No in S521), the playback device adjusts a luminance value of each pixel and outputs an adjusted luminance value to satisfy the playback conditions (S523). That is, the playback device adjusts the luminance value of each pixel such that the inter-screen luminance value change amount is the threshold or less or the intra-screen luminance value is the threshold or less.

As described above, the playback device according to the present exemplary embodiment plays back video signals. A luminance of a video signal is a first luminance value in a first luminance range whose maximum luminance value is defined as a first maximum luminance value exceeding 100 nit. That is, the video signal is an HDR signal.

As described above with reference to the first method, the playback device determines whether or not an inter-screen luminance value change amount of a video signal exceeds a predetermined first threshold (S521). For example, the playback device determines whether or not the luminance value change amount at a reference time interval which is an integer multiple of a reciprocal of a frame rate of the video signal exceeds the first threshold.

When it is determined that the luminance value change amount exceeds the first threshold (No in S521), the playback device performs an adjustment process of lowering the luminance value of the video signal (S523). More specifically, for a pixel whose luminance value change amount exceeds the first threshold, the playback device adjusts a luminance value of the pixel such that the luminance value change amount of the pixel is the first threshold or less.

Consequently, when a luminance value of a video signal exceeds display capability of the display device, the playback device can generate a video signal which the display device can appropriately display by lowering the luminance value of the video signal. Further, when a large change amount of a luminance value of a video signal is likely to negatively influence viewers, the playback device can reduce the negative influence by lowering the luminance value of the video signal.

More specifically, in step S521, the playback device determines whether or not a difference between a peak luminance of a first image included in the video signal, and each of luminance values of a plurality of pixels included in a second image in the video signal subsequent to the first image exceeds the first threshold may be determined. In step S523, for a pixel whose difference exceeds the first threshold, the playback device adjusts a luminance value of the pixel such that the difference of the pixel is the first threshold or less.

Alternatively, in step S521, the playback device determines whether or not a rate of pixels whose luminance value change amounts exceed the first threshold with respect to a plurality of pixels included in an image included in the video signal exceeds a second threshold. In step S523, when the rate exceeds the second threshold, the playback device adjusts luminance values of the plurality of pixels such that the rate is the second threshold or less.

Further, in step S521, for each of a plurality of areas obtained by dividing the screen, the playback device determines whether or not an inter-screen luminance value change amount of each area exceeds the first threshold. In step S523, the playback device performs an adjustment process of lowering a luminance value of an area for which it is determined that the luminance value change amount exceeds the first threshold.

Alternatively, as described above with reference to the second method, the playback device determines whether or not a luminance value of an image included in a video signal exceeds the predetermined first threshold (S521). When it is determined that the luminance value of each pixel exceeds the first threshold (No in S521), the playback device performs an adjustment process of lowering the luminance value of the image (S523).

Consequently, when a luminance value of a video signal exceeds display capability of the display device, the playback device can generate a video signal which the display device can appropriately display by lowering the luminance value of the video signal. Further, when a high luminance value of a video signal is likely to negatively influence viewers, the playback device can reduce the negative influence by lowering the luminance value of the video signal.

More specifically, in step S521, the playback device determines the number of pixels whose luminance values exceed the first threshold among a plurality of pixels included in an image. In step S523, when the number of pixels whose luminance values exceed the first threshold exceeds the third threshold, the playback device lowers the luminance value of the image such that the number of pixels whose luminance values exceed the first threshold is a third threshold or less.

Alternatively, in step S521, the playback device determines a rate of pixels whose luminance values exceed the first threshold with respect to a plurality of pixels included in the image. In step S523, when the rate exceeds the third threshold, the playback device lowers the luminance value of the image such that the rate is the third threshold or less.

Further, the first threshold, the second threshold and the third threshold are values calculated based on an upper limit value of a voltage which is simultaneously applicable to a plurality of pixels in a display device which displays video signals.

29. Method for Arranging Meta Data

A method for arranging static HDR meta data and dynamic HDR meta data in a video stream will be described below.

Static HDR meta data may be stored in a head access unit in a decoding order in random access units such as GOP to store the static HDR meta data in a video stream by using SEI. In this case, a NAL unit including SEI is arranged prior to a NAL unit in which a video encoded data is stored in the decoding order.

Further, the same meta data is used as these two items of dynamic HDR meta data to store the dynamic HDR meta data in both of management information such as a playlist, and a video stream.

Furthermore, dynamic HDR meta data can be switched in random access units and is fixed in the random access units. For example, SEI in which dynamic HDR meta data is stored is stored in a head access unit in the random access units. Decoding starts from a head of the random access units to start playback from a middle of a stream. Further, during special playback such as high-speed playback of playing back only picture I and picture P, a head access unit in the random access units is decoded at all times. Hence, by storing HDR meta data in a head access unit in the random access units, the playback device can obtain HDR meta data at all times.

In a stream according to MPEG-4 AVC or HEVC, only a head access unit in the decoding order in the random access units includes a Sequence Parameter Set (SPS) which is initialization information during decoding. It is possible to use this SPS as information indicating start of the random access units.

Further, static HDR meta data and dynamic HDR meta data may be stored in different SEI messages. Both of the SEI messages are identified based on identification information included in a type of the SEI message or the payload of the SEI message. When, for example, transmitting only static HDR meta data according to HDMI, the playback device can extract only a SEI message including the static HDR meta data, and transmit meta data included in a payload as it is according to HDMI. Consequently, the playback device does not need to perform a process of analyzing a payload of the SEI message, and obtaining static HDR meta data.

30. Dual Disk Playback Operation 1

An operation of playing back an HDR disk in which only HDR signals are stored has been described above.

Next, multiplexed data stored in a dual disk in which both of HDR signals and SDR signals are stored will be described with reference to FIG. 33. FIG. 33 is a view for explaining multiplexed data stored in a dual disk.

As illustrated in FIG. 33, HDR signals and SDR signals are stored as different multiplexed streams in the dual disk. For example, items of data of a plurality of media such as a video, an audio, a caption and graphics are stored as one multiplexed stream in an optical disk such as Blu-ray according to a MPEG-2 TS-based multiplexing method called M2TS. A reference is made to these multiplexed streams from playback control meta data such as a playlist. During playback, a player analyzes meta data to select a multiplexed stream to play back or individual language data stored in the multiplexed stream. This example is a case where HDR and SDR playlists are individually stored, and the respective playlists refer to HDR signals or SDR signals. Further, identification information indicating that both of HDR signals and SDR signals are stored may be additionally indicated.

It is also possible to multiplex both of HDR signals and SDR signals in the same multiplexed stream. However, it is necessary to perform multiplexing to satisfy a buffer model such as T-STD (System Target Decoder) defined according to MPEG-2 TS. Particularly, it is difficult to multiplex two videos of high bit rates within a range of a predetermined data reading rate. Hence, it is desirable to demultiplex multiplexed streams.

Data such as an audio, a caption or graphics needs to be stored for each multiplexed stream, and a data amount increases compared to a case where data is multiplexed into one video stream. In this regard, it is possible to reduce an increase in a data amount by reducing a video data amount by using a video encoding method of a high compressibility. For example, by changing MPEG-4 AVC which is conventionally used for Blu-ray to HEVC (High Efficiency Video Coding), the compressibility is expected to improve 1.6 to 2 times. Further, by storing a combination of a 2K HDR and a 2K SDR or a combination of a 4K SDR and a 2K HDR, i.e., by storing two 2Ks or a combination of 2K and 4K in a dual disk, storing two 4Ks may be banned to permit only a combination which can be stored in an optical disk.

31. Conclusion

A Blu-ray device which plays back a 4K supporting BD or an HDR supporting BD needs to support four TVs of a 2K_SDR supporting TV, a 2K HDR supporting TV, a 4K_SDR supporting TV and a 4K HDR supporting TV. More specifically, the Blu-ray device needs to support three pairs of HDMI/HDCP (High-bandwidth Digital Content Protection) standards (HDMI1.4/HDCP1.4, HDMI2.0/HDCP2.1 and HDMI2.1/HDCP2.2).

Further, when playing back four types of Blu-ray discs (a 2K_SDR supporting BD, a 2K HDR supporting BD, a 4K_SDR supporting BD and a 4K HDR supporting BD), the Blu-ray device needs to select an appropriate process and HDMI/HDCP per BD (content) and per connected display device (TV). Furthermore, when graphics are synthesized with a video, too, it is necessary to change a process according to a BD type and a connected display device (TV) type.

Hence, an internal process in the Blu-ray device becomes very complex. In the third exemplary embodiment, various methods for relatively simplifying a process in the Blu-ray device have been described.

[1] It is necessary to convert an HDR into an SDR to display an HDR signal on an HDR non-supporting TV. By contrast with this, in the third exemplary embodiment, a configuration of a BD which is a dual streams disk has been proposed to make this conversion optional in a Blu-ray device.

[2] Further, in the third exemplary embodiment, a graphic stream is limited, and types of combinations of video streams and graphic streams are reduced.

[3] In the third exemplary embodiment, a dual streams disk and a graphic stream are limited to substantially reduce a number of combinations of a complex process in a Blu-ray device.

[4] In the third exemplary embodiment, an internal process and a HDMI process which do not produce a contradiction for a process of a dual streams disk even when pseudo HDR conversion is introduced have been described.

According to a converting method according to the present disclosure, "HDR pseudo HDR conversion process" of converting an HDR video image to keep a gradation of an area exceeding 100 nit to some degree, converting the HDR video image into a pseudo HDR video image close to the original HDR and enabling the SDR TV to display the HDR video image is realized to display an HDR video image on an SDR TV instead of converting an HDR video image into an SDR video image of 100 nit or less by using a peak luminance of the SDR TV which is displayed and exceeds 100 nit (generally, 200 nit or more).

Further, according to the converting method, the converting method of "HDR pseudo HDR conversion process" may be switched according to display characteristics (a maximum luminance, input/output characteristics and a display mode) of the SDR TV.

A method for obtaining display characteristics information includes (1) automatically obtaining the display characteristics information via HDMI (registered trademark) or a network, (2) generating the display characteristics information by having a user input information such as a manufacturer name or a model and (3) obtaining the display characteristics information from a cloud or the like by using information of the manufacturer name or the model.

Further, a timing to obtain the display characteristics information of converting device 100 includes (1) obtaining the display characteristics information immediately before pseudo HDR conversion, and (2) obtaining when connection with display device 200 (e.g. SDR TV) is established for the first time (when connection is established).

Furthermore, as for the converting method, the converting method may be switched according to HDR video image luminance information (CAL (Content Average Luminance) and CPL (Content Peak Luminance)).

For example, a method for obtaining the HDR video image luminance information of converting device 100 includes (1) obtaining the HDR video image luminance information as meta information accompanying an HDR video image, (2) obtaining the HDR video image luminance information by having the user input title information of content and (3) obtaining the HDR video image luminance information by using input information input by the user, from a cloud or the like.

Further, details of the converting method include (1) performing conversion such that a luminance does not exceed a DPL (Display Peak Luminance), (2) performing conversion such that CPL is DPL, (3) not changing a CAL and a luminance around the CAL, (4) performing conversion by using a natural logarithm and (5) performing a clip process by using the DPL.

Furthermore, according to the converting method, it is also possible to transmit display settings such as a display mode and a display parameter of the SDR TV to display device 200 to switch to enhance a pseudo HDR effect. For example, a message which encourages the user to make the display settings may be displayed on a screen.

32. Necessity 1 of Pseudo HDR

Next, the necessity of a pseudo HDR will be described with reference to FIGS. 34A to 34C.

FIG. 34A is a view illustrating an example of a display process of converting an HDR signal in an HDR TV and displaying an HDR.

As illustrated in FIG. 34A, when an HDR video image is displayed, and even when the display device is an HDR TV, it is not possible to display a maximum value of an HDR luminance range (peak luminance (HPL (HDR Peak Luminance): e.g. 1500 nit)) in some cases. In this case, luminance conversion for adjusting a linear signal which is inversely quantized by using an HDR EOTF, to a maximum value of a luminance range of the display device (peak luminance (DPL (Display Peak Luminance): e.g. 750 nit)) is performed. Further, by inputting to the display device a video signal obtained by performing the luminance conversion, it is possible to display an HDR video image which has been adjusted to the luminance range of the maximum value which is a limit of the display device.

Figure 34B:
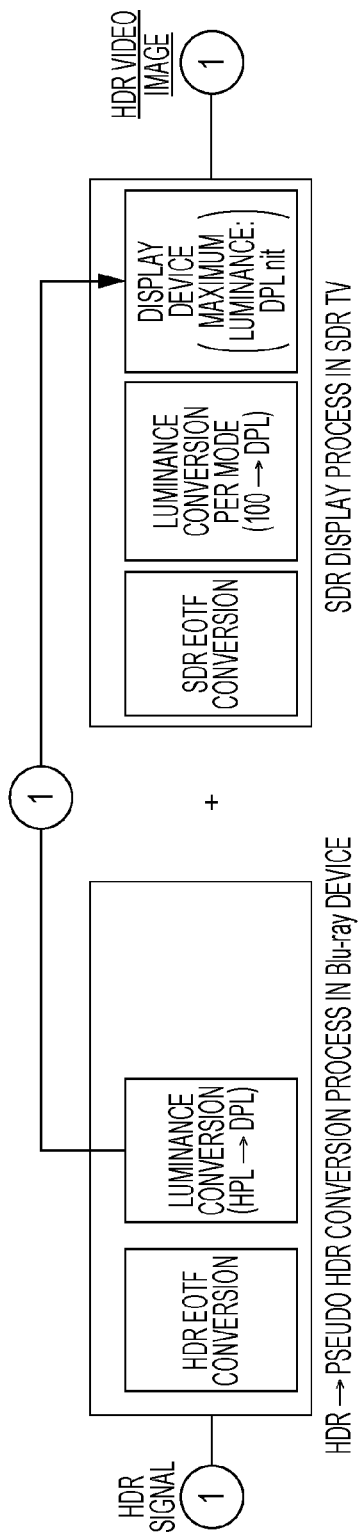
FIG. 34B is a view illustrating an example of a display process of displaying an HDR by using an HDR supporting playback device and an SDR (Standard Dynamic Range) TV.

FIG. 34B is a view illustrating an example of a display process of displaying an HDR by using an HDR supporting playback device and an SDR TV.

As illustrated in FIG. 34B, when an HDR video image is displayed, and when the display device is an SDR TV, that a maximum value (peak luminance (DPL: e.g., 300 nit)) of a luminance range of the SDR TV which displays the HDR video image exceeds 100 nit is used. In "HDR→pseudo HDR conversion process" in an HDR supporting playback device (Blu-ray device) in FIG. 34B, "HDR EOTF conversion" performed in an HDR TV and "luminance conversion" performed by using a DPL (e.g.: 300 nit) which is the maximum value of the luminance range of the SDR TV are performed. In this case, when it is possible to directly input a signal obtained by performing "luminance conversion" to the "display device" which is the SDR TV, it is possible to realize the same effect as that of the HDR TV even by using the SDR TV.

However, the SDR TV does not have means for receiving a direct input of such a signal from an outside, and therefore cannot realize the same effect as that of the HDR TV.

Figure 34C:
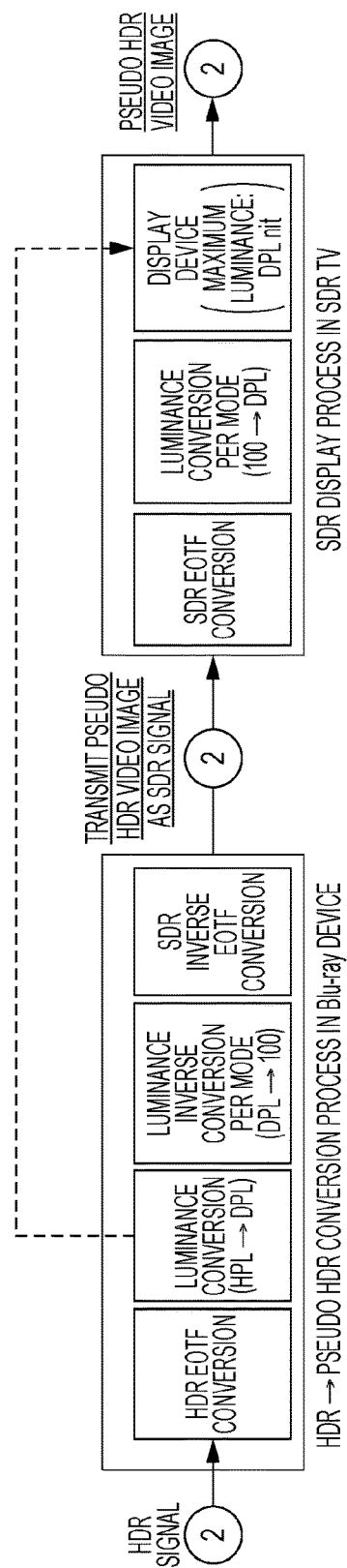
FIG. 34C is a view illustrating an example of a display process of displaying an HDR by using an HDR supporting playback device and an SDR TV which are connected to each other via a standard interface.

FIG. 34C is a view illustrating an example of a display process of displaying an HDR by using an HDR supporting playback device and an SDR TV which are connected with each other via a standard interface.

As illustrated in FIG. 34C, it is generally necessary to input a signal for providing the effect in FIG. 34B, to the SDR TV by using an input interface (HDMI (registered trademark)) of the SDR TV. In the SDR TV, the signal input via the input interface passes in order of "SDR EOTF conversion", "luminance conversion of each mode" and the "display device", and displays a video image matching a luminance range of a maximum value of the display device. Hence, an HDR supporting Blu-ray device generates a signal (pseudo HDR signal) which can cancel "SDR EOTF conversion" and "luminance conversion of each mode" which the signal passes immediately after the input interface of the SDR TV. That is, by performing "luminance inverse conversion of each mode" and "SDR inverse EOTF conversion" immediately after "HDR EOTF conversion" and "luminance conversion" performed by using a peak luminance (DPL) of the SDR TV, the HDR supporting Blu-ray device can realize in a pseudo manner the same effect as that obtained when a signal obtained immediately after "luminance conversion" is input to the "display device" (a broken line arrow in FIG. 34C).

33. Necessity 2 of Pseudo HDR

An input signal of a normal SDR TV is 100 nit yet has capability of expressing video images of 200 nit or more according to viewing environment (a dark room: a cinema mode, and a bright room: a dynamic mode). However, a luminance upper limit of an input signal to the SDR TV is determined as 100 nit, and therefore it has not been possible to directly use this capability.

When the SDR TV displays HDR video images, that a peak luminance of the SDR TV which displays the HDR video images exceeds 100 nit (generally 200 nit or more) is used. Instead of converting the HDR video images into SDR video images of 100 nit or less, "HDR→pseudo HDR conversion process" is performed to keep a gradation of a luminance range exceeding 100 nit to some degree. Consequently, the SDR TV can display pseudo HDR video images close to the original HDR.

When this "HDR→pseudo HDR conversion process" technique is applied to Blu-ray, as illustrated in FIG. 35, only HDR signals are stored in an HDR disk. When the SDR TV is connected to a Blu-ray device, the Blu-ray device performs "HDR pseudo HDR conversion process", converts an HDR signal into a pseudo HDR signal and outputs the pseudo HDR signal to the SDR TV. Consequently, by converting the received pseudo HDR signal into a luminance value, the SDR TV can display video images having a pseudo HDR effect. Thus, even when there is no HDR supporting TV, if an HDR supporting BD and an HDR supporting Blu-ray device are prepared, even an SDR TV can display pseudo HDR video images having higher quality than that of SDR video images.

Hence, it has been thought that an HDR supporting TV is necessary to view HDR video images. However, an existing SDR TV can display pseudo HDR video images which realize an HDR effect. Consequently, it can be expected that HDR-supporting Blu-ray spreads.

34. Effect and Others

By performing HDR-pseudo HDR conversion process on an HDR signal transmitted by way of broadcasting, a package medium such as Blu-ray or Internet distribution such as the OTT, an HDR signal is converted into a pseudo HDR signal. Consequently, an existing SDR TV can display the HDR signal as a pseudo HDR video image.

35. EOTF

Hereinafter, the EOTF will be described with reference to FIGS. 36A and 36B.

FIG. 36A is a view illustrating an example of the EOTF (Electro-Optical Transfer Function) which supports the HDR and the SDR, respectively.

The EOTF is a generally called gamma curve, indicates each correspondence between a code value and a luminance value and converts the code value into a luminance value. That is, the EOTF is association information indicating a correspondence relationship between a plurality of code values and luminance values.

Figure 36B:
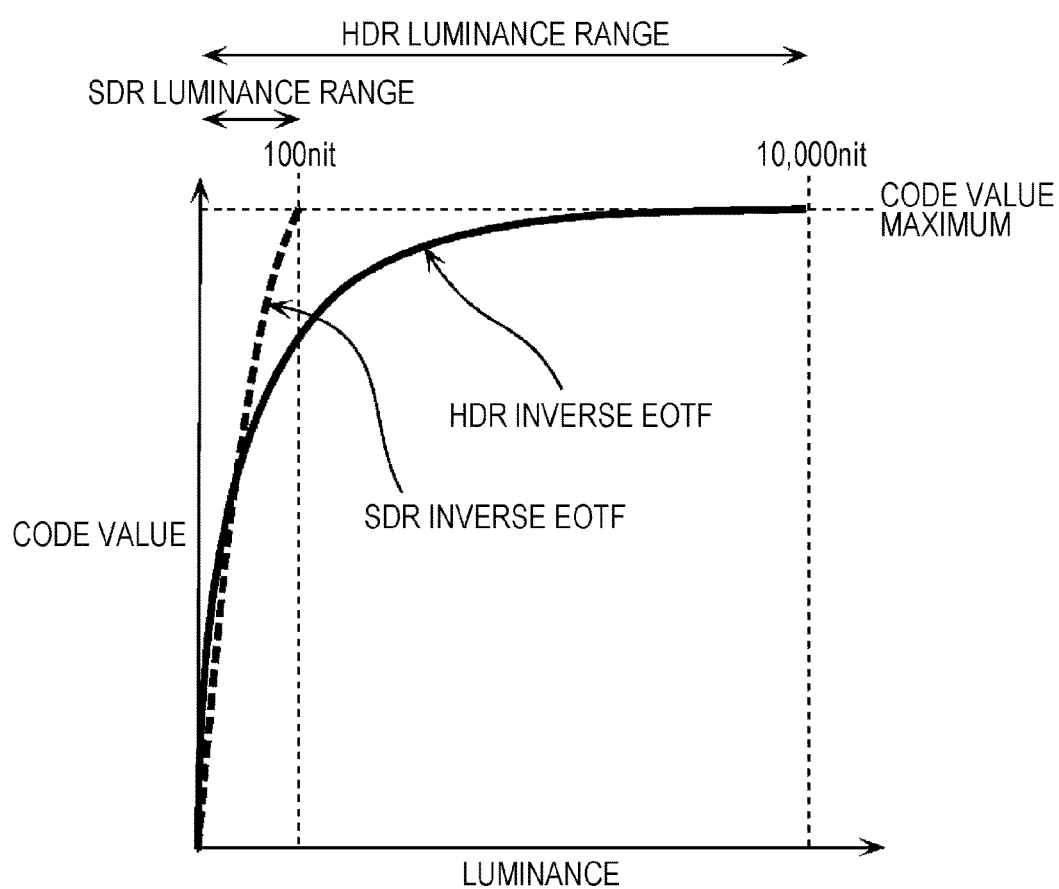
FIG. 36B is a view illustrating an example of an inverse EOTF which supports the HDR and the SDR, respectively.

Further, FIG. 36B is a view illustrating an example of an inverse EOTF which supports the HDR and the SDR, respectively.

The inverse EOTF indicates each correspondence between a luminance value and a code value, and quantizes a luminance value contrary to the EOTF and converts the luminance value into a code value. That is, the inverse EOTF is association information indicating a correspondence relationship between luminance value and a plurality of code values. When, for example, a luminance value of an HDR supporting video image is expressed by a 10-bit code value of a gradation, a luminance value of an HDR luminance range up to 10,000 nit is quantized and mapped on 1024 integer values of 0 to 1023. That is, the luminance value of the luminance range up to 10,000 nit (a luminance value of an HDR supporting video image) is quantized based on the inverse EOTF and thereby is converted into an HDR signal of the 10-bit code value. An HDR supporting EOTF (referred to as a "HDR EOTF" below) or an HDR supporting inverse EOTF (referred to as a "HDR inverse EOTF" below) can express a higher luminance value than that of an SDR supporting EOTF (referred to as a "SDR EOTF" below) or an SDR supporting inverse EOTF (referred to as a "SDR inverse EOTF" below). For example, in FIGS. 36A and 36B, a maximum value of a luminance (peak luminance) is 10,000 nit. That is, an HDR luminance range includes an entire SDR luminance range, and an HDR peak luminance is higher than an SDR peak luminance. An HDR luminance range is a luminance range obtained by expanding a maximum value from 100 nit which is a maximum value of the SDR luminance range to 10,000 nit.

For example, examples of the HDR EOTF and the HDR inverse EOTF include SMPTE 2084 standardized by Society of Motion Picture & Television Engineers (SMPTE).

In addition, in the following description, a luminance range from 0 nit to 100 nit which is a peak luminance illustrated in FIGS. 36A and 36B will be described as a first luminance range in some cases. Similarly, a luminance range from 0 nit to 10,000 nit which is a peak luminance illustrated in FIGS. 36A and 36B will be described as a second luminance range in some cases.

36. Converting Device and Display Device

Figure 37:
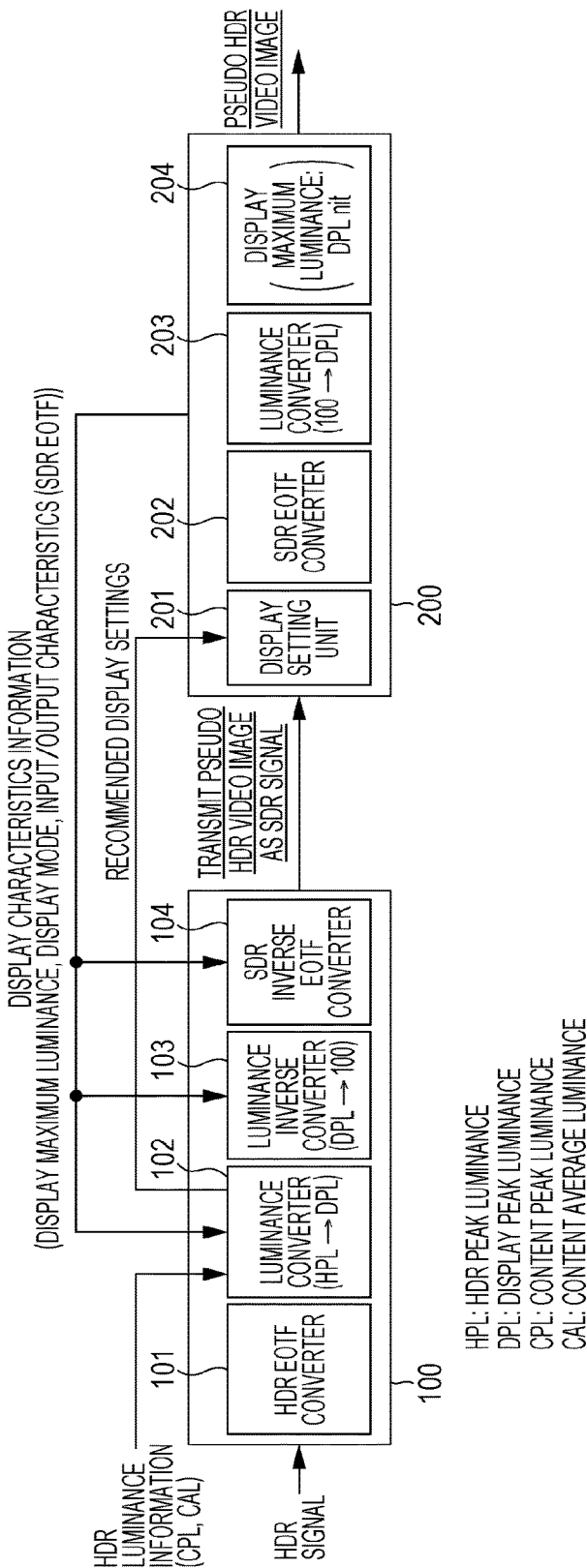
FIG. 37 is a block diagram illustrating a configuration of a converting device and the display device according to an exemplary embodiment.
Figure 38:
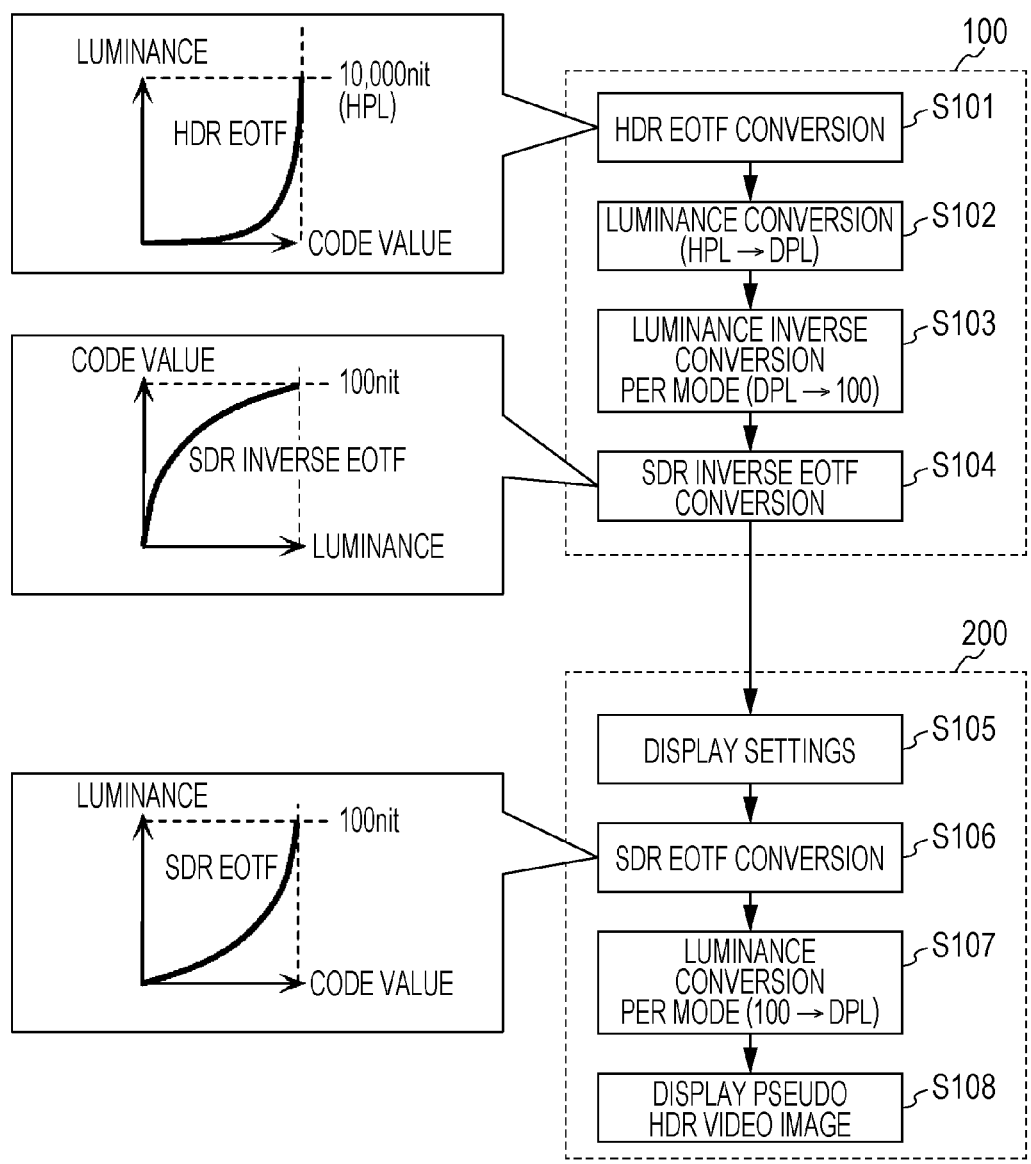
FIG. 38 is a flowchart illustrating a converting method and a display method performed by the converting device and the display device according to the exemplary embodiment.

FIG. 37 is a block diagram illustrating a configuration of the converting device and the display device according to the exemplary embodiment. FIG. 38 is a flowchart illustrating a converting method and a display method performed by the converting device and the display device according to the exemplary embodiment.

As illustrated in FIG. 37, converting device 100 includes HDR EOTF converter 101, luminance converter 102, luminance inverse converter 103 and SDR inverse EOTF converter 104. Further, display device 200 includes display setting unit 201, SDR EOTF converter 202, luminance converter 203 and display 204.

Each component of converting device 100 and display device 200 will be described in detail during description of the converting method and the display method.

37. Converting Method and Display Method

The converting method performed by converting device 100 will be described with reference to FIG. 38. In addition, the converting method includes step S101 to step S104 described below.

First, HDR EOTF converter 101 of converting device 100 obtains an HDR video image for which HDR inverse EOTF conversion has been performed. HDR EOTF converter 101 of converting device 100 performs HDR EOTF conversion on an HDR signal of the obtained HDR video image (S101). Thus, HDR EOTF converter 101 converts the obtained HDR signal into a linear signal indicating a luminance value. The HDR EOTF is, for example, SMPTE 2084.

Next, luminance converter 102 of converting device 100 performs first luminance conversion of converting the linear signal converted by HDR EOTF converter 101 by using display characteristics information and content luminance information (S102). According to the first luminance conversion, a luminance value corresponding to an HDR luminance range (referred to as a "HDR luminance value" below) is converted into a luminance value corresponding to a display luminance range (referred to as a "display luminance value" below). Details will be described below.

In view of the above, HDR EOTF converter 101 functions as an obtaining unit which obtains an HDR signal as a first luminance signal indicating a code value obtained by quantizing the luminance value of a video image. Further, HDR EOTF converter 101 and luminance converter 102 function as converters which determine the code value indicated by the HDR signal obtained by the obtaining unit, based on a display (display device 200) luminance range, and converts the code value into a display luminance value corresponding to the display luminance range which is a maximum value (DPL) which is smaller than a maximum value (HPL) of the HDR luminance range and is larger than 100 nit.

More specifically, in step S101, HDR EOTF converter 101 determines for the HDR code value which is a first code value indicated by the obtained HDR signal an HDR luminance value associated with an HDR code value by the HDR EOTF by using the obtained HDR signal and the HDR EOTF. In addition, the HDR signal indicates the HDR code value obtained by quantizing video (content) luminance value by using the HDR inverse EOTF of associating luminance values of the HDR luminance range and a plurality of HDR code values.

Further, in step S102, luminance converter 102 determines for the HDR luminance value determined in step S101 a display luminance value which is associated in advance with the HDR luminance value and corresponds to the display luminance range, and performs first luminance conversion of converting the HDR luminance value corresponding to the HDR luminance range into a display luminance value corresponding to the display luminance range.

Furthermore, before step S102, converting device 100 obtains content luminance information including at least one of a luminance maximum value (CPL: Content Peak luminance) of the video image (content) and average luminance value (CAL: Content Average luminance) of a video image, as information related to an HDR signal. The CPL (first maximum luminance value) is, for example, a maximum value among luminance values of a plurality of images configuring an HDR video image. Further, the CAL is, for example, an average luminance value which is an average of luminance values of a plurality of images configuring an HDR video image.

Furthermore, before step S102, converting device 100 obtains display characteristics information of display device 200 from display device 200. In addition, the display characteristics information is information indicating a maximum value (DPL) of a luminance which can be displayed by display device 200, a display mode (described below) of display device 200 and display characteristics of display device 200 such as input/output characteristics (an EOTF supported by the display device).

Further, converting device 100 may transmit recommended display setting information (which will be described below and also referred to as "setting information" below) to display device 200.

Next, luminance inverse converter 103 of converting device 100 performs luminance inverse conversion matching a display mode of display device 200. Consequently, luminance inverse converter 103 performs second luminance conversion of converting a luminance value corresponding to the display luminance range into a luminance value corresponding to an SDR luminance range (0 to 100 [nit]) (S103). Details will be described below. That is, luminance inverse converter 103 determines for the display luminance value obtained in step S102 an SDR luminance value which is a luminance value (referred to as a "SDR luminance value" below) associated in advance with the display luminance value and corresponding to an SDR as a third luminance value corresponding to an SDR luminance range whose maximum value is 100 nit, and performs second luminance conversion of converting the display luminance value corresponding to the display luminance range into the SDR luminance value corresponding to the SDR luminance range.

Further, SDR inverse EOTF converter 104 of converting device 100 generates a pseudo HDR video image by performing SDR inverse EOTF conversion (S104). That is, SDR inverse EOTF converter 104 quantizes the determined SDR luminance value by using an inverse EOTF (Electro-Optical Transfer Function) of an SDR (Standard Dynamic Range) which is third association information which associates luminance values of an HDR luminance range and a plurality of third code values, determines a third code value obtained by the quantization, converts the SDR luminance value corresponding to the SDR luminance range into an SDR signals as the third luminance signal indicating the third code value and thereby generates a pseudo HDR signal. In addition, the third code value is a code value supporting the SDR, and will be referred to as a "SDR code value" below. That is, an SDR signal is expressed by an SDR code value obtained by quantizing a luminance value of a video image by using an SDR inverse EOTF of associating luminance values of an SDR luminance range and a plurality of SDR code values. Further, converting device 100 outputs a pseudo HDR signal (SDR signal) generated in step S104 to display device 200.

Converting device 100 generates an SDR luminance value corresponding to a pseudo HDR by performing first luminance conversion and second luminance conversion on an HDR luminance value obtained by inversely quantizing an HDR signal, and generates an SDR signal corresponding to the pseudo HDR by quantizing the SDR luminance value by using an EOTF. In addition, the SDR luminance value is a numerical value in a luminance range of 0 to 100 nit corresponding to the SDR. However, the SDR luminance value is converted based on the display luminance range, and therefore takes a numerical value which is obtained by performing luminance conversion on an HDR luminance value by using an HDR EOTF and an SDR EOTF and which is different from the luminance value in the luminance range of 0 to 100 nit corresponding to the SDR.

Next, the display method performed by display device 200 will be described with reference to FIG. 38. In addition, the display method includes step S105 to step S108 described below.

First, display setting unit 201 of display device 200 sets display settings of display device 200 by using setting information obtained from converting device 100 (S105). In this regard, display device 200 is an SDR TV. The setting information is information indicating display settings which is recommended for the display device, and is information indicating how an EOTF is performed on a pseudo HDR video image and what settings can display beautiful video images (i.e., information for switching the display settings of display device 200 to optimal display settings). The setting information includes, for example, gamma curve characteristics during an output of the display device, a display mode such as a living mode (normal mode) or a dynamic mode, or a numerical value of a backlight (brightness). Further, display device 200 (also referred to as a "SDR display" below) may display a message which encourages the user to change the display settings of display device 200 by a manual operation. Details will be described below.

In addition, before step S105, display device 200 obtains an SDR signal (pseudo HDR signal), and setting information indicating display settings which are recommended for display device 200 to display video images.

Further, display device 200 may obtain the SDR signal (pseudo HDR signal) before step S106, and may obtain the SDR signal after step S105.

Next, SDR EOTF converter 202 of display device 200 performs SDR EOTF conversion on the obtained pseudo HDR signal (S106). That is, SDR EOTF converter 202 inversely quantizes the SDR signal (pseudo HDR signal) by using an SDR EOTF. Thus, SDR EOTF converter 202 converts an SDR code value indicated by an SDR signal into the SDR luminance value.

Further, luminance converter 203 of display device 200 performs luminance conversion according to the display mode set to display device 200. Consequently, luminance converter 203 performs third luminance conversion of converting an SDR luminance value corresponding to an SDR luminance range (0 to 100 [nit]) into a display luminance value corresponding to the display luminance range (0 to DPL [nit]) (S107). Details will be described below.

In view of the above, in step S106 and step S107, display device 200 converts a third code value indicated by the obtained SDR signal (pseudo HDR signal) into a display luminance value corresponding to the display luminance range (0 to DPL [nit]) by using the setting information obtained in step S105.

More specifically, the SDR signal (pseudo HDR signal) is converted into the display luminance value by, in step S106, determining for the SDR code value indicated by the obtained SDR signal an SDR luminance value associated with the SDR code value by an SDR EOTF by using the EOTF of associating the luminance values in the SDR luminance range and a plurality of third code values.

Further, in step S107, an SDR signal is converted into a display luminance value by, in step S107, determining a display luminance value which is associated in advance with the determined SDR luminance value and corresponds to the display luminance range, and performing third luminance conversion of converting the SDR luminance value corresponding to the SDR luminance range into a display luminance value corresponding to the display luminance range.

Finally, display 204 of display device 200 displays pseudo HDR video images on display device 200 based on the converted display luminance value (S108).

38. First Luminance Conversion

Figure 39A:
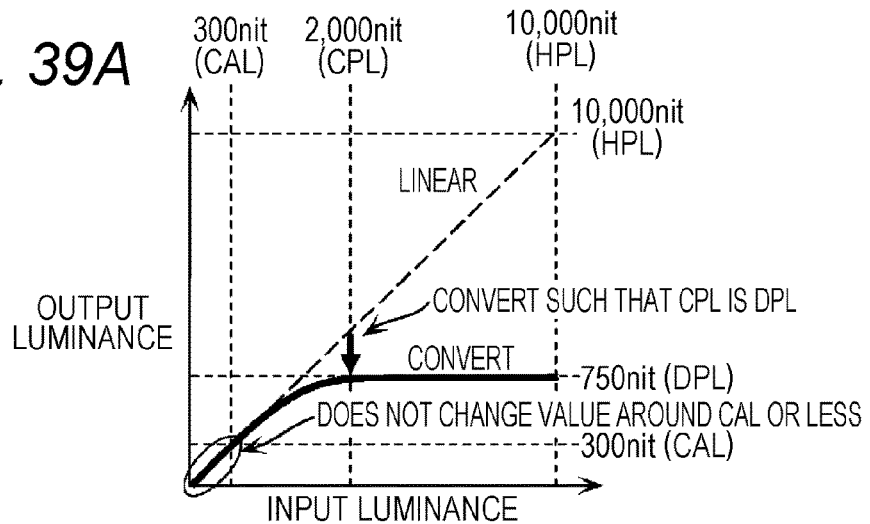
FIG. 39A is a view for explaining first luminance conversion.

Next, details of the first luminance conversion (HPL DPL) in step S102 will be described with reference to FIG. 39A. FIG. 39A is a view for explaining an example of the first luminance conversion.

Luminance converter 102 of converting device 100 performs the first luminance conversion of converting the linear signal (HDR luminance value) obtained in step S101 by using display characteristics information and content luminance information of HDR video images. According to the first luminance conversion, an HDR luminance value (input luminance value) is converted into a display luminance value (output luminance value) which does not exceed a display peak luminance (DPL). The DPL is determined by using a maximum luminance and a display mode of an SDR display which are the display characteristics information. The display mode is, for example, mode information such as a theater mode of displaying video images darkly on the SDR display, and a dynamic mode of displaying video images brightly. When, for example, the maximum luminance of the SDR display is 1,500 nit and the display mode is a mode providing brightness of 50% of the maximum luminance, the DPL is 750 nit. In this regard, the DPL (second maximum luminance value) is a luminance maximum value which can be displayed by a display mode currently set to the SDR display. That is, according to the first luminance conversion, the DPL which is the second maximum luminance value is determined by using display characteristics information which is information indicating display characteristics of the SDR display.

Further, according to the first luminance conversion, a CAL and a CPL of content luminance information are used, each luminance value equal to or less than the CAL is regarded as the same before and after conversion, and only each luminance value equal to or more than the CPL is changed. That is, as illustrated in FIG. 39A, according to the first luminance conversion, when the HDR luminance value is the CAL or less, the HDR luminance value is not converted, the HDR luminance value is determined as a display luminance value. Further, when the HDR luminance value is the CPL or more, the DPL which is the second maximum luminance value is determined as a display luminance value.

Furthermore, according to the first luminance conversion, a peak luminance (CPL) of an HDR video image of luminance information is used, and the DPL is determined as a display luminance value when the HDR luminance value is the CPL.

Figure 39B:
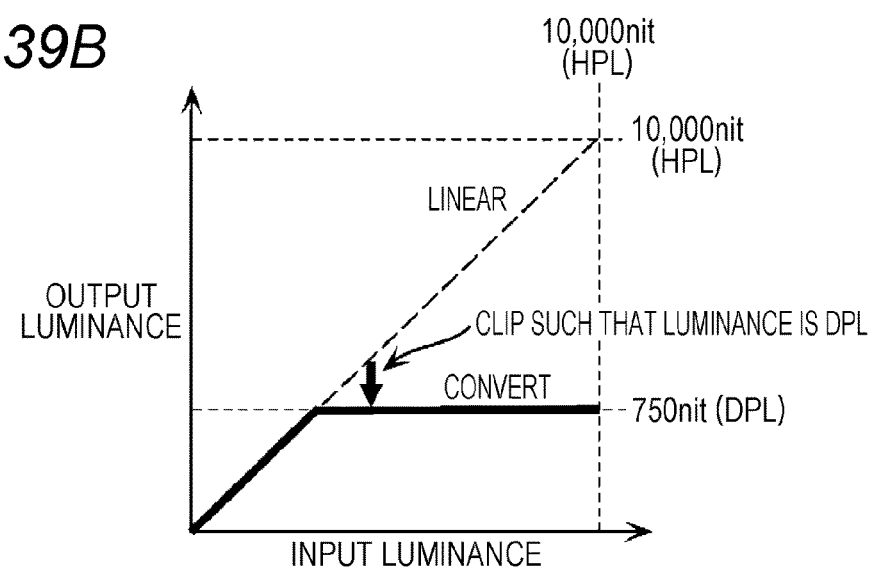
FIG. 39B is a view for explaining another example of the first luminance conversion.

In addition, according to the first luminance conversion, as illustrated in FIG. 39B, the linear signal (HDR luminance value) obtained in step S101 may be converted to clip to a value which does not exceed the DPL. By performing such luminance conversion, it is possible to simplify a process in converting device 100, make converting device 100 smaller, reduce power of converting device 100 and increase a processing speed of converting device 100. In addition, FIG. 39B is a view for explaining another example of the first luminance conversion.

39-1. Second Luminance Conversion

Figure 40:
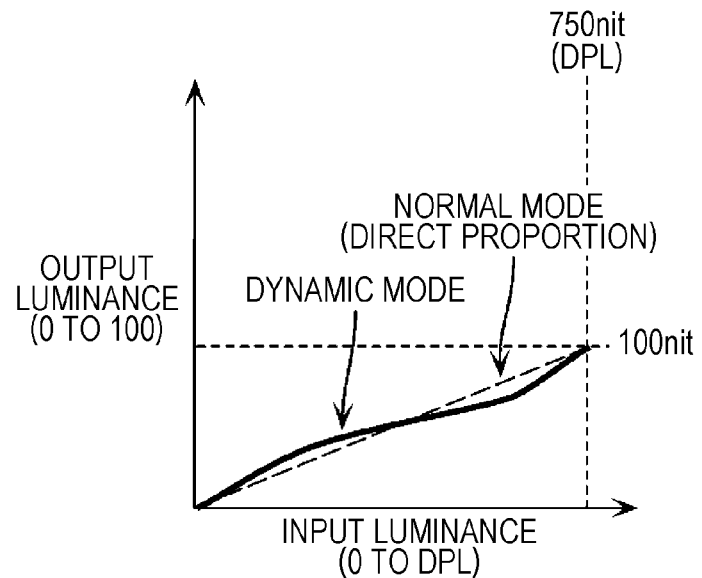
FIG. 40 is a view for explaining second luminance conversion.

Next, details of the second luminance conversion (DPL→100 [nit]) in step S103 will be described with reference to FIG. 40. FIG. 40 is a view for explaining the second luminance conversion.

Luminance inverse converter 103 of converting device 100 performs luminance inverse conversion corresponding to a display mode, on the display luminance value of the display luminance range (0 to DPL [nit]) converted by the first luminance conversion in step S102. The luminance inverse conversion is a process of making it possible to obtain the display luminance value of the display luminance range (0 to DPL [nit]) after the process in step S102 when the SDR display performs luminance conversion process (step S107) corresponding to the display mode. That is, the second luminance conversion is luminance inverse conversion of the third luminance conversion.

As a result of the above process, according to the second luminance conversion, the display luminance value (input luminance value) of the display luminance range is converted into an SDR luminance value (output luminance value of the SDR luminance range.

According to the second luminance conversion, a converting method is switched according to a display mode of the SDR display. When, for example, the display mode of the SDR display is the normal mode, a luminance is converted into a direct proportional value which is directly proportional to a display luminance value. Further, according to the second luminance conversion, in a case where the display mode of the SDR display is the dynamic mode which makes high luminance pixels brighter and makes low luminance pixels darker than those of the normal mode, an inverse function of the second luminance conversion is used to convert an SDR luminance value of each low luminance pixel into a value higher than the direct proportional value which is directly proportional to the display luminance value, and convert an SDR luminance value of each high luminance pixel into a value lower than the direct proportional value which is directly proportional to the display luminance value. That is, according to the second luminance conversion, for the display luminance value determined in step S102, a luminance value associated with the display luminance value is determined as an SDR luminance value by using luminance association information corresponding to display characteristics information which is information indicating display characteristics of the SDR display, and luminance conversion process is switched according to the display characteristics information. In this regard, the luminance association information corresponding to the display characteristics information is information which is defined per display parameter (display mode) of the SDR display as illustrated in, for example, FIG. 40 and which associates a display luminance value (input luminance value) and an SDR luminance value (output luminance value).

39-2. Third Luminance Conversion

Figure 41:
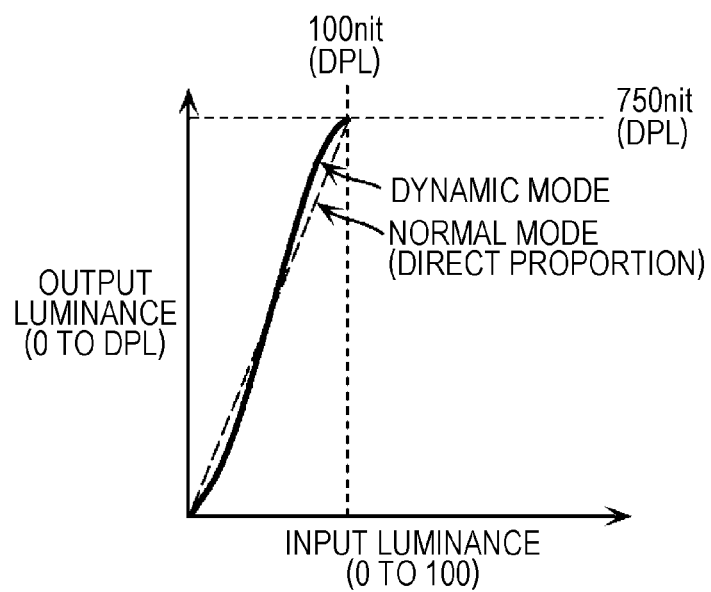
FIG. 41 is a view for explaining third luminance conversion.

Next, details of the third luminance conversion (100→DPL [nit]) in step S107 will be described with reference to FIG. 41. FIG. 41 is a view for explaining the third luminance conversion.

Luminance converter 203 of display device 200 converts an SDR luminance value of an SDR luminance range (0 to 100 [nit]) into (0 to DPL [nit]) according to the display mode set in step S105. This process is performed to realize an inverse function of luminance inverse conversion of each mode in step S103.

According to the third luminance conversion, a converting method is switched according to a display mode of the SDR display. When, for example, the display mode of the SDR display is the normal mode (i.e., a set display parameter is a parameter supporting the normal mode), luminance conversion is performed to convert the display luminance value into a direct proportional value which is directly proportional to the SDR luminance value. Further, according to the third luminance conversion, in a case where the display mode of the SDR display is the dynamic mode which makes high luminance pixels brighter and makes low luminance pixels darker than those of the normal mode, luminance conversion is performed to convert a display luminance value of each low luminance pixel into a value lower than the direct proportional value which is directly proportional to the SDR luminance value, and convert a display luminance value of each high luminance pixel into a value higher than the direct proportional value which is directly proportional to the SDR luminance value. That is, according to the third luminance conversion, for the SDR luminance value determined in step S106, a luminance value associated in advance with the SDR luminance value is determined as a display luminance value by using luminance association information corresponding to a display parameter which indicates display settings of the SDR display, and luminance conversion process is switched according to the display parameter. In this regard, the luminance association information corresponding to the display parameter is information which is defined per display parameter (display mode) of the SDR display as illustrated in, for example, FIG. 41 and which associates an SDR luminance value (input luminance value) and a display luminance value (output luminance value).

40. Display Settings

Figure 42:
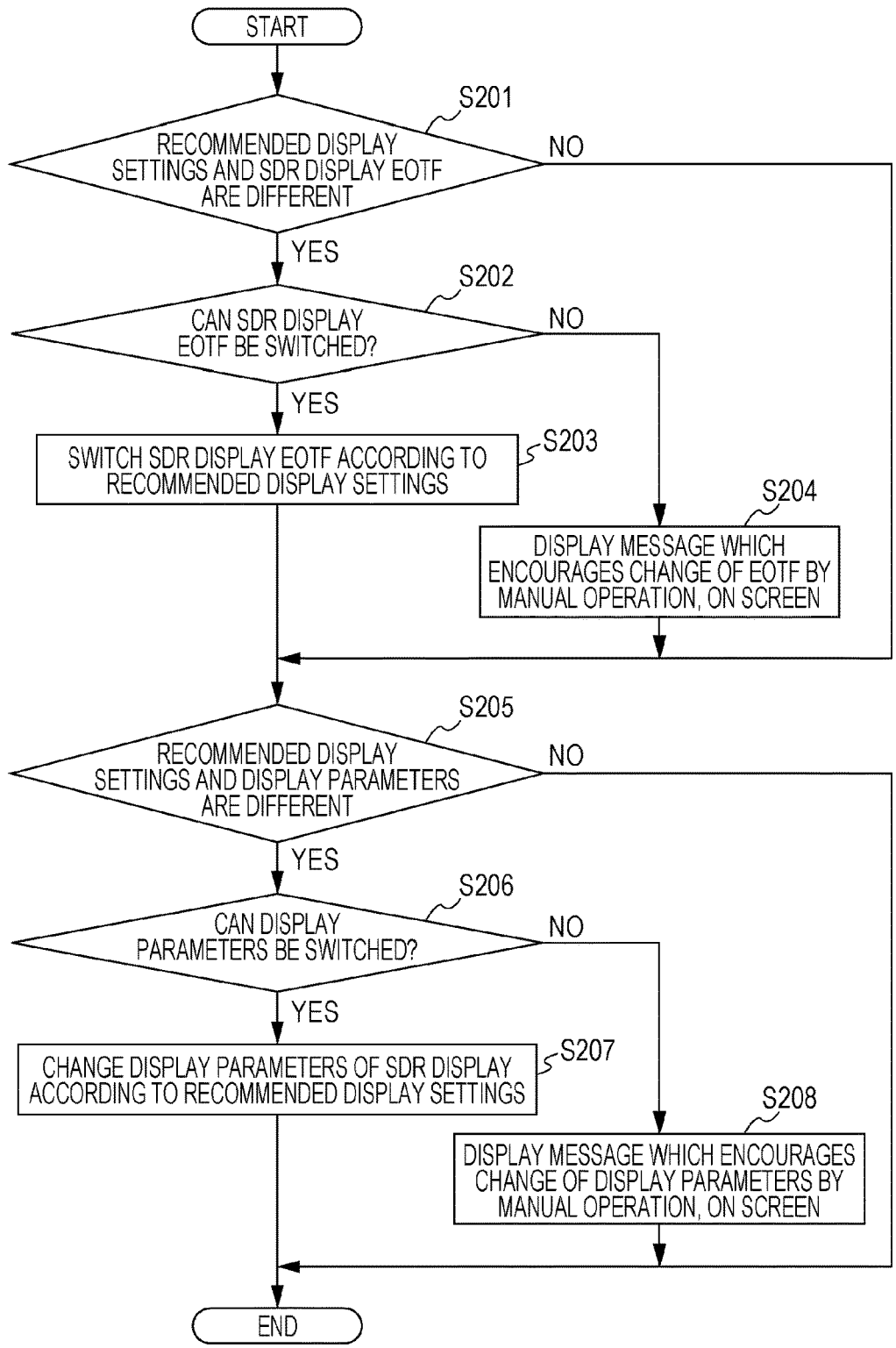
FIG. 42 is a flowchart illustrating a detailed process of display settings.

Next, details of the display settings in step S105 will be described with reference to FIG. 42. FIG. 42 is a flowchart illustrating detailed process of the display settings.

Display setting unit 201 of the SDR display performs a following process in step S201 to step S208 in step S105.

First, display setting unit 201 determines whether or not an EOTF (SDR display EOTF) set to the SDR display matches an EOTF assumed during generation of a pseudo HDR video image (SDR signal) by using setting information (S201).

When determining that the EOTF set to the SDR display is different from the EOTF indicated by the setting information (the EOTF matching the pseudo HDR video image) (Yes in S201), display setting unit 201 determines whether or not a system side can switch the SDR display EOTF (S202).

When determining that the system side can switch the SDR display EOTF, display setting unit 201 switches the SDR display EOTF to an appropriate EOTF (S203).

In view of step S201 to step S203, while the display settings are set (S105), the EOTF set to the SDR display is set to a recommended EOTF corresponding to the obtained setting information. Further, thus, in step S106 performed after step S105, it is possible to determine an SDR luminance value by using the recommended EOTF.

When determining that the system side cannot switch the SDR display EOTF (No in S202), display setting unit 201 displays on the screen a message which encourages the user to change the EOTF by a manual operation (S204). For example, display setting unit 201 displays on a screen a message such as "Please set a display gamma to 2.4". That is, while the display settings are set (S105), when it is not possible to switch the EOTF set to the SDR display, display setting unit 201 displays on the SDR display a message which encourages the user to switch to a recommended EOTF an EOTF (SDR display EOTF) set to the SDR display.

Next, the SDR display displays a pseudo HDR video image (SDR signal), yet determines whether or not a display parameter of the SDR display matches setting information by using the setting information before displaying the pseudo HDR video image (S205).

When determining that the display parameter set to the SDR display is different from the setting information (Yes in S205), display setting unit 201 determines whether or not it is possible to switch the display parameter of the SDR display (S206).

When determining that it is possible to switch the display parameter of the SDR display (Yes in S206), display setting unit 201 switches the display parameter of the SDR display according to the setting information (S207).

In view of step S204 to step S207, while the display settings are set (S105), the display parameter set to the SDR display is set to a recommended display parameter corresponding to the obtained setting information.

When determining that the system side cannot switch the display parameter (No in S206), display setting unit 201 displays on the screen a message which encourages the user to change the display parameter set to the SDR display by a manual operation (S208). For example, display setting unit 201 displays on the screen a message such as "Please set a display mode to a dynamic mode and maximize a backlight". That is, during the setting (S105), when it is not possible to switch the display parameter set to the SDR display, display setting unit 201 displays on the SDR display a message which encourages the user to switch to a recommended display parameter a display parameter set to the SDR display.

41. Modified Example 1

As described above, the exemplary embodiment has been described as an exemplary technique disclosed in this application. However, the technique according to the present disclosure is not limited to this, and is applicable to a first exemplary embodiment, too, for which changes, replacement, addition and omission have been optionally carried out. Further, it is also possible to provide new exemplary embodiments by combining each component described in the above exemplary embodiment.

Hereinafter, another exemplary embodiment will be described.

An HDR video image is, for example, a video image in a Blu-ray Disc, a DVD, a video distribution website on the Internet, a broadcast and a HDD.

Converting device 100 (HDR→pseudo HDR conversion processor) may be provided in a disk player, a disk recorder, a set-top box, a television, a personal computer or a smartphone. Converting device 100 may be provided in a server device on the Internet.

Display device 200 (SDR display) is, for example, a television, a personal computer and a smartphone.

Display characteristics information obtained by converting device 100 may be obtained from display device 200 via a HDMI (registered trademark) cable or a LAN cable by using HDMI (registered trademark) or another communication protocol. As the display characteristics information obtained by converting device 100, display characteristics information included in model information of display device 200 may be obtained via the Internet. Further, the user may perform a manual operation to set the display characteristics information to converting device 100. Furthermore, the display characteristics information may be obtained by converting device 100 immediately before generation of a pseudo HDR video image (steps S101 to S104) or at a timing at which default settings of a device are made or at which a display is connected. For example, the display characteristics information may be obtained immediately before conversion into a display luminance value or at a timing at which converting device 100 is connected to display device 200 for the first time by a HDMI (registered trademark) cable.

Further, a CPL and a CAL of an HDR video image may be provided per content or may be provided per scene. That is, according to the converting method, luminance information (a CPL and a CAL) which corresponds to each of a plurality of scenes of a video image, and which includes per scene at least one of a first maximum luminance value which is a maximum value among luminance values for a plurality of images configuring each scene, and an average luminance value which is an average of luminance values for a plurality of images configuring each scene may be obtained. According to first luminance conversion, for each of a plurality of scenes, a display luminance value may be determined according to luminance information corresponding to each scene.

Further, the CPL and the CAL may be packaged in the same medium (a Blu-ray Disc, a DVD or the like) as that of HDR video images or may be obtained from a location different from HDR video images, for example, by converting device 100 from the Internet. That is, luminance information including at least one of the CPL and the CAL may be obtained as meta information of a video image, or may be obtained via a network.

Further, during first luminance conversion (HPL DPL) of converting device 100, a fixed value may be used without using a CPL, a CAL and a display peak luminance (DPL). Furthermore, this fixed value may be changed from an outside. Still further, a CPL, a CAL and a DPL may be switched between a plurality of types. For example, the DPL may be switched between only three types of 200 nit, 400 nit and 800 nit, or may take a value which is the closest to display characteristics information.

Further, an HDR EOTF may not be SMPTE 2084, and another type of an HDR EOTF may be used. Furthermore, a maximum luminance (HPL) of an HDR video image may not be 10,000 nit and may be, for example, 4,000 nit or 1,000 nit.

Still further, bit widths of code values may be, for example, 16, 14, 12, 10 and 8 bits.

Moreover, SDR inverse EOTF conversion is determined based on display characteristics information yet a fixed conversion function (which can be changed from an outside, too) may be used. For the SDR inverse EOTF conversion, a function defined by, for example, Rec. ITU-R BT.1886 may be used. Further, types of SDR inverse EOTF conversion may be narrowed down to several types, and a type which is the closest to input/output characteristics of display device 200 may be selected and used.

Furthermore, a fixed mode may be used for a display mode, and the display mode may not be included in display characteristics information.

Still further, converting device 100 may not transmit setting information, and display device 200 may adopt fixed display settings and may not change the display settings. In this case, display setting unit 201 is unnecessary. Further, setting information may be flag information indicating a pseudo HDR video image or a non-pseudo HDR video image, and may be, for example, changed to settings for displaying the pseudo HDR video image the most brightly in case of the pseudo HDR video image. That is, while the display settings are set (S105), when the obtained setting information indicates a signal indicating a pseudo HDR video image converted by using a DPL, brightness settings of display device 200 may be switched to settings for displaying the pseudo HDR video image the most brightly.

42. Modified Example 2

Further, in the first luminance conversion (HPL DPL) of converting device 100, conversion is performed according to, for example, a following equation.

In this regard, L represents a luminance value normalized to 0 to 1, and S1, S2, a, b and M are values set based on a CAL, a CPL and a DPL. ln represents a natural logarithm. V represents a converted luminance value normalized to 0 to 1. As in an example in FIG. 39A, when the CAL is 300 nit, the CPL is 2,000 nit, the DPL is 750 nit, conversion is not performed up to CAL+50 nit and conversion is performed in case of 350 nit or more, respective values take, for example, following values.

S1=350/10000
S2=2000/10000
M=750/10000
a=0.023
b=S1−a*ln(S1)=0.112105

That is, according to the first luminance conversion, when an SDR luminance value is between an average luminance value (CAL) and a first maximum luminance value (CPL), a display luminance value corresponding to an HDR luminance value is determined by using a natural logarithm.

40. Effect and Others

By converting each HDR video image by using information such as a content peak luminance or a content average luminance of each HDR video image, it is possible to change a converting method according to content and convert each HDR video image while keeping an HDR gradation as much as possible. Further, it is possible to suppress a negative influence that each HDR video image is too dark or too bright. More specifically, by mapping a content peak luminance of each HDR video image on a display peak luminance, a gradation is kept as much as possible. Further, each pixel value equal to or less than an average luminance is not changed to prevent an overall brightness from changing.

Furthermore, by converting each HDR video image by using a peak luminance value and a display mode of an SDR display, it is possible to change a converting method according to display environment of the SDR display, and display each video image (pseudo HDR video image) having HDR quality at the same gradation or brightness as that of an original HDR video image according to capability of the SDR display. More specifically, a display peak luminance is determined based on a maximum luminance and a display mode of the SDR display, and each HDR video image is converted so as not to exceed the peak luminance value. Consequently, each HDR video image is displayed without substantially decreasing a gradation of each HDR video image up to a brightness which the SDR display can display, and a luminance value of a brightness which cannot be displayed is lowered to a brightness which can be displayed.

As described above, it is possible to reduce information of a brightness which can be displayed, and display each video image having quality close to an original HDR video image without decreasing a gradation of a brightness which can be displayed. For example, for a display whose peak luminance is 1,000 nit, each HDR video image is converted into a pseudo HDR video image whose peak luminance is suppressed to 1,000 nit to keep an overall brightness, and a luminance value changes according to a display mode of the display. Hence, a luminance converting method is changed according to the display mode of the display. If a luminance higher than the peak luminance of the display is permitted for a pseudo HDR video image, there is a case where the high luminance is replaced with a peak luminance of the display side and is displayed. In this case, the pseudo HDR video image becomes entirely darker than an original HDR video image. By contrast with this, when a luminance lower than the peak luminance of the display is converted as a maximum luminance, this low luminance is replaced with the peak luminance of the display side. Therefore, the pseudo HDR video image becomes entirely brighter than an original HDR video image. Moreover, the luminance is lower than the peak luminance of the display side, and therefore capability related to a display gradation is not used at maximum.

Further, the display side can display each pseudo HDR video image better by switching display settings by using setting information. When, for example, a brightness is set dark, a high luminance cannot be displayed, and therefore HDR quality is undermined. In this case, the display settings are changed or a message which encourages a change of the display settings is displayed to exhibit display capability and display high gradation video images.

OVERALL CONCLUSION

The playback method and the playback device according to one or a plurality of aspects of the present disclosure have been described based on the exemplary embodiment. However, the present disclosure is not limited to this exemplary embodiment. The scope of one or a plurality of exemplary embodiments of the present disclosure may include exemplary embodiments obtained by applying, to the present exemplary embodiment, various deformations one of ordinary skill in the art conceives, and exemplary embodiments obtained by combining the components according to different exemplary embodiments without departing from the spirit of the present disclosure.

In the above exemplary embodiment, each component may be configured by dedicated hardware such as a circuit or may be realized by executing a software program suitable to each component. Each component may be realized by causing a program executing unit such as a CPU or a processor to read a software program recorded on a recording medium such as a hard disk or a semiconductor memory and execute the software program.

The present disclosure is applicable to content data generating devices, video stream transmitting devices such as Blu-ray devices or video display devices such as televisions.

What is claimed is:

1. A method used by a playback device, the method comprising:
when a first version of a transmission protocol is being used to transmit a signal between the playback device and a display device, transmitting first meta data to the display device using the first version of the transmission protocol without transmitting second meta data to the display device; and
when a second version of the transmission protocol is being used to transmit the signal between the playback device and the display device, transmitting the first meta data and the second meta data to the display device using the second version of the transmission protocol, the second version of the transmission protocol being different from the first version of the transmission protocol,
wherein the first meta data including information that is commonly used for a plurality of images included in a continuous playback unit of a first video signal and relates to a luminance range of the first video signal, and
wherein the second meta data includes information that is commonly used for a unit subdivided compared to the continuous playback unit of the first video signal and relates to the luminance range of the first video signal.

2. The method according to claim 1, further comprising when the version of the transmission protocol is the first version, (i) performing a conversion process of converting the luminance range of the first video signal by using the second meta data to obtain a second video signal and (ii) transmitting the second video signal to the display device.

3. The method according to claim 1, further comprising:
when the version of the transmission protocol is the second version and when the display device does not include a capability of performing a conversion process of converting the luminance range of the first video signal by using the second meta data, (i) performing the conversion process to obtain a second video signal and (ii) transmitting the second video signal to the display device; and
when the version of the transmission protocol is the second version and when the display device includes the capability of performing the conversion process, transmitting the first video signal to the display device without performing the conversion process.

4. The method according to claim 1, wherein
when the playback device does not include a capability of a conversion process of converting the luminance range of the first video signal by using the second meta data, the second meta data is not transmitted to the display device without performing the conversion process.

5. The method according to claim 1, wherein
a luminance value of the first video signal is encoded as a code value, and
the first meta data includes information for specifying an EOTF (Electro-Optical Transfer Function) of associating a plurality of luminance values and a plurality of code values.

6. The method according to claim 1, wherein
the second meta data indicates mastering characteristics of the first video signal.

7. The method according to claim 1, wherein
the transmission protocol is High Definition Multimedia Interface (HDMI), and
the second version of the transmission protocol is an older version of HDMI than the first version of the transmission protocol.

8. A playback device comprising one or more memories and circuitry which, in operation:
transmits, when a first version of a transmission protocol is being used to transmit a signal between the playback device and a display device, first meta data to a display device using the first version of the transmission protocol without transmitting second meta data to the display device; and
transmits, when a second version of the transmission protocol is being used to transmit a signal between the playback device and the display device, the first meta data and the second meta data to the display device using the second version of the transmission protocol,
wherein the first meta data including information that is commonly used for a plurality of images included in a continuous playback unit of a first video signal and relates to a luminance range of the first video signal, and
wherein the second meta data includes information that is commonly used for a unit subdivided compared to the continuous playback unit of the first video signal and relates to the luminance range of the first video signal.

* * * * *